(12) United States Patent
Fogg

(10) Patent No.: US 6,782,132 B1
(45) Date of Patent: Aug. 24, 2004

(54) VIDEO CODING AND RECONSTRUCTION APPARATUS AND METHODS

(75) Inventor: Chad Edward Fogg, Seattle, WA (US)

(73) Assignee: Pixonics, Inc., Palo Alto, CA (US)

( * ) Notice: Subject to any disclaimer, the term of this patent is extended or adjusted under 35 U.S.C. 154(b) by 0 days.

(21) Appl. No.: 09/372,656

(22) Filed: Aug. 11, 1999

Related U.S. Application Data

(60) Provisional application No. 60/123,300, filed on Mar. 3, 1999, provisional application No. 60/105,926, filed on Oct. 28, 1998, and provisional application No. 60/096,322, filed on Aug. 12, 1998.

(51) Int. Cl.[7] .................................................. G06K 9/36
(52) U.S. Cl. ....................... 382/232; 382/260; 382/261; 348/716
(58) Field of Search .................................. 382/232, 180, 382/260, 261, 190; 348/716, 718; 375/240.26

(56) References Cited

U.S. PATENT DOCUMENTS

| | | | |
|---|---|---|---|
| 4,924,522 A | | 5/1990 | Bray et al. ..................... 382/56 |
| 4,953,400 A | * | 9/1990 | Bossuyt ........................ 73/159 |
| 5,218,649 A | * | 6/1993 | Kundu et al. ................ 382/180 |
| 5,325,449 A | | 6/1994 | Burt et al. ..................... 382/56 |
| 5,341,174 A | | 8/1994 | Xue et al. .................... 348/576 |
| 5,515,111 A | | 5/1996 | Guedalia ..................... 348/427 |
| 5,535,291 A | | 7/1996 | Spencer et al. ............. 382/254 |
| 5,592,237 A | * | 1/1997 | Greenway et al. .......... 348/716 |
| 5,633,956 A | | 5/1997 | Burl ............................ 382/275 |
| 5,642,168 A | | 6/1997 | Masaki ....................... 348/441 |
| 5,673,376 A | | 9/1997 | Ray et al. .................... 395/127 |
| 5,696,848 A | | 12/1997 | Patti et al. .................. 382/254 |
| 5,719,594 A | | 2/1998 | Potu ............................ 345/130 |
| 5,748,507 A | | 5/1998 | Abatzoglou et al. ........ 364/572 |
| 5,778,102 A | | 7/1998 | Sandford, II et al. ....... 382/251 |
| 5,896,465 A | * | 4/1999 | Coppola ..................... 382/232 |
| 5,940,049 A | * | 8/1999 | Hinman et al. ................ 345/2 |
| 6,240,208 B1 | * | 5/2001 | Garakani et al. ........... 382/190 |
| 6,317,521 B1 | * | 11/2001 | Gallagher et al. .......... 382/260 |

\* cited by examiner

*Primary Examiner*—Anh Hong Do

(57) ABSTRACT

The present invention provides advanced encoding and advanced reconstruction apparatus and methods enabling low bitrate, enhanced coding and quality-enhanced reconstruction, among other aspects. Preferably operating in accordance with a super-domain model, the invention enables the superimposed use of advanced coding tools such as for determining the susceptibility of image data to optimization and degradation avoidance. Other preferred tools also include multi-dimensional diffusion, registration, meta data utilization, advanced constructs, image representation optimization and efficiency optimization. Advanced decoding further enables maximized utilization of received enhanced image data and other information, also preferably in accordance with a super-domain model. Advanced encoding preferably comprises reverse-superresolution encoding and advanced decoding preferably comprises advanced superresolution decoding, which can further be conducted in a distributed and/or cooperative manner.

9 Claims, 34 Drawing Sheets

VIDEO CODING AND RECONSTRUCTION APPARATUS AND METHODS

CROSS-REFERENCE TO PRIOR APPLICATIONS

This application claims priority to and hereby incorporates by reference Provisional Patent Application No. 60/096,322 entitled Digital Display System and filed on Aug. 12, 1998, Ser. No. 60/105,926 entitled MPEG Decoder With Stream-Based Enhancement and filed on Oct. 28, 1998, and Ser. No. 60/123,300 entitled Superresolution Encoder and Decoder filed on Mar. 3, 1999. This application also claims priority to and hereby incorporates by reference U.S. patent application Ser. No. 09/250,424 entitled Digital Display Systems and filed on Feb. 16, 1999 now U.S. Pat. No. 6,157,396, and Ser. No. 09/277,100 entitled System & Method for Using Temporal Gamma and Reverse Super-Resolution to Process Images for use in Digital Display Systems filed on Mar. 26, 1999 now U.S. Pat. No. 6,340,994.

BACKGROUND OF THE INVENTION

1. Field of the Invention

The present invention relates generally to digital video and, more particularly to digital video coding and reconstruction.

2. Discussion of Prior Art

The recent introduction of digital video technology holds great promise for the future of multimedia. Unlike its analog predecessors, digital video is capable of being stored, transferred, manipulated, displayed and otherwise processed with greater precision by a wide variety of digital devices. Digital processing can also be more readily conducted in conjunction with various other digital media (e.g. graphics, audio, animation, virtual-reality, text, mixed media, etc.), and with more reliable synchronization and lower generational degradation.

Successful deployment of digital video is largely due to the wide adoption of digital video standards, such those espoused by the Moving Picture Experts Group ("MPEG specifications"). While often hindered by proliferated compatibility with analog conventions (e.g. interlace video) and other factors, standardized digital constructs nevertheless provide substantial compression via common video signals and produce conventionally "acceptable" perceived image quality.

FIG. 1, for example, illustrates a typical standard-compliant, one-to-many encoder and deterministic-decoder pair or "codec." As shown, codec 100 includes encoder 101 and decoder 103, which are connected via communications system 102. Operationally, pre-processor 111 typically receives, downscales and noise filters video source s to remove video signal components that might otherwise impede encoding. Next, encode-subsystem 113 compresses and codes pre-processed signal s', producing encoded-signal b. Multiplexer 115 then modulates and mutiplexes encoded-signal b and transfers resultant signal b' to communications subsystem 102. Communications subsystem 102 (typically not part of codec 100) can be a mere data transfer medium or can also include system interfaces and/or subsystems for combining, scheduling and/or delivering multiple singular and/or mixed media signals to a receiver. Decoder 103 typically operates at a receiver to reconstruct video source s. More specifically, signal b' is demodulated and demultiplexed by demultiplexer 131, decoded by decode-subsystem 133 and then post-processed (e.g. filtered, converted, etc.) by post-processor 135. Following decoding, decoded-signal r', which resembles the source signal s, is displayed and/or stored.

FIGS. 2 and 3 respectively illustrate encode-subsystem 113 and decode-subsystem 133 of FIG. 1 in greater detail. Beginning with FIG. 2, the downscaled video signal s' from pre-processor 111 (FIG. 1) is received, optionally formatted, and then stored in frame store 203 by capture unit 201. Captured signals c' are represented as a sequence of two-dimensional sample lattices corresponding to video frames. (The number of captured frames contemporaneously stored by frame store 203 is determined by encode-subsystem latency and the analysis window size utilized by analysis unit 202.) Stored frames are transferred to analysis unit 202 and otherwise retrieved multiple times as needed for actual encoding. Analysis unit 202, for example, measures standard-specific properties of each stored frame, which it transfers as metrics to decision unit 204.

Next, the analysis unit metrics are inserted into an encoding formula, producing the coding modes according to which encode-subsystem 205 represents pre-processed frames as standard-compliant encoded-frames. More specifically, temporal prediction unit 207 retrieves frames from frame store 208, uses captured-frames to form a coarse current-frame prediction and then refines this prediction according to prior-encoded frames. Decision unit 204 then uses the refined predictions and metrics to control current frame coding. Finally, encode unit 205 uses a current coding mode to form, on a frame-area ("macroblock") basis, a coded frame.

Continuing with FIG. 3, a typical decode-subsystem 133 performs a simpler, deterministic operation than encode-subsystem 113, using the frame-data of each encoded frame to determine the proper reconstruction of a corresponding decoded frame. (For clarity, elements complimentary to those the encode-subsystem of FIG. 2 are correspondingly numbered.) Operationally, parsing engine 301 de-multiplexes the received variable length encoded-bitstream b. Thereafter, decode unit 305 provides spatial frame elements and temporal prediction unit 307 provides temporal frame elements which reconstruction unit 306 reconstructs into decoded frames. Frame store 303 provides for frame reordering of differentially-coded adjacent frames (discussed below) and can also serve as a frame-buffer for post-processor 135 (FIG. 1).

In addition to current-frame prediction (above), standard-compliant codecs also provide for compression through differential frame representation and prediction error data. MPEG-2 coded video, for example, utilizes intra ("I"), predictive ("P") and bi-directional ("B") frames that are organized as groups-of-pictures ("GOPs"), and which GOPs are organized as "sequences." Typically, each GOP begins with a I-frame and then two B-frames are inserted between the I frame and subsequent P frames, resulting in a temporal frame sequence of the form: IBBPBBPBB . . . I-frames represent a complete image, while P and B frames can be coded respectively as differences between preceding and bi-directionally adjacent frames (or on a macroblock basis). More specifically, P and B frames include motion vectors describing interframe macroblock movement. They also include prediction data, which describes remaining (poorly motion-estimated or background) macroblock spatial-pattern differences, and prediction error data, which attempts to fill-in for or "spackel" data lost to prediction inaccuracies. Prediction and prediction error data are also further compressed using a discrete cosine transform ("DCT"), quantization and other now well-known techniques.

Among other features, MPEG and other standards were intended to meet emerging coding needs. For example, they specify protocols rather than device configurations to enable emerging, more efficient protocol-compliant devices to be more readily utilized. (One purpose of GOPs, for example, is to avoid proliferation of drift due to differing decoder implementations by assuring periodic I-frame "refreshes.") MPEG-2 further provides profiles and levels, which support emerging higher resolution video (e.g. HDVD, HDTV, etc.). Scalability modes are also provided. Much like adding missing prediction error data to prediction data, MPEG-2 scalability modes allow "enhancement" frame data to be extracted from "base" frame data during encoding (typically using a further encode-subsystem) and then optionally re-combined from the resulting base and enhancement "layers" during decoding.

Unfortunately, standards are ultimately created in hindsight by committee members who cannot possibly foresee all contingencies. Worse yet, new standards materialize slowly due to the above factors and a need to remain compatible with legacy devices operating in accordance with the existing standard.

For example, while current standard-compliant codecs produce generally acceptable quality when used with conventional standard-definition television ("SDTV"), resultant signal degradation is perceivable and will become even more so as newer, higher-definition devices emerge. Block-based coding, for example is non-ideal for depicting many image types—particularly images that contain objects exhibiting high velocity motion, rotation and/or deformation. In addition, standard compression is prone to over-quantization of image data in meeting bitrate and other requirements. Further, even assuming that an ideal low-complexity image well suited to block-based coding is supplied, image quality is nevertheless conventionally limited to that of the pre-processed signal. Defects in the source video itself, such as blur and noise, are also not even considered.

Another example is that conventional "data adding/layering" (e.g. prediction error, scalability, etc.) hinders coding efficiency. Such often data-intensive additions might well result in excessive bit-rate, which excess must then be contained through quality-degrading methods such as quantization. Thus, conventional scalable coding is rarely utilized, and it is unlikely that high-definition media (e.g. HDTV), while ostensibly supported, can be provided at its full quality potential within available bandwidth. Other applications, such as video conferencing, are also adversely affected by these and other standard coding deficiencies.

A new approach that promises to deliver better quality from standard-coded video is "superresolution." Conventionally, superresolution ("SR") refers to a collection of decoder-based methods that, during post-processing, reuse existing standard-decoded image data in an attempt to remove blur, aliasing, noise and other effects from an image. The term SR, while previously applied to producing a single higher-resolution image, now also encompasses using a series of decoded video frames for video enhancement as well.

In summary, conventional SR methods: identify common image portions within a predetermined number of decoded image frames; create a model relating the decoded images to an unknown idealized image; and set estimated criteria that, when met, will indicate an acceptable idealized image approximation. A resultant SR-enhanced image is then produced for each SR-image portion as a convergence of the model and criteria in accordance with the corresponding decoded-image portions. A review of known and postulated coding and SR methods are given, for example, in the Prentice Hall text. Digital Video Processing by Murat Tekalp of the University of Rochester (1995).

Unfortunately, while promising, conventional SR effectiveness is nevertheless limited. For example, conventional SR is reliant on a specific codec and decoded frame and macroblock quality produced by that codec. Not only is such image data merely the fortuitous byproduct of original image production and prior processing, but it is also subject to the codec-specific downsampling, image representation, bitrate-limiting, data layering and other deficiencies given above. Conventional SR also relies on estimation, interpolation and computationally intensive iteration, the inexactness of which is exacerbated by real-time operation required in order to continuously display the SR-enhanced video. As a result, inconsistent intra-frame and inter-frame improvement, as well as other codec and SR artifacts, might be even more apparent to a viewer than without conventional SR-enhanced decoding.

Accordingly, there is a need for apparatus and methods capable of providing high-quality imaging in conjunction with but resistant to the limitations of standard codecs.

SUMMARY OF THE INVENTION

Broadly stated, the invention provides low-bitrate modified coding of a video signal enabling improved-quality upon reconstruction (e.g. decoding). The invention also enables further improvement when used in conjunction with advanced reconstruction in accordance with the invention.

More specifically, in one aspect, the invention provides for defining and exploiting image-aspect and image-coding redundancies, thereby enabling utilization of such redundancies to convey more complete information. In another aspect a super-domain model facilitates advanced-coding in a superimposed manner with standard-coding, thereby avoiding conventional limitations and enabling optimally-coded image information to be made available for transmission, storage, reconstruction and other uses. Multi-dimensional image-portion aspect diffusion and registration capabilities, direct coding/decoding and other tools also enable coding improvements to be efficiently integrated in a static and/or dynamic manner with standard-coded data. Analysis, susceptibility determination, consistency and other quality-assurance tools further facilitate diffusion, registration and other optimizations. In another aspect, the invention provides an advanced encoder capable of dynamic low-bitrate, advanced-coding that, upon reconstruction, can produce standard/enhanced quality images and/or other features. In yet another aspect, the invention further provides an advanced decoder that is capable of producing higher-quality and otherwise improved reconstructions in response to receipt of modifiedly-coded data and/or other information, among still further aspects.

In accordance with the present invention, advanced coding preferably includes techniques consistent with those teachings broadly referred to by the above-referenced co-pending patent applications as "reverse superresolution." It will become apparent, however, that the term reverse superresolution or "RSR" does not describe merely the reverse of "superresolution" or "SR," even as the term super-resolution is extended beyond its conventional meaning by such applications to incorporate their teachings. For example, one advantage of RSR is that RSR can provide bitrate-reduced standard or modified quality in conjunction with conventional standard-decoders (i.e. without SR-enhancement). However, in order to extend the useful broad classifications established by such applications, SR will be even further extended herein in the context of codecs to refer to all quality/functionality improving reconstruction (i.e. except standard decoding); in contrast, RSR will refer broadly to all advanced coding-related techniques consistent with the teachings herein. Additionally, the labels "conventional-SR" and "advanced-SR" will be used where operability-inhibiting limitations of conventional-SR might not be readily apparent. It should further be noted that the term "standard," as used herein, refers not only to formally standardized protocols, techniques, etc., but also to other methods and apparatus to which RSR, advanced-SR and/or other teachings of the present invention are capable of being applied.

Accordingly, in a preferred embodiment, an RSR-enhanced encoder receives source image-data as well as available image-data creation, prior processing and/or user information. The enhanced encoder further determines the susceptibility of the image-data to available quality improvement. Preferably concurrently with such susceptibility determination, the enhanced encoder also determines opportunity within standard-compliant video coding for incorporating implemented quality improvements. The encoder further preferably dimensionally composites or "diffuses" improvements into and otherwise optimizes the encoded data stream. Additionally, the encoder provides for further diffused and/or a minimized amount of added data and/or information in either a unitarily (e.g. conventional encoder-decoder operational pairing) or distributed manner in accordance with applicable reconstruction and/or other system constraints. Such determining and coding tools are further preferably modifiably provided and can apply to reconstruction generally, standard-decoding, and conventional/advanced SR, among other possibilities.

The preferred RSR-enhanced encoder is further preferably operable in accordance with advanced-reconstruction. More preferably, an advanced SR-decoder is provided which is capable of conducting advanced local and/or distributed reconstruction in accordance with diffused and/or added information, cooperatively with advanced coding and/or in accordance with standard-decoding.

Advantageously, the invention is capable of providing determinable-quality, lower bitrate and/or otherwise improved operation in a standard-compliant, yet efficiently adaptable and scalable manner. For example, between standard introductions, otherwise non-compliant improvements can be readily incorporated into systems utilizing standard-complaint codecs; assuming such improvements are adopted by a revised or new standard, yet further improvements can be readily incorporated in accordance with the new standard, and so on.

In addition, more effective and precise functionality can be achieved using matched and/or unmatched encoders and decoders. For example, the invention enables more effective results not only from standard-compliant, non-scalable and scalable decoding, but also from conventional SR-enhanced decoders and advanced-SR reconstruction.

The invention further enables quality-improvement to be achieved using standard quality as a modifiable concurrently-deliverable baseline. For example, standard or improved quality/functionality can be provided at significantly reduced bitrate. In addition, the same (or further modified) coded image data, without added bandwidth, can produce standard quality/functionality with standard-compliant systems and improved quality/functionality with other systems. Still further, standard and/or improved quality/functionality can be dynamically provided in accordance with static or dynamically varying quality, bandwidth and/or other operational constraints, among other examples.

Another advantage is that the invention is capable of providing such improvement in a manner that is adaptable to disparate standards, tools, operational constraints and implementation configurations, only a few of which might be specifically noted herein. Thus, for example, investment in legacy and emerging technologies is preserved.

The invention also makes possible practical determinable-quality reconstruction, in part, by increasing efficiency., reducing localized and real-time processing workload, enabling decoder-based coding-type operations and/or by reducing bandwidth requirements, among yet other advantages.

These and other objects and advantages of the present invention will become apparent to those skilled in the art after considering the following detailed specification, together with the accompanying drawings.

BRIEF DESCRIPTION OF THE DRAWINGS

FIG. 28b is a flowchart illustrating an advanced-SR decoding portion of the advanced decoding method of FIG. 28a;

DETAILED DESCRIPTION OF THE PREFERRED EMBODIMENT

In accordance with the present invention, it is discovered that determinable quality images and/or image components can be provided in a manner that is not only standard-compliant, but that is further capable of rendering current and future standards and implementation investments more adaptable, scalable and efficient. The invention also enables modification of the results achievable in conjunction with standard-complaint coding, including quality determination, and with little or no net increase, or even a decrease in bitrate and bandwidth requirements. Among other aspects of the invention, such capability is preferably facilitated by superimposed direct optimization, multi-dimensional, redundancy determination, creation and/or utilization, a super-domain model and/or multi-dimensional diffusion-type processing in conjunction with receipt of digital image data and/or other information.

Many aspects of the invention can be more easily viewed as modifiable, replaceable and combinable tools that can be incorporated within a variety of system designs. Such tools can be incorporated in a more separated manner (e.g. to minimize design or standard-modification impact), more pervasively (e.g. to maximize a desired effect) and/or gradually. For example, the benefits achievable in accordance with reverse superresolution ("RSR"), advanced superresolution ("advanced-SR") and other teachings herein are expected to impact not only conventional and future techniques and standards, but also conventional approaches to image coding and other informational storage, conveyance, manipulation and/or other processing. In systems utilizing standard-decoders or conventional-SR, for example, RSR tools can initially be added in a separated manner for quality improvement and/or bitrate reduction, and then more pervasive RSR and advanced-SR tools can be added to achieve even further benefits. Such tools can also be implemented in a distributed and/or cooperative (e.g. coding and/or reconstruction processing) manner, for example, to maximize bitrate-quality tradeoffs in interim systems, to reduce subsystem computational workload and/or to provide user, application and/or system-specific capabilities, among still further examples.

It will also become apparent as the discussion progresses that aspects of the invention are applicable to a wide variety of applications, standards, systems and approaches to codec implementations, among other considerations. It is therefore believed that the invention will be better understood by way of examples covering first certain individual aspects of the invention (broadly and then more specifically), and then progressing systematically from more separable to more pervasively integrated implementation considerations. Such examples should not, however, be construed as limiting, but rather as a more effective expression of a preferred embodiment given a wide variety of likely often recursive permutations enabled by the teachings herein.

Figure 4:
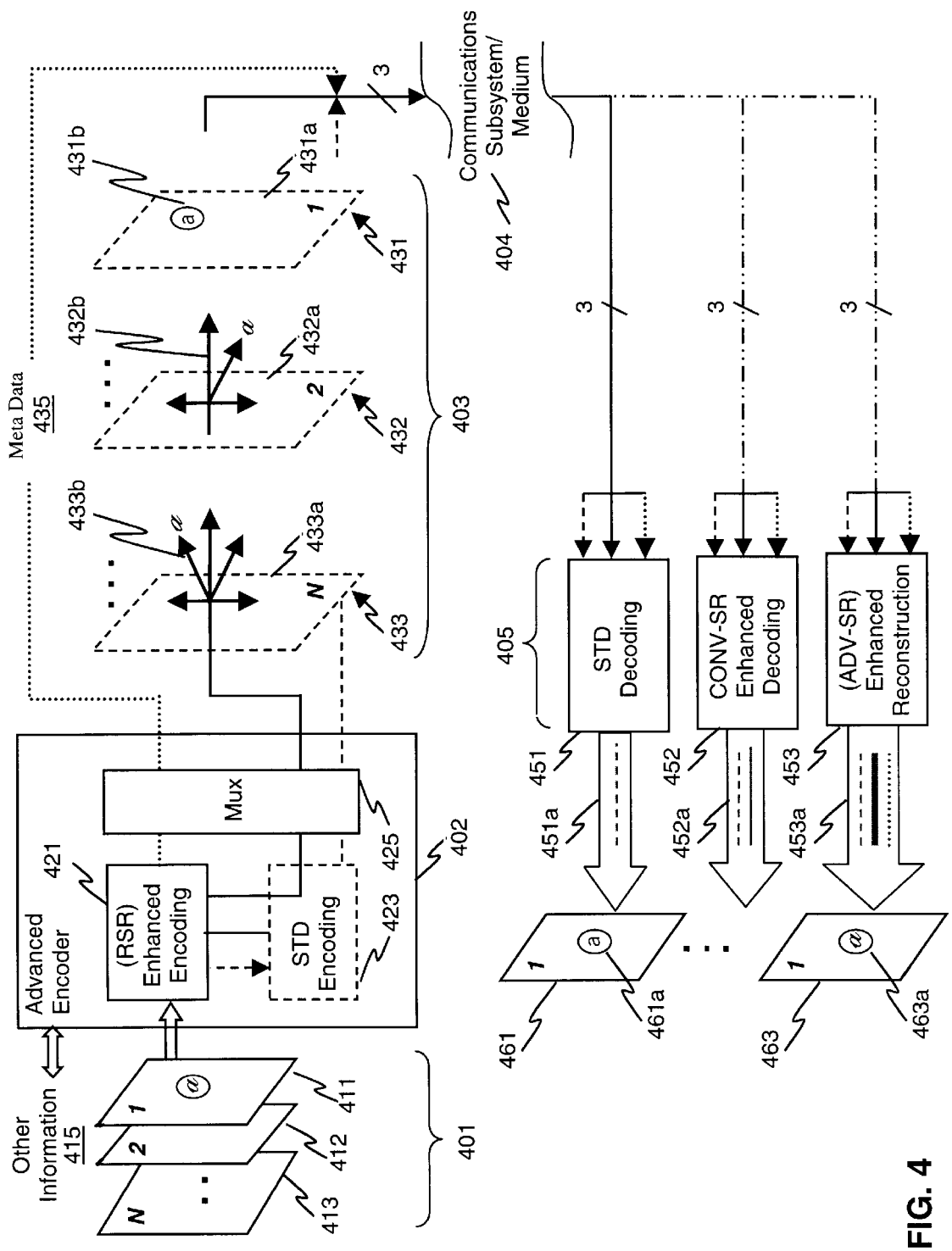
FIG. 4 is a flow diagram illustrating an advanced codec according to the invention.

Accordingly, the FIG. 4 flow diagram broadly illustrates an advanced codec according to the invention. From a broader perspective, codec 400 is configured and operable in a generally consistent manner with the conventional codec 100 of FIG. 1. For example, codec 400 comprises an encoder 402 including a standard-coder 423 and an optional multiplexer or so-called "stat-mux" 425, such that source video signals can be coded as standard-coded video signals (e.g. standard-coded frames). Also consistently with conventional systems, decoder 451 comprises an optional multiplexer, a decode subsystem and a post-processor (not shown), and is operable to receive and reconstruct standard-coded video signals; standard-decoder 451 might alternatively include a postprocessor having a conventional-SR stage (e.g. as with conventional-SR decoder 452). Codec 400 is also capable of conventional operation, whereby the received source video signal 411–413, once coded by encoder 402 into standard-coded video signal 431a–433a, is transferable via communication subsystem 404 to standard-decoder 451 for standard decoding or conventional-SR enhanced reconstruction. (Note that the depicted data merging and splitting are merely used as a diagrammatic simplification to avoid obscuring the discussed data flow characteristics, which can be provided via a separated or combined medium.)

On closer inspection, however, codec 400 differs substantially from the limited configuration, operation and results achievable using conventional codecs. For example, while RSR-coder 421 of advanced-encoder 402 might appear to merely correspond with conventional preprocessor 111 of FIG. 1, RSR-coding actually provides integral coding capability that can include advanced preprocessing type operations according to the invention. However, even a simplified dual preprocessing and coding functionality view does illustrate certain dual-purpose RSR capabilities and advantages. For example, more effective preprocessing-type operations can be facilitated through such RSR capabilities as utilization of additional source information 415 (e.g. prior processing, imaging/capture parameters, user input, etc.); also, more effective image coding can be facilitated by utilization of other information 415.

More preferably, however, RSR-coding forms a part of an advanced encode-subsystem comprising RSR-coding and standard-coding. That is, RSR can be separately implemented and can utilize the above information for dual capability. However, as part of an advanced encode-subsystem, RSR can further utilize non-preprocessed source image data 411–413, coding and application goals and advanced tools among other resources, and is further capable of dynamically projecting an optimized multidimensional source image representation onto a standard-coded image space (e.g. a virtual high-definition grid/space) in a manner that enables low-bitrate coding and quality-improved reconstruction, among other advantages.

Figure 5:
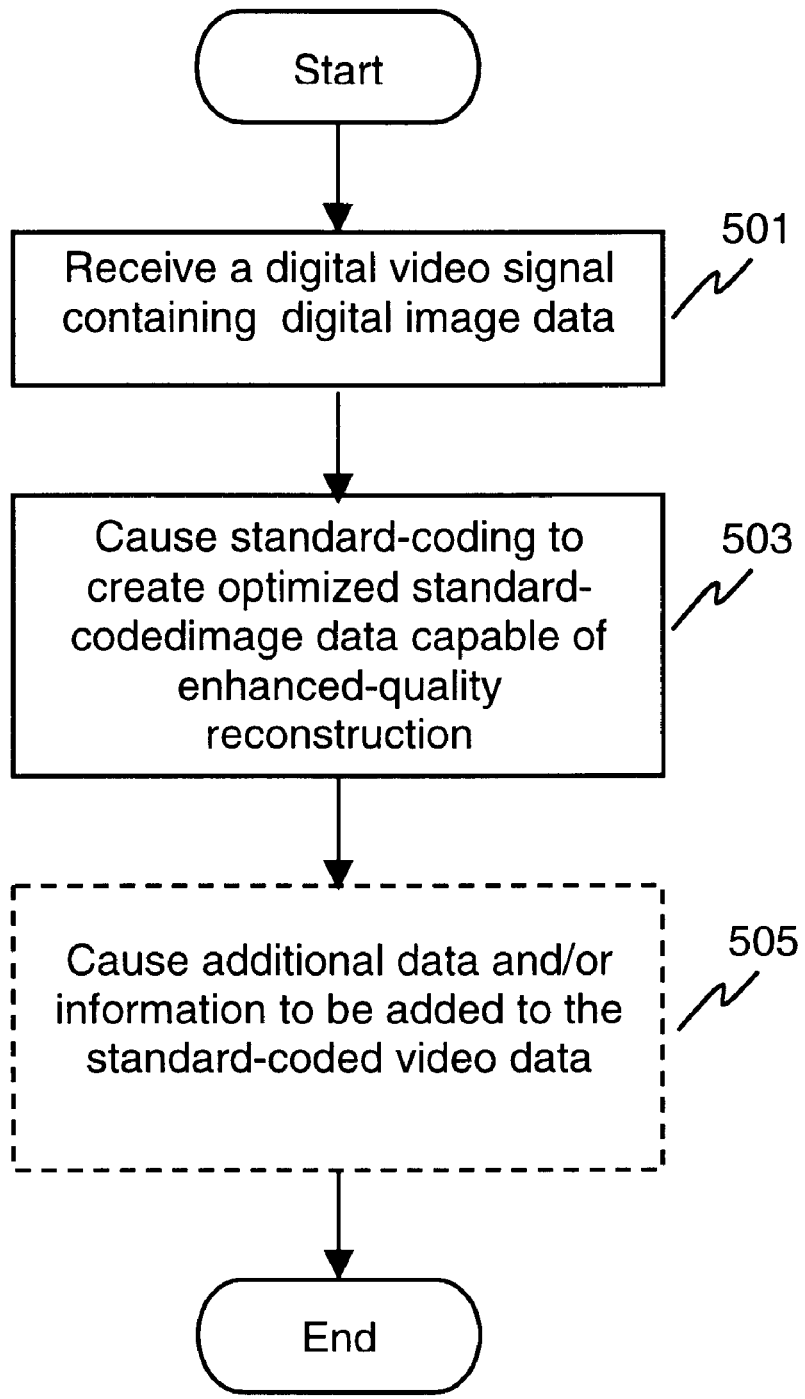
FIG. 5 is a flowchart illustrating an RSR-coding method according to the invention.
Figure 6:
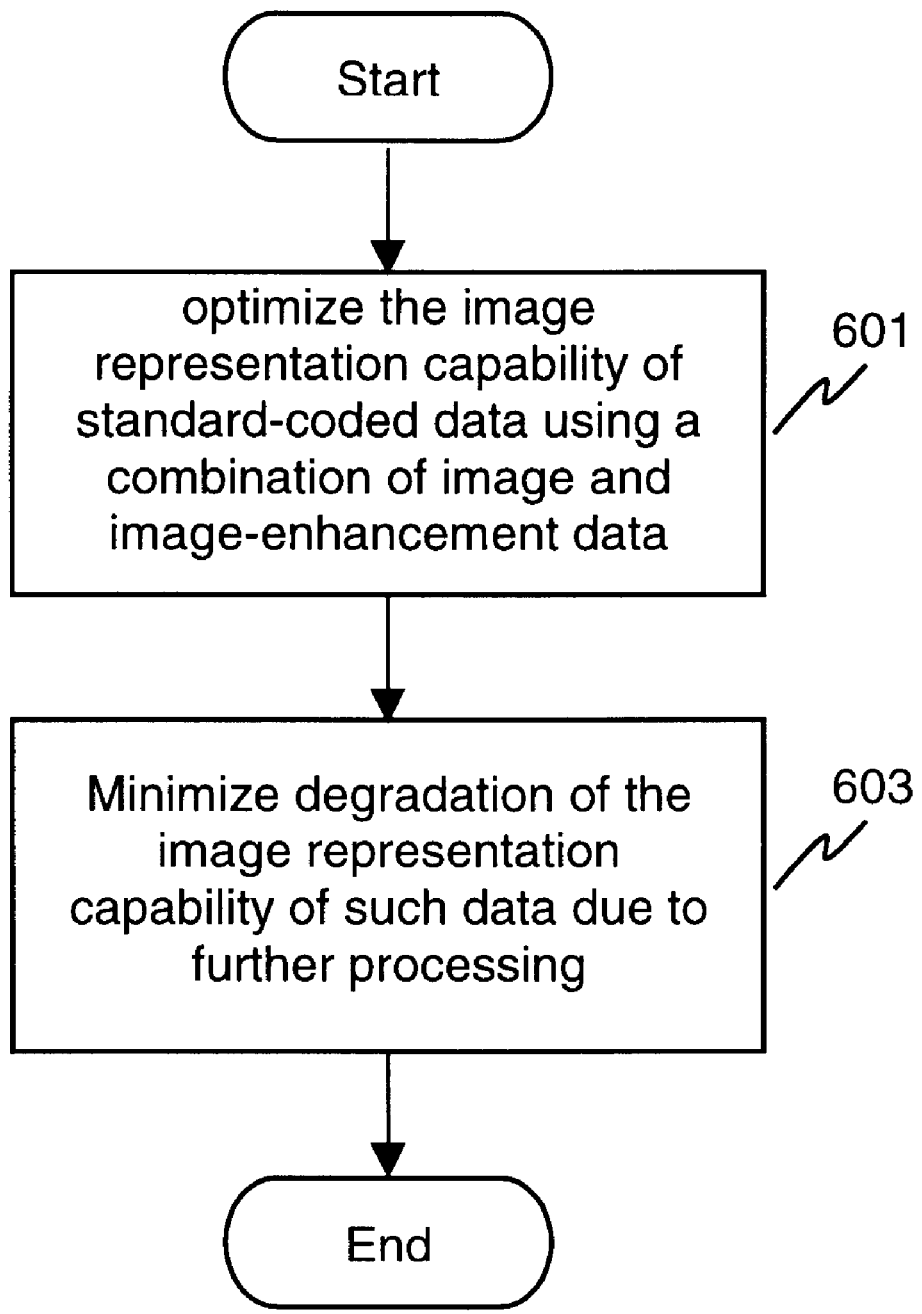
FIG. 6 is a flowchart illustrating a superimposed optimization method according to the invention.

FIGS. 4 and 5 also illustrate how RSR-coder 421 preferably operates in an effectively superimposed manner with standard-coding to provide certain advanced encode-subsystem benefits. For greater clarity, MPEG-2 will be utilized hereinafter as a consistent example of a coding standard unless otherwise indicated. It should be understood, however, that the invention is also applicable to other digital image coding, decoding and/or codec standards, such as H.263, MPEG-1, MPEG-4, JPEG and the generic class of coders and/or decoders capable of utilizing interframe prediction, among others.

As shown, RSR-coder 421 (FIG. 4) preferably receives source image data (step 501 of FIG. 5) and processes the data, transferring the results of such processing to standard-coder 423 and multiplexer 425. Broadly stated, RSR-coding preferably causes standard-coding to create optimized standard-coded image data capable of enhanced-quality reconstruction (step 503). RSR-coding is also capable of supplying additional information (step 505), for example, meta data, that can be used in conjunction with coupled or "RSR-aware" decoder 453 for achieving even further quality-improvement and/or other benefits.

More specifically, RSR-coder 421 preferably operates in accordance with a super-domain model according to the invention. Facilitated by the model (and other aspects of the invention), RSR-coding is not limited to the use of standard coding tools or constructs in processing source image data, as is standard-coder 423. Rather, RSR-coder 421 is capable of processing received source image data in an effectively superimposed and largely independent manner with standard-coder 423. Thus, RSR-coding is capable of using advanced replaceable and modifiable standard and/or non-standard tools, constructs, data types and other capabilities in a manner that is dynamically matched to the particular image being processed and the specific processing results desired. RSR-coding can, for example, utilize such otherwise incompatible tools as MPEG-4 object-oriented coding while causing resulting optimizations to be formed using MPEG-2 standard-coding (e.g. using MPEG-4 to identify excessive prediction error data in using MPEG-2 alone). RSR-coding is also capable of dynamically modifying the use of such tools in order to provide consistent, adaptive and/or otherwise determinable quality levels and/or other features in accordance with particular applications (e.g. broadcasting, variable-bandwidth network imaging and video, surveillance, etc.).

Operationally, RSR-coding tools provide for determining image-representation optimizing modifications of received source image data, which modifications can be integrated within standard-coded data through the operation of standard-coding. Such optimizations can further be directed more "globally" (e.g. where various reconstruction tools might later be used) and/or more specifically at inhibiting and/or facilitating targeted operational aspects of specific reconstruction tools (e.g. where maximizing the effectiveness of targeted reconstruction tools at the expense of assuring standard-quality using a standard-decoder is desirable). RSR-coding can further be used to provide different improvements in conjunction with different reconstruction, such as reducing bitrate requirements of standard-decoding while improving quality and/or operational capabilities of conventional and/or advanced-SR reconstruction, among others.

RSR-coding tools preferably comprise spatial-data modification tools for enhancing characteristics of the represented image itself (e.g. advanced edge detection, object coding, bit-based coding, etc.). In addition, RSR-tools can comprise efficiency tools for causing standard-coding to better utilize available bitrate, frequency spectrum, entropy measure, signal-to-noise ratio, quantization and/or other image aspects (e.g. an advanced predictor) and/or system/application parameters (e.g. periodic high-definition image aspect representation tools). Still further replaceable and/or modifiable tools and/or tool sets can also be used for improving additional desirable coding, reconstruction, processing and/or other characteristics in accordance with various applications.

RSR-coding tools further preferably include diffusion tools according to the invention. Diffusion tools enable spatial data, image enhancing ("enhancement") data and other image and/or non-image aspects to be dimensionally composited within standard-coded image data, typically with little or no resultant bitrate increase, or even resulting in a net bitrate decrease. For example, in FIG. 4, an aspect 431b of frame-1 431 (e.g. a portion of an object "a" that would be conventionally degraded by or would not survive the standard-coding process) has been diffused within frame-2 432 and frame-3 433. Other determinable aspects of image data from one or more "source frames" can also be similarly diffused into a number of sequential and/or or non-sequential "destination" coded-frames, macroblocks and/or other image designations either alone (e.g. as illustrated) or in combination with other aspects of other image designations, as will be further discussed.

RSR-coder 423 is also capable of directly coding image data (i.e. without utilizing standard-coding). Direct RSR-coding can, for example, be used where RSR-coder 421 and standard-coder 423 are highly integrated and/or where direct-coding would otherwise produce sufficiently superior results, among other possibilities. For instance, RSR-coder 421 is capable of directly coding meta data 435 containing additional image data, operational parameters and/or other information. Unlike diffused data, adding meta data enables improved performance by discretely adding information, and thus, increasing net bitrate. However, such increased bitrate can be minimized, for example, using corresponding diffused information and/or advanced-codec conventions (e.g. constructs). As with other data produced by advanced-encoder 402, meta data 435 can also be stored, transferred and/or otherwise processed in a manner generally applicable to digital data.

For clarity, "meta data," as used herein, refers generally to the use of side data, meta data, data layering and/or other data-adding techniques, such as those taught by co-pending application Ser. No. 60/096,322. Conversely, diffusion refers to compositing within image data and/or constructs as specifically noted, for example, in Ser. No. 60/096,322 with regard to pixel-shifting and in other aspects, and in the discussion that follows.

Continuing with FIG. 4, following completion of optimization modifications, RSR-coder 421 preferably transfers the image data, including such optimizations, to standard-coder 423. Standard-coder 423, while operating in a conventional standard-complaint manner, nevertheless creates optimized standard-coded data from the received image data. The standard-coded data can then be stored, transferred, decoded, displayed or otherwise processed in a conventional manner. (RSR-coding in conjunction with standard-coding will also be referred to as "superimposed optimization" in the discussion that follows.)

As shown in the bottom portion of FIG. 4, the specific results produceable via reconstruction of the above standard-coded data will typically vary depending on the superimposed optimization and reconstruction tools utilized. However, one advantage enabled by the invention is that superimposed optimization can produce standard-coded data that is capable of both enhanced-quality reconstruction (e.g. using one or more enhanced-decoder types) as well as standard-quality reconstruction using standard-decoders. More generally, standard and enhanced quality and/or other capabilities can be made available in a determinable manner to different reconstruction types in accordance with particular system configurations and/or application goals.

As illustrated for example, standard-decoder 451 utilizes only frame data (depicted by a dashed line in output 451a) and, when displayed via a display system (not shown), such decoding produces standard-quality image 461. In contrast, conventional-SR decoder 452 further utilizes an amount of image-enhancement data (depicted by a solid line in output 452a) producing an image containing an improved-quality object "a" 431b. Finally, advanced-SR decoder 453 according to the invention is capable of more effectively utilizing image and enhancement data than conventional-SR and can also utilize meta data (depicted by the dotted line in output 453a). Therefore, the quality of object 463a within image 463 can be improved more than by standard decoder 451 or conventional-SR decoder 452 (e.g. up to 25 to 30 percent or more quality improvement and/or bitrate reduction is expected as compared with an MPEG-2 codec alone, given even the below discussed determinable redundancies observed within typical MPEG-2 coded-data alone). Advanced-SR decoder 453 is also capable of providing further quality improvements and/or other benefits, as will also be discussed in greater detail.

Figure 7:
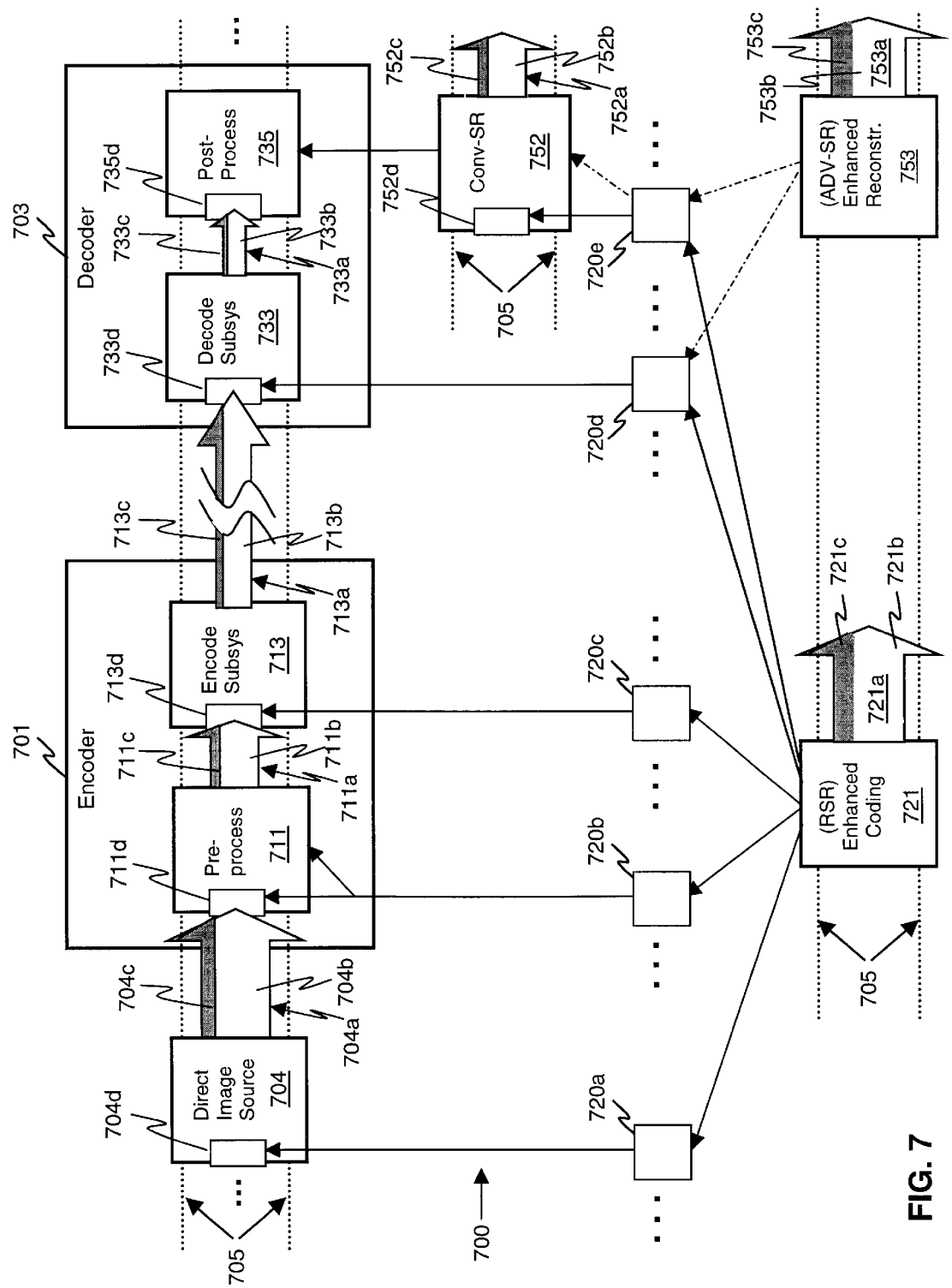
FIG. 7 is a detailed flow diagram illustrating how advanced coding and decoding aspects according to the invention can be added to a conventional codec and certain data flow and image representation effects resulting from such addition.

Turning to FIGS. 6 through 16, superimposed optimization and other aspects of the invention will now be discussed in greater detail. Beginning with FIG. 6, superimposed optimization can be most easily understood as optimizing image representation capability of standard-coded data using a combination of image and image-enhancement data, in step 601 and minimizing degradation of the image representation capability of such data due to further processing within conventional codec stages and (optionally) other elements of a larger system 600 in step 603. In FIG. 7, the superposition of RSR-coding with standard-coding is illustrated in greater detail, such that the combination of image representation optimization and loss minimization can be better understood.

Figure 1:
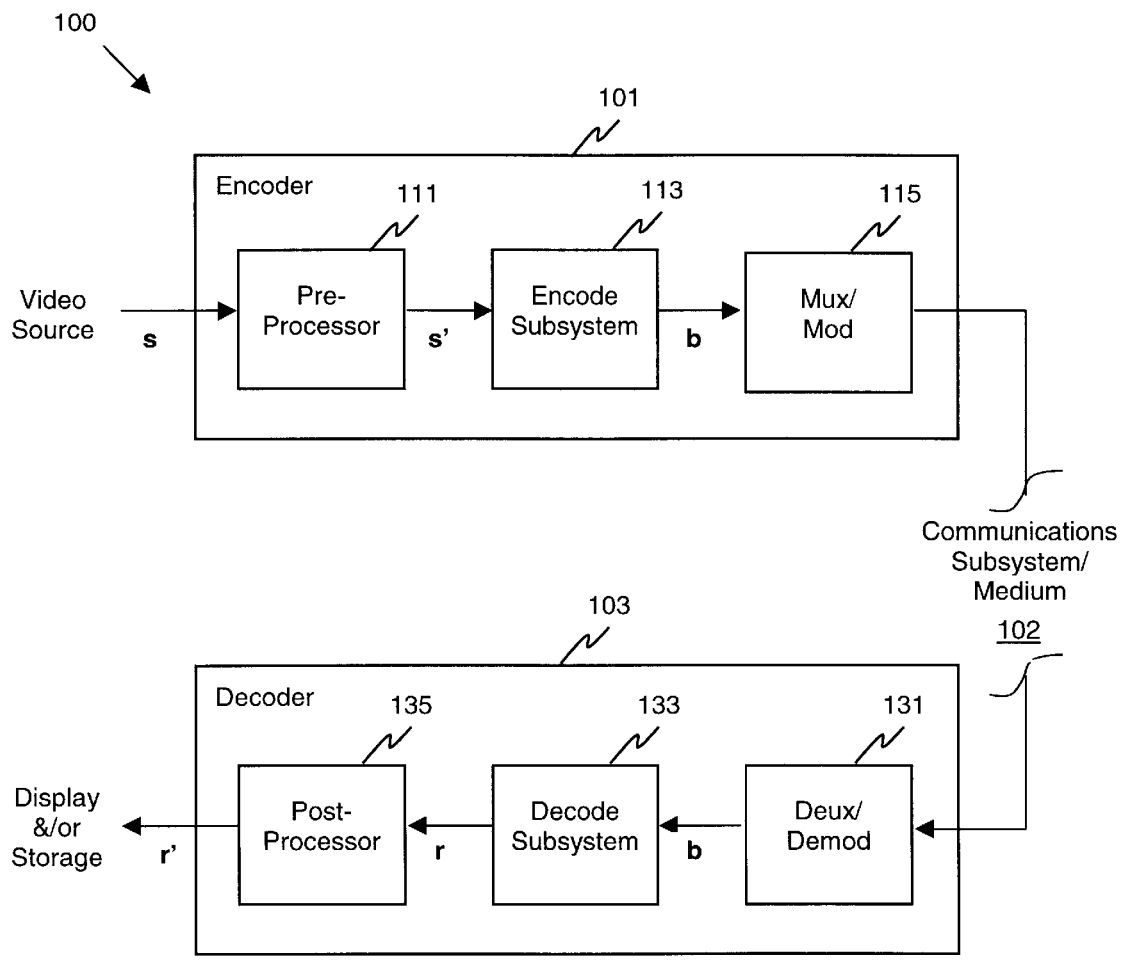
FIG. 1 is a functional diagram of a prior art digital video codec.
Figure 2:
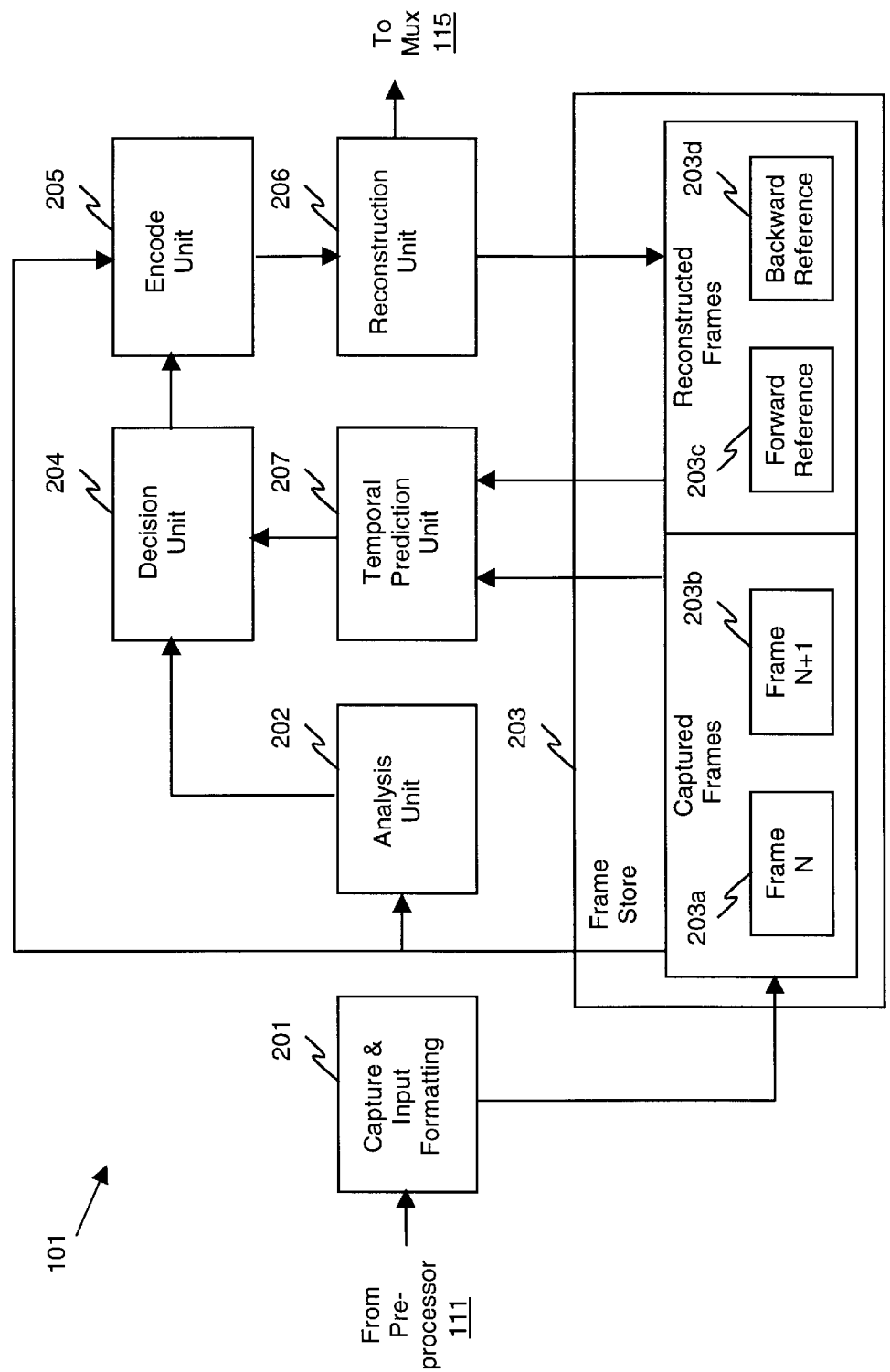
FIG. 2 is a block diagram illustrating an encode subsystem of the codec of FIG. 1 in greater detail.
Figure 3:
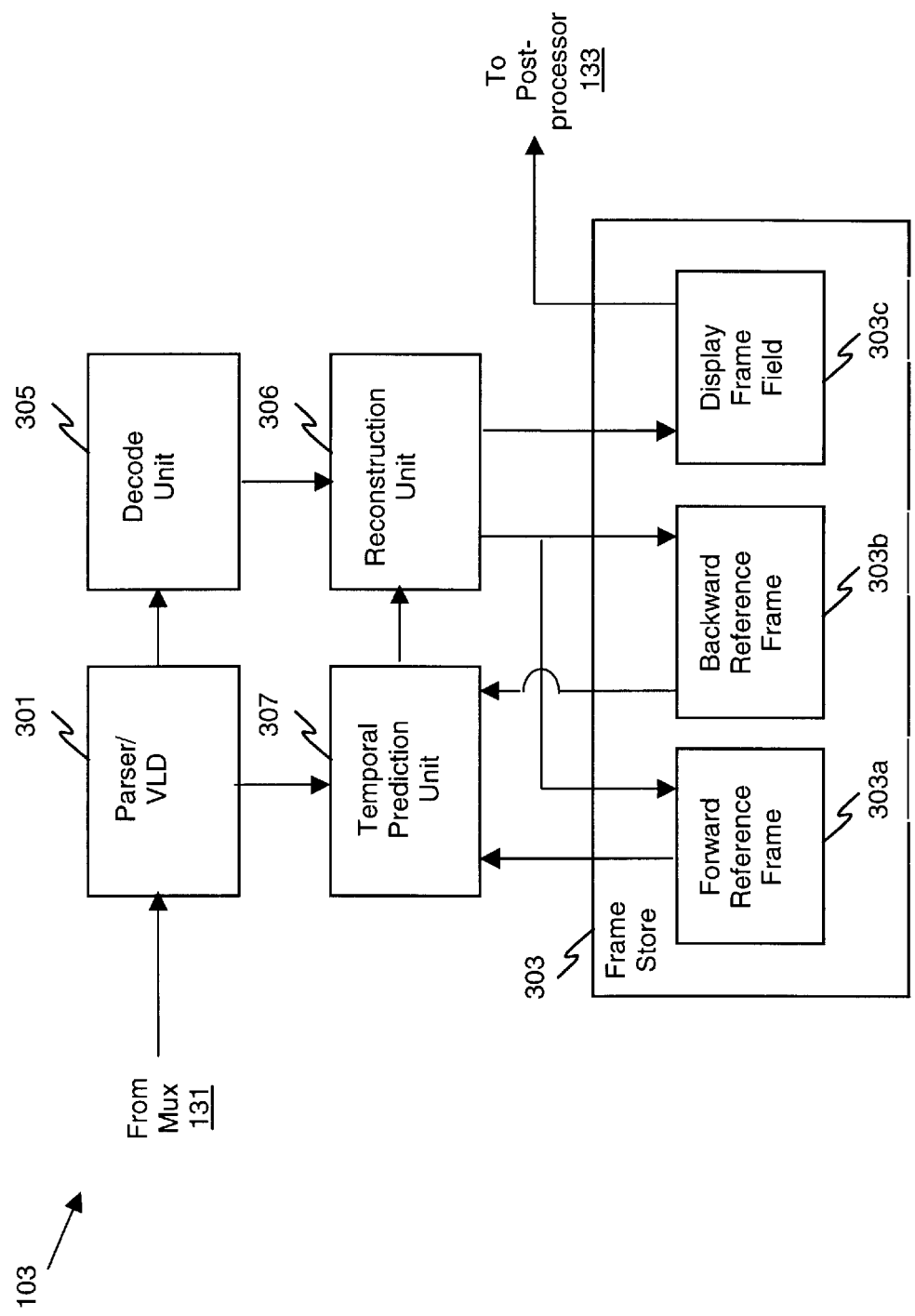
FIG. 3 is a block diagram illustrating a decode subsystem of the codec of FIG. 1 in greater detail.

For clarity, the numbering conventions used in FIG. 7 correspond with those used for the standard-codec of FIG. 1 and the advanced codec of FIG. 4. Relative signal flow from each element is also correspondingly numbered along with letter designations wherein "a" indicates overall data, "b" indicates spatial image data and "c" (i.e. darkened areas) indicates enhancement data. In addition, the thickness of each arrow indicates a relative amount of data (or image representation capability) and "d" indicates degradation or "impeded representation capability" which, for simplicity, has been localized at the input of each element.

Beginning with the top portion of FIG. 7, it is observed that each image processing element in a conventional digital video system 700 (e.g. capture, codec, display processing, etc.) will typically cause some degradation of the system's ability to reproduce a visually observed (i.e. real-life) scenario. Conventional imaging/capturing and potential pre-encoding processing 604 are subject to degradation from factors such as digitization resolution limitations, camera jitter and blurring due to relative camera-and-object movement, among other factors. In addition, given the current technological impracticalities of maintaining a complete coded spatial representation (e.g. using infinite-resolution intra-frame coding), both the preprocessor 711 and standard-coder 713 of encoder 703 utilize substantially mechanically-applied standard compression/coding tools and constructs (e.g. macroblock frame-coding) that are further found to degrade the original image representation. Worse yet, decode subsystem 733 and postprocessor 735 are also found to inefficiently utilize received spatial image data 613*b* in conducting reconstruction.

Conventional-SR 752 is capable of utilizing not only the spatial image data, which is exclusively used by standard-codec 701 and 703, but also certain enhancement-data 733*c* that has been found to exist within the reconstructed data 733 produced by standard decoder 703. However, the quality-enhancing and functional results achievable using conventional-SR are observed to be not only unpredictable and inconsistent, but also perceivably so, such that resultant artifacts (e.g. image portions degraded due to the use of conventional-SR) can often be more distracting than without conventional-SR. Several factors are found to contribute to such deficiencies. For example, it is discovered that the enhancement data utilized by conventional-SR is merely the fortuitous byproduct of standard-coding, which neither intentionally utilizes nor can be relied upon to incidentally provide a consistent source of useful enhancement data or further discovered enhancement data types. It is also discovered that, much like standard-encoding and decoding, conventional-SR 752 also inefficiently utilizes even the available data. That is, even assuming that conventional-SR might receive an optimal combination of spatial and enhancement data, conventional-SR is found to effectively impede efficient enhanced-reconstruction, among other examples.

As shown in the middle portion of FIG. 7, it is discovered that, by preferably creating an advanced encode-subsystem enabling superimposed coding, integrated processing, downsampling and other capabilities in accordance with system constraints, lower-bitrate and/or more accurate image reproduction can be provided. More specifically, using superimposed coding, an optimized combination of spatial and enhancement data can be provided, as indicated by advanced-codec blocks 720*a*–720*b*, and each source of image representation degradation can be minimized, as indicated by blocks 620*c*–620*e*. Thus, not only can the capability to reconstruct an image be improved, and with lower-bitrate, but the operation of various and/or specific reconstruction tools can also be facilitated. In addition, the present invention is found to be a practical solution that, rather than replacing imaging, image capturing and pre-encoder processing technology, instead enables improvement of the results achievable in conjunction with both conventional and emerging imaging technologies. As will become apparent, the invention also enables coordination of such technologies with coding, processing and/or various reconstructions, for example, to provide greater system responsiveness to user interaction, real-time capturing and/or display, among other potential uses. (Those skilled in the art will also appreciate that certain optimization capabilities according to the invention can also be integrated within and/or utilized cooperatively with conventionally pre-encoder capture/imaging devices, for example, to facilitate coding and/or to supply optimized data to such a device.)

As illustrated in the bottom portion of FIG. 7, it is further found that most optimization and degradation prevention can actually be better accomplished during encoding. Those skilled in the video codec arts will appreciate in view of the teachings herein that degradation due to standard codec elements can be anticipated and compensated for using such conventional analysis methods as simulation/emulation and extrapolation, among others. Those skilled in conventional-SR will further appreciate that similar methods can also be applied to identify and compensate for conventional-SR degradation as well. In addition, efficient degradation compensation is also discovered to be achievable through the use of feedback and other methods according to the invention. However, depending on processing constraints (e.g. accuracy, bitrate, enhancement-level, iteration required, etc.), image complexity and available processing resources, it is expected that a combination of these and other methods might provide the most robust performance for a given system. For example, advanced-SR reconstruction (e.g. replacing conventional-SR) can also be used in a static, dynamic, distributed and/or cooperative manner with coding and/or other system 700 elements to achieve a more optimal combination of accuracy and robust performance.

Figure 8:
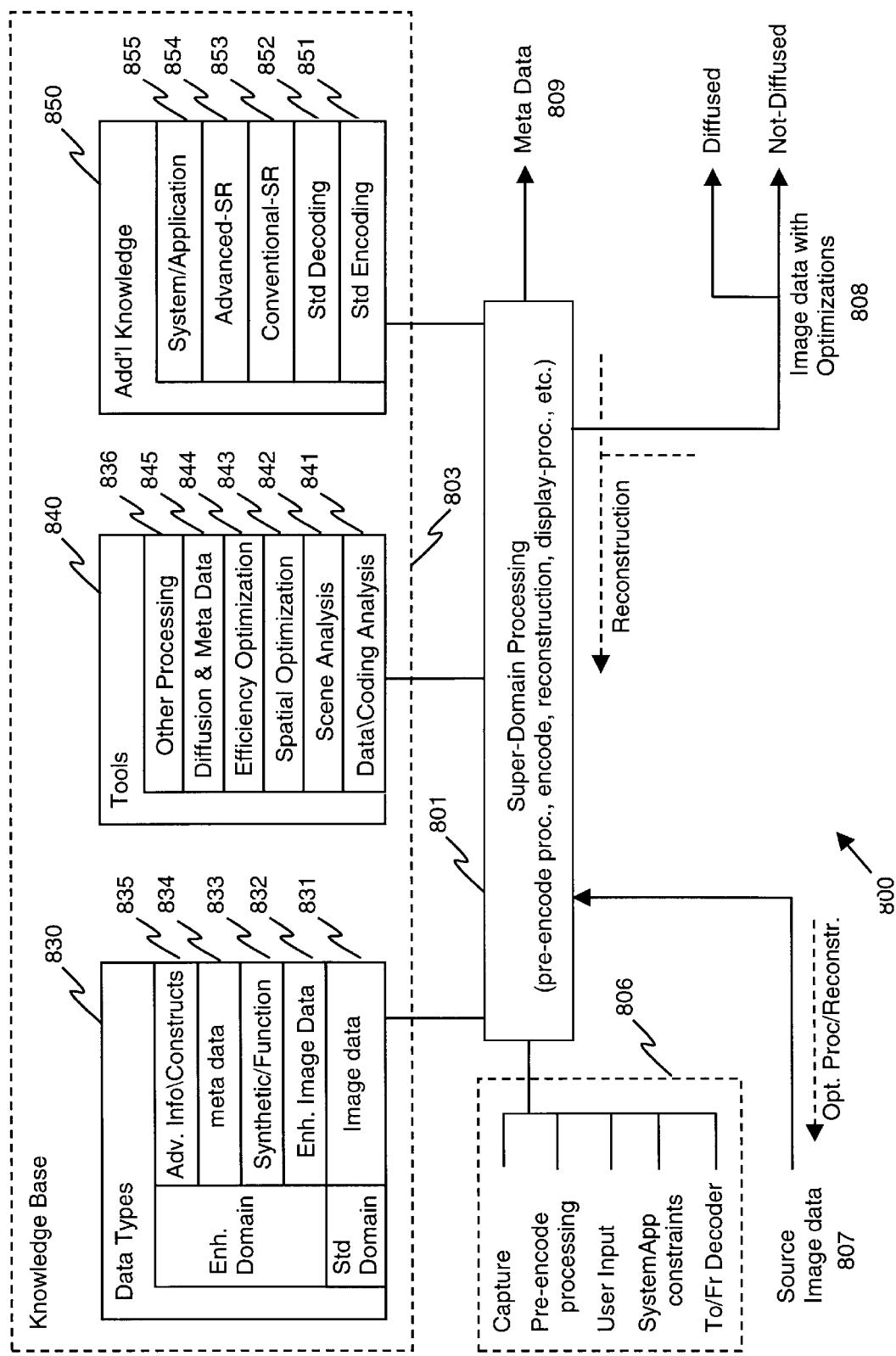
FIG. 8 is a flow diagram illustrating a super domain model according to the invention.

Continuing with FIG. 8 with reference to FIG. 7, image representation optimization, degradation minimization and other capabilities enabled by the invention are facilitated by the discovery of a more complete image space or "super-domain," only a small portion of which is known and utilized by conventional codec technology. Within the super-domain, conventional tools, constructs and data types are merely resources within a limited standard domain (portion of the super-domain) that can be used to convey image representations. Using a super-domain model, however, RSR-coding and advanced reconstruction can determinably utilize conventional standard-domain resources as well as other resources within the broader, more complete super-domain.

The super-domain model 800 of FIG. 8, for example, comprises super-domain processing 801 and a knowledge base 803 including data types 830, advanced tools 840 and additional knowledge base information 850. While the illustrated tools are directed more specifically at RSR-coding (for explanatory purposes), it should be understood that corresponding and other knowledge base elements can also be provided to facilitate advanced decoding as well. For example, reconstruction tools might simply be added such that coding, reconstruction and/or other operations might be cooperatively conducted through advanced encoding and advanced decoding. In other systems, tools, data and/or additional knowledge might be altered, simplified and/or replaced to perform advanced reconstruction in a more conventional type capacity, among other examples. (While directional arrows are provided for greater understanding of certain operational capabilities in this and other examples, those skilled in the art will appreciate that, in certain cases (e.g. providing optimized data to an input device), alternative data flow utilization is also expected in accordance with the teachings herein.)

Operationally, super-domain processing (i.e. in this case, RSR-coding) preferably receives and processes source image data 806 in accordance with any further-received additional information 806 and utilizing data types 830, advanced tools 840 and additional knowledge 850 to produce optimized image data 808 and meta data 809. In a similar manner, an advanced-decoder preferably receives and processes data types 830 using advanced reconstruction tools and additional knowledge 850, such that an effectively complete superimposed coding, data transfer and reconstruction space can operate substantially within but also as a largely independent "superimposed overlay" to that provided by conventional codecs. Distributed and/or cooperative functionality can also be provided in a similar manner (e.g. a digital display device incorporating RSR and/or advanced SR and/or otherwise consistent with the teachings herein).

More specifically, conventional codec and other system 700 (FIG. 7) elements use essentially standard-domain tools to manipulate standard domain data in a substantially mechanical manner with an "awareness" or knowledge base only of their particular function in processing particular data. For example, standard-coding uses received image data 831 to construct strictly-defined standard-coded data, and, in a separate but strictly matched opposite process, standard-decoding reconstructs whatever compliant-coded data it receives. Similarly, conventional-SR merely processes whatever standard-codec output it receives in an essentially isolated manner, and most likely in a real-time decode-and-display environment. RSR-coding and advanced-reconstruction, however, can apply advanced tools (e.g. 841–846) and utilize optimal combinations of diffused (e.g. 831–833), meta data 834 and advanced construct-conveyed data 835 in accordance with additional information 806, conventional codec (e.g. 851–853), superimposed processing (e.g. 854) and system/application 855 awareness to more effectively process and convey image and other information 831–835. As might therefore be expected, advanced codec exploitation of certain enabled results can be curtailed by inclusion of standard and/or conventional-SR decoding. It is discovered, however, that aspects of the invention can also be used to provide "adaptable" data and other capabilities in systems supporting targeted multiple reconstructions, as well as where varied reconstructions might be utilized (e.g. the above-discussed global and/or reconstruction-directed encoding).

Figure 9A:
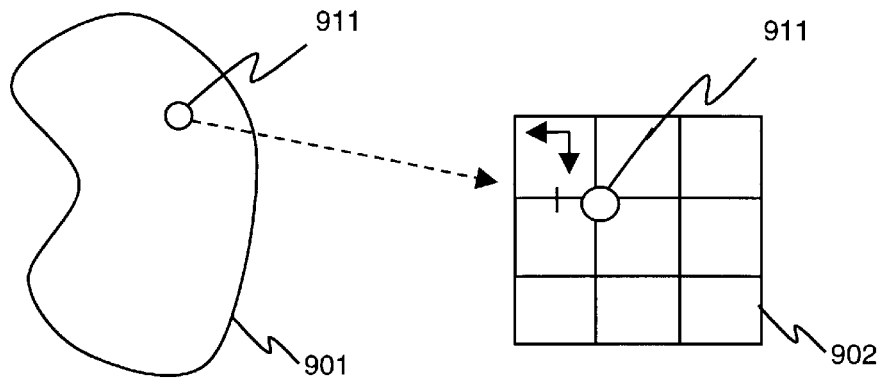
FIG. 9a illustrates how a source image is conventionally mapped to a lower resolution grid during encoding.
Figure 9B:
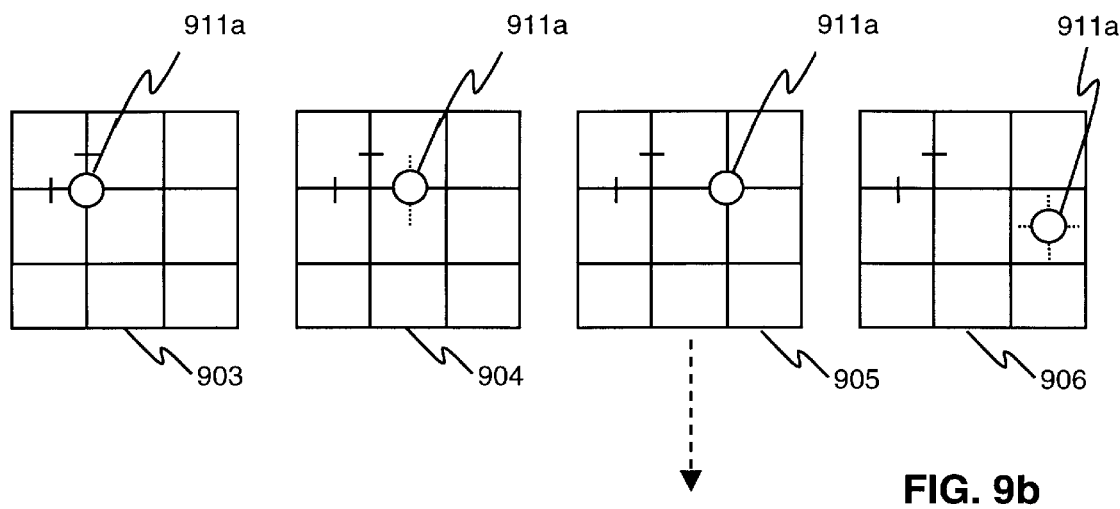
FIG. 9b illustrates how spatial diffusion according to the invention can be used to replace redundancy inefficiencies found to exist as a result of conventional encoding.

FIGS. 9a and 9b, for example, illustrate a spatial form of diffusion in accordance with the pixel-shifting capability taught by the above referenced co-pending applications. Beginning with FIG. 9a, during conventional downsampling, a sequence of high definition images are typically re-sampled to a lower-definition image with respect to a lower definition sample lattice or grid. Depending on the subpixel relationship (e.g. position) of the higher definition pixels to the lower definition grid, different portions of the high-definition images (e.g. portion 911 of image 901) are retained, while other portions are either discarded or blended with surrounding pixels. For example, in MPEG-2, the ½ pixel accurate inter-frame predictor attempts to resolve each pixel of a prediction block with subpixel precision. MPEG-2 attempts such resolution by modeling the prediction block as a average of samples in a 1, 2, or 4 sample neighborhood (i.e. depending upon the 2-dimensional x-y ½ pixel offset position indicated by the motion vectors transmitted for each prediction block). The MPEG-2½ pixel model establishes a simple relationship between the prediction filter and position. (While it is found that the image portions discarded by conventional subsampling can affect one or more aspects of an object, such as frequency components, quantization precision, or whole samples, translation aspects will first be considered as a more understandable example.)

As illustrated in FIG. 9b, it is discovered that the natural translational movement of an image portion within a sequence of frames will often result in redundant retention of the same portions of an image. For example, where subsampling is accomplished by dropping whole samples (i.e. "critical subsampling"), movement of image portion 911 during a sequence of frames 903–906 will place portion 911 over a pixel in frames 903 and 905, causing image portion 911 to be retained twice while, for example, the area surrounding portion 911 is discarded twice. Image portion 911 will also be retained (abet with an offset indicator) and the area surrounding portion 911 will similarly be discarded yet a third time in frame 904. For example, the same respective large frame portions are often found to be repeatedly retained and discarded at MPEG-2 intra-frame refreshes, with respect to inter-GOP frames and non-sequential close proximity frames, and as a result of inconsequential image permutations being-misinterpreted as wholly new image data, among other examples. Therefore, it is found to be more desirable to model an object more precisely using greater subpixel accuracy, for example using more complex filter designs and including statistical aspects and/or warp parameters. By doing so, an object's position with respect to the sample lattice (e.g. subpixel offset) will retain and discard or blend different parts of an image portion (e.g. object), resulting in a different subsampled image portion representation (e.g. via high-definition to standard-definition projection) and other respective image aspects useful to enhanced definition reproduction.

Figure 9C:
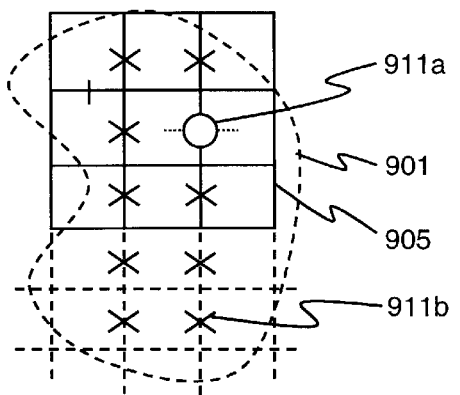
FIG. 9c illustrates results that can be achieved utilizing spatial diffusion according to the invention.

As shown in FIG. 9c with reference to FIGS. 8 and 9b, spatial diffusion enables a maximum amount of spatial image, enhancement and/or other data (e.g. 831 and 832 of FIG. 8) to be preserved. Preferably, spatial diffusion is conducted with reference to each object in a sequence of frames and, more preferably in accordance with dynamically implementable coding and/or application goals. For example, edge-detection can be utilized to determine objects within each image in a sequence of frames. While the objects themselves might be used for further diffusion processing, a reliably identified portion of each object (e.g. image portion 911) can be more efficiently identified as indicative-of the relative object-to-grid positionings or optical path with each of the successive frames. Redundant image portion positionings can then be identified (e.g. as with frames 903, 905 and, with offsets, frame 904). Next, for example, all but one of the redundant positionings can be shifted (e.g. as shown in FIG. 9c) such that the shifted positionings convey different spatial information with regard to the image portion (e.g. object 901) as well as other portions similarly positioned relative to the grid (e.g. 911b).

The choice of which positioning to shift and the direction the image is shifted can be determined with respect to various super-domain model resources, such as those noted above. For example, depending on various system/application constraints (855 of FIG. 8) and knowledge of standard-coding 851, positionings can be selected to generate less prediction error data when standard-coded, in accordance with entropy considerations, in support of one or more specifically and/or potentially used reconstructions (e.g. standard 852, conventional-SR 853, advanced-SR 854) and/or in conjunction with other modifications utilizing other data types 830 and/or tools 840. Proximate and/or overall positioning coordination can also be utilized, for example, by comparing potential positioning combinations (e.g. to avoid perceivable artifacts due to optical path alteration and/or for optimal data minimization). Static alterations (e.g. same overall or repeated pattern selection and/or direction) or dynamic alterations (e.g. per object aspect, object group aspects and/or changing system constraints as to such aspects) can also be utilized, for example, to reduce computational requirements.

Typically, changes induced through spatial (and other) diffusion are sufficiently small as to go unnoticed, for example, when using standard-decoding. However, a consistent or "smooth" path in accordance with the un-altered optical path characteristics can also be utilized and further diffused characteristics, meta data 834 and/or advanced constructs 835 can also be utilized (e.g. with advanced-reconstruction) where greater accuracy image reproduction or permutation is desirable.

It should be noted that, while redundancies have been described with respect to translational image characteristics, spatial diffusion is applicable to any spatial image characteristic that can be identified with respect to image representations. For example, if, according to some standard, an image is described in terms of a dynamic effect (e.g. rotational aspect) being applied to a static aspect (e.g. a spatial pattern that is being rotated), the invention enables redundant applications of that aspect (e.g. determinably sufficiently similar or below-threshold rotational orientation) to be identified and modified such that greater information is conveyed and/or preserved. For example, in an appropriate standard, patterns and textures, rotation, deformation, perspective, depth, process and/or other aspects can all be candidates for spatial diffusion.

Diffusion is further not limited to pixel-shifting or even other spatially-oriented image characteristics and diffusion need not be applied to objects. Rather, since each image characteristic or "aspect" might be directly or incidentally degraded where standard-coding is utilized, diffusion is found to be applicable to all determinable image representation and coding-modified characteristics. For example, the frequency content, resolution, quantization accuracy, texture, precision of movement and multi-channel disparity (e.g. with multi-camera images, 3-dimensional model captured and/or artificially-generated elements, editing/broadcast, other multimedia, etc.), which might also be degraded during standard-coding, can also be preserved using diffusion. Further, diffusion is applicable to any discernable image portion and/or other aspect that can be tracked through more than one image representation (e.g. frames, objects, 3-dimensional representations, coordinated multiple-image perspectives, one or more pixels, etc.) that might be utilized by and/or created by a particular coding standard.

Figure 9D:
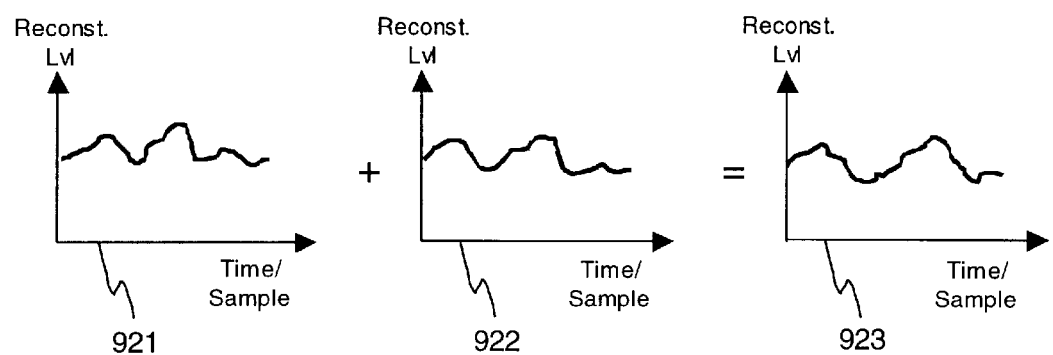
FIG. 9d illustrates quantization diffusion according to the invention.

For example, FIG. 9d illustrates quantization diffusion according to the invention. In the figure, the increasing vertical axis of graphs 921 through 923 indicates increasing reconstructed level while the increasing horizontal axes indicate increasing time, or equivalently, sample index.

As shown, graph 921 depicts a reconstructed first quantized approximation of an image portion, graph 922 depicts a reconstructed second quantized approximation of the same image portion and graph 923 depicts the combination or "fusion" of the graph 921 and 922 quantized approximations. Using quantization diffusion (e.g. compositing the quantization or of graph 922 or further quantization information within frames preceding and/or following that of graph 921), the additional quantization information can be preserved. Thus, for example, two sets of data (e.g. intra frames/macroblocks) can be conveyed (e.g. graphs 921 and 922) wherein each sample is quantized according to a finite scale such as 8 bits or 256 levels ranging from 0 to 255. Then, during reconstruction, the two datasets can be fused, for example, using meta data and/or advanced constructs to indicate the graph 921 and 922 methods and to identify the respective frames/macroblocks to form the more precise quantization given by graph 923. For example, a greater quantization level accuracy can be expressed by averaging the graph 921 and 922 values, enabling non-standard quantization levels (e.g. 0.5, 1.5, 2.5 . . . 255.5) to be used and effectively adding an extra bit of precision to the available quantization dynamic range. (Note that averaging is but one example of the numerous modification operators, functions or transformations that can be utilized for data fusion.)

Figure 9E:
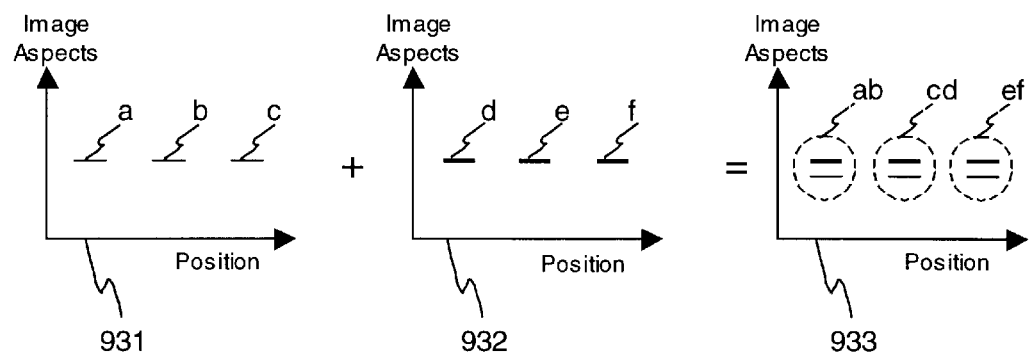
FIG. 9e illustrates temporal diffusion according to the invention.

FIG. 9e further illustrates an example of temporal diffusion according to the invention. In this example, the vertical axis of graphs 931 through 933 generally indicates aspects (e.g. spatial, frequency, signal-to-noise, depth, etc.) of an image portion while the horizontal axes indicate differing positions of an image portion. Graph 931 depicts an aspect of a first image portion of a first image (e.g. an object within a first frame), while graph 932 depicts a different representation of that aspect as diffused within a second image (e.g. the same aspect of the same object within a different frame). Graph 933 depicts the temporal fusion of the graph 931 and 932 representations. Temporal diffusion can, for example, be used to represent an aspect of image portions in accordance with a quality level variation over time. By providing such a time-varying quality condition, a sufficient variation can be provided (during reconstruction) in accordance with a human visual system model. Thus, when viewed, the human visual system will map or project the higher quality portions of the object onto the lower quality portions of the same object at a different points in time (e.g. as with aspect combinations ab, cd and ef depicted in graph 933.

Figure 10A:
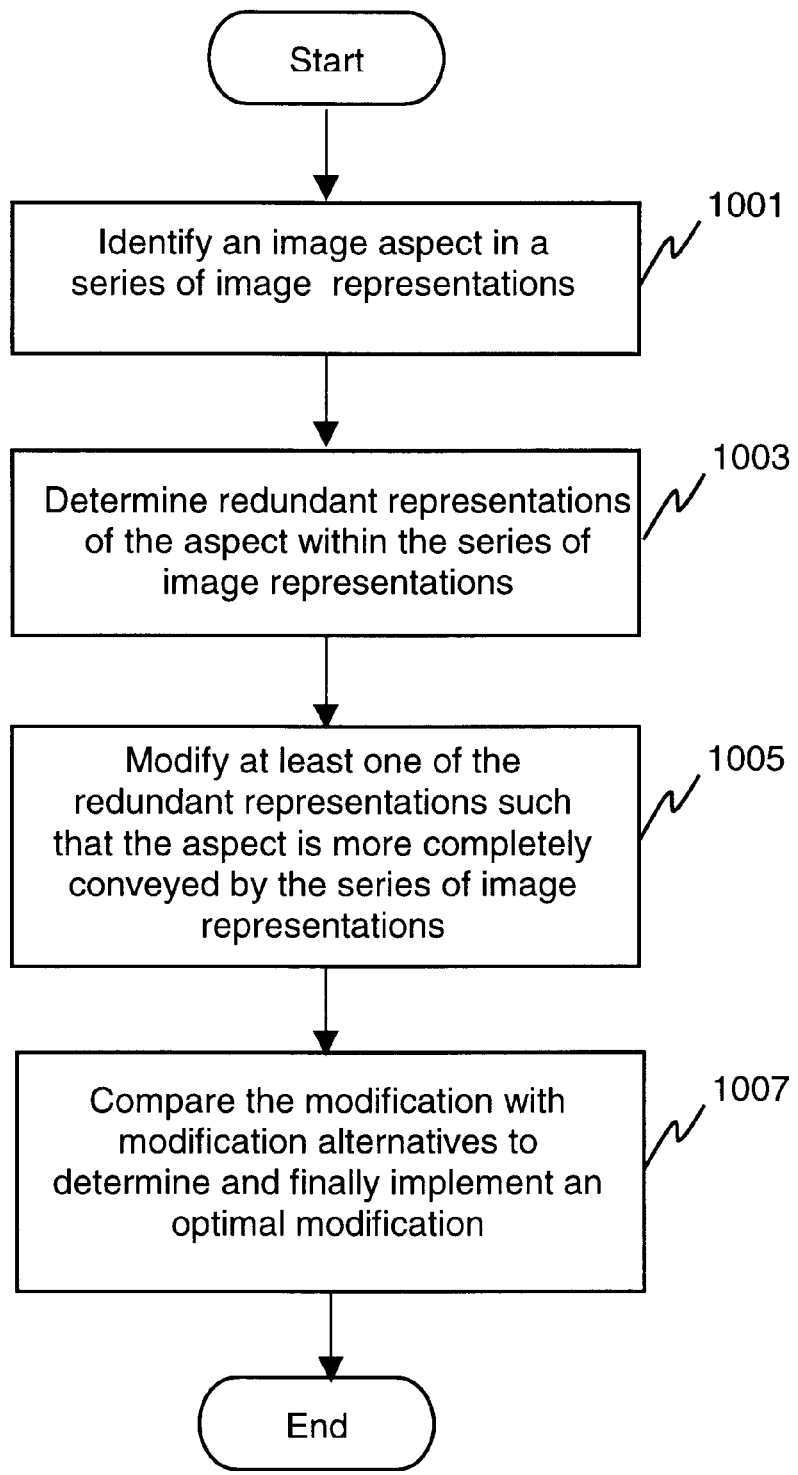
FIG. 10a is a flowchart illustrating a diffusion method according to the invention.

Thus, diffusion more preferably enables a maximum amount of image information with respect to an image aspect to be composited within coded image representations according to the preferred diffusion method of FIG. 10a. As shown, in step 1001, an image aspect is identified in a series of image representations (i.e. more than one image or image-component representation). In step 1003, sufficiently similar or "redundant" representations of the aspect within the series of image representations are identified (e.g. producing largely the same perceivable effect, in accordance with a application/system constraint, constraint threshold, etc.). Finally, at least one of the redundant representations is modified such that the aspect is more completely or better conveyed by the series of image representations, in step 1005. As noted, however, modification is more preferably conducted in accordance with the above-mentioned and/or other coding and/or application goals. Therefore, in step 1007, the modification is preferably compared with other modification alternatives to determine an optimal modification (or modification combination), and the optimal modification is finally implemented.

Figure 10B:
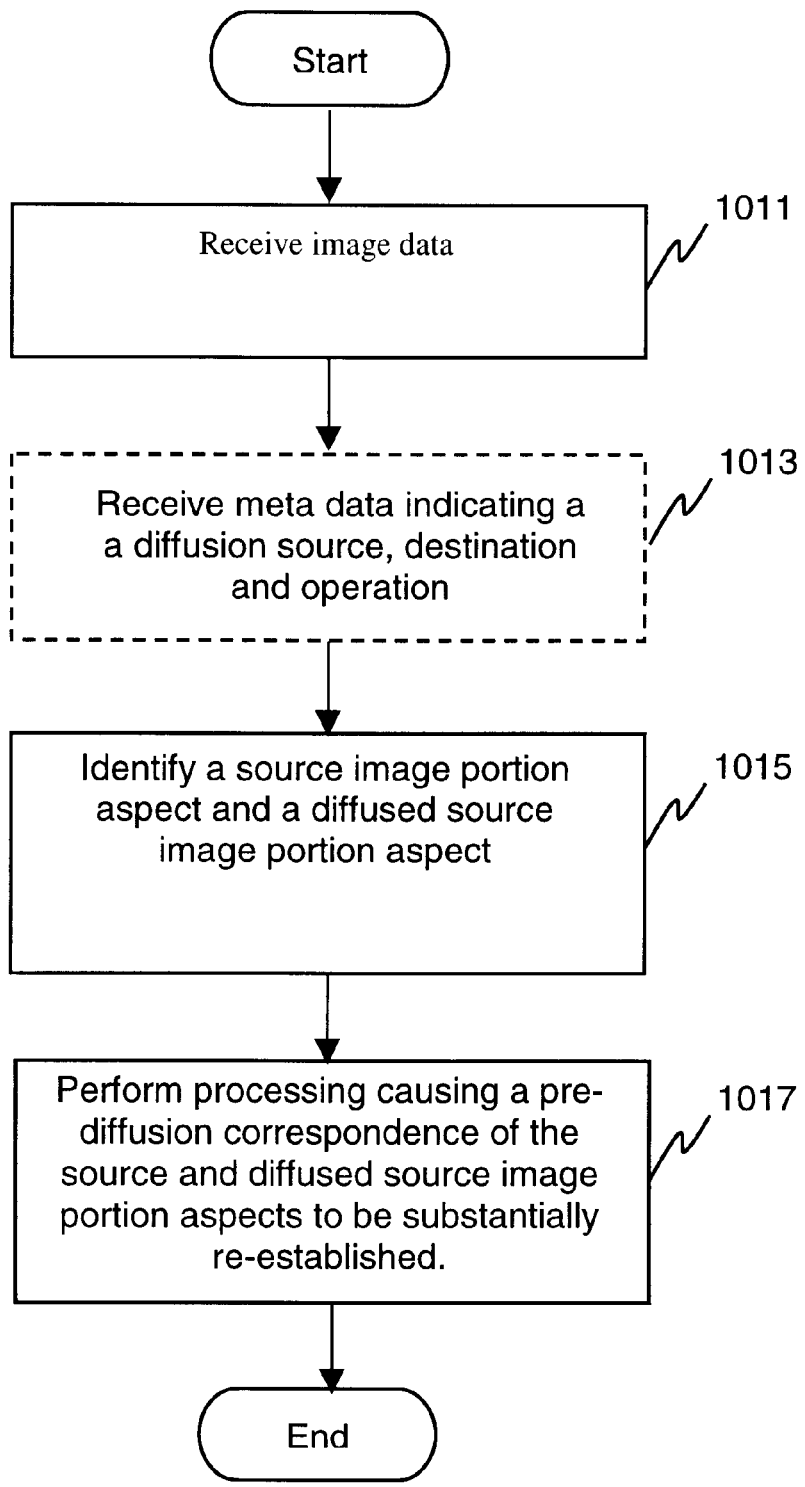
FIG. 10b is a flowchart illustrating a fusion method according to the invention.

As illustrated in FIG. 10b, reconstruction of diffused aspects can be reconstructed or "fused" using largely the reverse of the diffusion process. As shown, in step 1011, a decoder or other reconstruction device (e.g. advanced-SR) receives image data, and generally an image data sequence (e.g. a sequence of frames). While certain diffused data (e.g. spatial image portions) can often be identified without assistance, meta data can greatly facilitate fusion and other reconstruction by providing a starting point for further computation or more specific metrics, as will become apparent. For example, in step 1013, meta data can be received indicating a diffusion source, destination and diffusion operation, thereby avoiding the need to ascertain such fusion parameters. Next, in step 1015, an aspect of a source image portion (e.g. an object, macroblock, group of pixels, frame, etc.) and a diffused aspect of the source image portion are identified. Finally, in step 1017, processing is performed (e.g. consistent with meta data in step 1013) causing the pre-diffusion correspondence of the source and diffused source image portion aspects to be substantially re-established. Those skilled in the art will appreciate that matches to exacting criteria need not necessarily apply. For example, many codec parameters are estimated, interpolated and/or iterated (e.g. conventional-SR) to an extent consistent with a particular application and/or computational resources, among other factors. Thus, often only an objective or subjective threshold, range or determinable "sufficiently close" established criteria need be met and considerable variation is often considered acceptable.

Figure 10C:
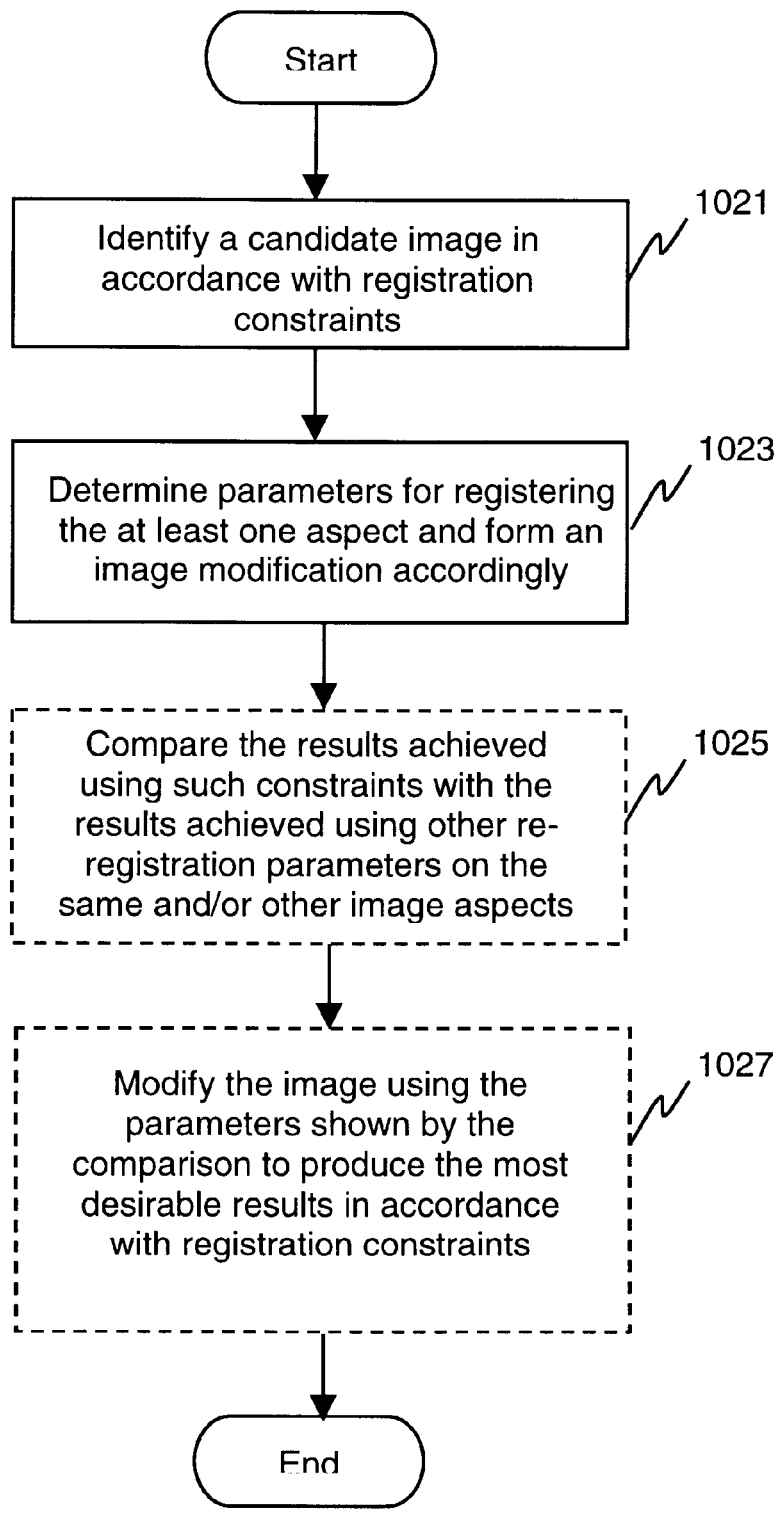
FIG. 10c is a flowchart illustrating a registration method according to the invention.

Continuing with FIG. 10c with reference to FIG. 8, diffusion-like operations are also implementable with respect to a single image representation using a spatial 842, optimization efficiency 843 or other tool either alone or in conjunction with other optimizations and optionally using meta data and/or advanced constructs. For clarity, such single image processing will also be referred to as "registration." As shown, in step 1021 a registration candidate (e.g. a frame, macroblock, object, etc.) is identified in accordance with registration constraints. For example, registration might be conducted where the bitrate of a frame or frame sequence, macroblock, etc. is detected as incongruous with system constraints (e.g. desirable bitrate, frequency content, etc.) and/or in accordance with detected image characteristics. Once a registration candidate is determined, re-registration parameters are determined in step 1023. Such parameters preferably indicate one or more image aspects that will be modified or "re-registered" with respect to their unaltered characteristics (e.g. pixel shifted, frequency-modified, blurred, de-blurred, etc.) and the manner and extent of such modifications (e.g. as with diffusion). In step 1025, the results achievable using different re-registration parameters can further (optionally) be compared, for example, by simulation, extrapolation, etc. (e.g. again, as with diffusion), and, in step 1027, the image aspect or aspects can registered (e.g. shifted, otherwise modified) according to the results of the comparison. Whether the steps 1025 and 1027 are utilized or a single or multiple non-compared registration is instead utilized will depend on such factors as application constraints and available computational resources, among others.

Registration, diffusion and/or other enhancements might also be utilized to facilitate still further optimizations, for example, to reduce bitrate and thereby enable bitrate increasing optimizations (e.g. creating higher definition image portions, entropy increasing registration of other aspects, adding meta data, etc.). The abilities to optimize enhancements and direct such enhancements at specific image portions and/or aspects can be particularly useful for improving video stills/surveillance, added CD imagery, DVD alternative angle inclusion, storage device capacity, subtitle quality and/or conferencing participant-quality isolation among numerous other registration and/or diffusion possibilities enabled by the invention. Efficiency optimization, for example, can be invaluable where high entropy and/or low regional redundancy (e.g. spatial content, high velocity motion, etc.) limit the susceptibility of source data and/or opportunities in accordance with standard-coded data and/or system constraints to provide desirable enhancements, such as diffusion and registration.

Figure 11A:
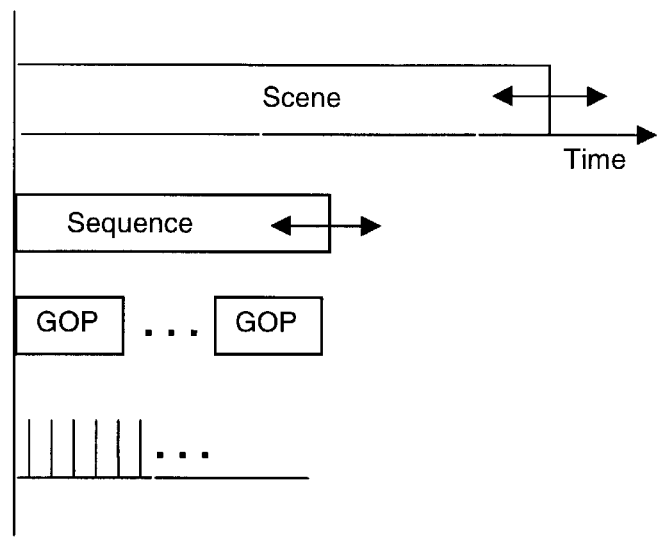
FIG. 11a broadly illustrates how a scene-based optimization according to the invention transcends certain limitations of conventional codec constructs.
Figure 11B:
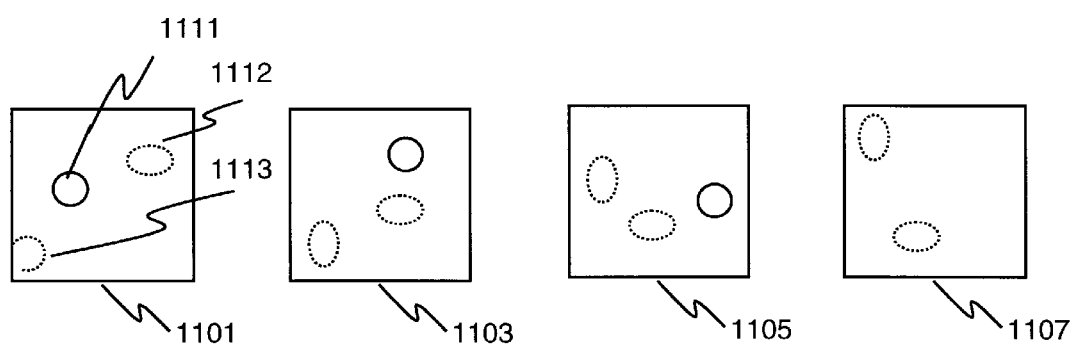
FIG. 11b illustrates in greater detail the scene-based optimization of FIG. 11a in accordance with a spatial diffusion example.

Continuing with FIGS. 11a and 11b with reference to FIG. 8, as facilitated by the super-domain model, diffusion can but need not be conducted in accordance with conventional temporal constructs such as sequences, GOPs and frames (FIG. 11a). Rather, the preferred temporal reference within which diffusion is conducted is a complete perceptual sequence referred to hereinafter as a "scene." By conducting diffusion within the bounds of detectable "scene changes" rather than a static conventional construct (e.g. frames, GOPs, sequences, etc. of MPEG-2 or a predetermined number of frames in conventional-SR), modification of the "natural" (i.e. unaltered) occurrence of image aspects can be conducted without inducing perceivable artifacts due to such alteration.

More specifically, diffusion source and destination frames, macroblocks, other images and/or other image aspects or "instances" and applications (e.g. spatial directions, frequencies, amounts, etc.) can be conducted in a dynamically controllable manner in accordance with analysis and control criteria (e.g. 841–842 of FIG. 8). Therefore, diffusion instances and applications can be adjusted to provide consistent standard, enhanced and/or overall quality with regard to specific image aspects and/or aspect models that might also be utilized. For example, application constraints can be applied dynamically and separately to specific aspects within a single image as well as temporally (i.e. with regard to successive imagery within one or more scenes). Diffusion can also be dynamically adjusted to provide adaptable quality, bitrate/bandwidth and/or other characteristics. For example, dynamic bandwidth constraints can not only be accommodated in a network environment, but a consistent quality level can also be provided with respect to a current bandwidth constraint.

The particular constraints utilized to define the beginning and ending of a scene are also statically and dynamically determinable. For example, such criteria can be defined in accordance with production parameters, such as directorial sequence notes, editing lists, etc. as might be transferred to an advanced encoder, entered by a user and/or determined by image data analysis (e.g. wipes, cuts, etc.). It should be noted, however, that the some scenic durations in accordance with production-based constraints might be prohibitively long depending on, for example, image content and available processing resources. However, as shown in FIG. 11b, perceived consistent quality can also be provided in accordance with the persistence of one or more image portions (e.g. objects) within successive images. For example, the initial appearance of object 1111 in frame 1101 can be used to define the beginning of a scene and the eventual disappearance of object 1111 in frame 1107 can be used to define the conclusion of a scene. However, optimal perceived effects might also result through the consideration of separate scenes (i.e. and modifications) for different objects (e.g. 1112 and 1113) and/or other image aspects, a single scene for multiple components and/or the consideration of other characteristics, application constraints (e.g. rotation, deformation, etc.) and/or other factors, only some of which might be explicitly mentioned herein.

While certain benefits of diffusion are achievable in conjunction with SR reconstruction, other diffusion benefits are more globally applicable. For example, diffusion modifications can be applied in sufficiently small degrees as to have no perceivable impact on standard-decoding while supplying added information in support of one or more conventional and/or advanced-SR tools; other modification are expected to provide perceived enhancement in conjunction with standard-decoding and SR-like effects conducted by the human visual system. Further, diffusion-like modification can also be used by spatial and/or efficiency tools discussed above where, for example, an image is spatially shifted to achieve decreased bitrate requirements when standard-coded. Additionally in conjunction with conventional-SR, diffusion provides not only additional spatial data, but also image-enhancement data (e.g. differently presented image description data), as discussed above. Thus, since diffusion techniques rarely increase and often decrease bitrate, a optimal, bitrate-reduced combination of data can be formed from conventionally-supplied data and data produced by diffusion-type techniques (e.g. diffusion, registration, etc.).

Figure 12A:
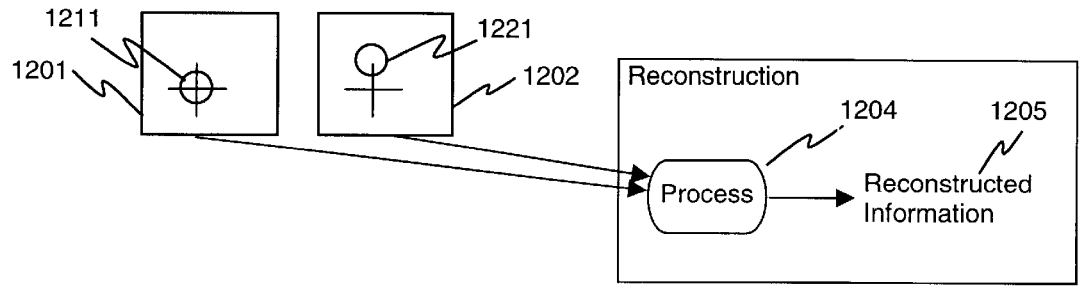
FIG. 12a illustrates how diffusion and registration according to the invention can convey spatial enhancement data in conjunction with conventional decoding as well as advanced reconstructions also according to the invention.
Figure 12B:
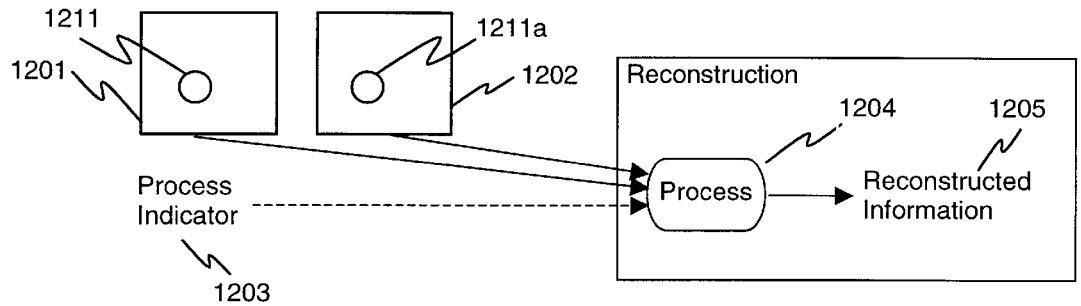
FIG. 12b illustrates how diffusion, registration and meta data can convey spatial and non-spatial enhancement data in conjunction with conventional and advanced reconstructions according to the invention.
Figure 13:
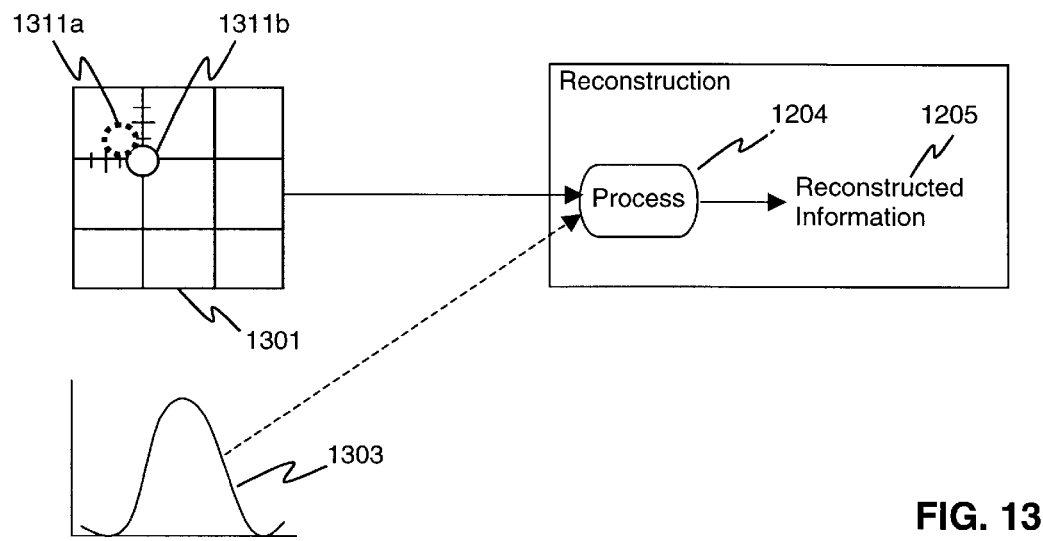
FIG. 13 illustrates how the invention enables sub-pixel and other increased image aspect definition accuracy to be utilized, for example, in conjunction with standard coding.

Turning to FIGS. 12a through 13 with reference to FIG. 8, still other benefits of diffusion techniques are achievable in accordance with the ability of a reconstruction tool to "understand" the form and/or substance of the information conveyed (e.g. data types 833–835 of FIG. 8). For example, as noted earlier, advanced reconstruction can be matched or "coupled" either more loosely (i.e. responsive to received data) or more tightly (i.e. also responsive to predetermined constructs) to an advanced encoder. In both cases, information can be supplemented by meta data 834, which is not utilized by standard or conventional-SR decoding. By way of comparison, loosely coupled advanced reconstruction might require meta data to use certain information but is more flexibly updated by such data (e.g. received constructs, data, tools, information, etc.), while tightly coupled advanced reconstruction can "assume" certain predetermined constructs without meta data, but at the potential expense of more difficult updating of such constructs.

In FIG. 12a, for example, pixel-shifting diffusion has been utilized in response to a detected spatial redundancy as discussed above, such that object 1211 has been shifted in frame 1202 with respect to frame 1201. While the alteration is selected as sufficient small as to be inconsequential to the results provided by a standard-decoder, conventional-SR and advanced-SR could utilize the additional information and basic SR-tools (e.g. function 1204) to provide a higher definition image without further information. Note, however, that conventional-SR, being unaware of the shift and its specific application, is capable of only limited use of the information. Contrastingly, advanced-SR, which can be made aware (e.g. using meta data and/or advanced constructs) can better utilize the shift in accordance with more specific application goals (e.g. to "piece together" a composite higher-definition image utilizing standard-coded and diffusion/registration-preserved data).

In FIG. 12b, the use of diffusion to pass other information (e.g. specialized processing information) is further illustrated. For example, rather than "shifting" spatial or other image aspects, determinable processing or other information can be conveyed, for example, by processing one of two redundant image aspects. As with the prior example, standard-decoding is unaffected and, for similar reasons of a sufficiently small change, conventional-SR is also unaffected. Using advanced-SR, however, the nature of the processing conducted during RSR-coding can be determined by, for example, comparing the two image aspect representations (e.g. either statically or in accordance with other image characteristics and/or operational constraints. Additionally, meta data (e.g. loose coupling) and/or an advanced construct (according to which a tightly-coupled advanced-SR responds in a predetermined manner to such information) can be used to convey more specific information (e.g. the RSR-induced process should be reversed, further corresponding processing of a determinable type is required for an additional image element that is discretely or otherwise identified, etc.).

An advantage of the ability of an advanced-codec to conduct such cooperative or adaptable coding and reconstruction is also illustrated by the "sub-pixel shifting" example of FIG. 13. As in the above examples, spatial diffusion has again been utilized to preserve object 1311 data by shifting the object-to-grid alignment in frame 1301 from position 1311a to position 1311b. While the alteration would be incorrectly interpreted by standard decoding and conventional-SR to the same effect (e.g. discerning sub-pixel differences) as with conventional half-pixel offset resolution, the resultant "artifact" from such error has been found to be imperceivable during the course of a video presentation. However, meta data and/or advanced constructs available to an advanced codec enable the existence and nature of the modification to be conveyed. In this case, spatial image information can be projected onto a superimposed virtual high definition grid, the use of which has been found to contribute incrementally to overall quality improvement as well as to provide substantial improvement in the quality of a resultant "still" image produceable from the video. For example, a conveyed (e.g. using meta data) or predetermined (e.g. using advanced constructs) curve 1303 can be used by advanced-SR reconstruction to reposition object 1311 to position 1311a. Alternatively or in conjunction therewith, specific object positional information or simply object-shifting occurrence identification can be conveyed. Thus, higher definition aspects can be created and overlayed within standard-coded data, transferred to various points throughout a system and reconstructed as desirable to one or more coexisting systems, system elements and/or applications.

In a similar manner, diffusion, distributed/cooperative processing and other advanced-codec capabilities can be applied alone or in combination with various image characteristics (e.g. spatial, temporal, frequency, informational, operational, etc.). Thus, RSR-coding enables the projection of image representation and other aspects onto a multi-dimensional virtual high-definition space useable, in part, by standard and conventional-SR decoding, and to a much greater extent, by advanced-SR reconstruction.

Figure 14:
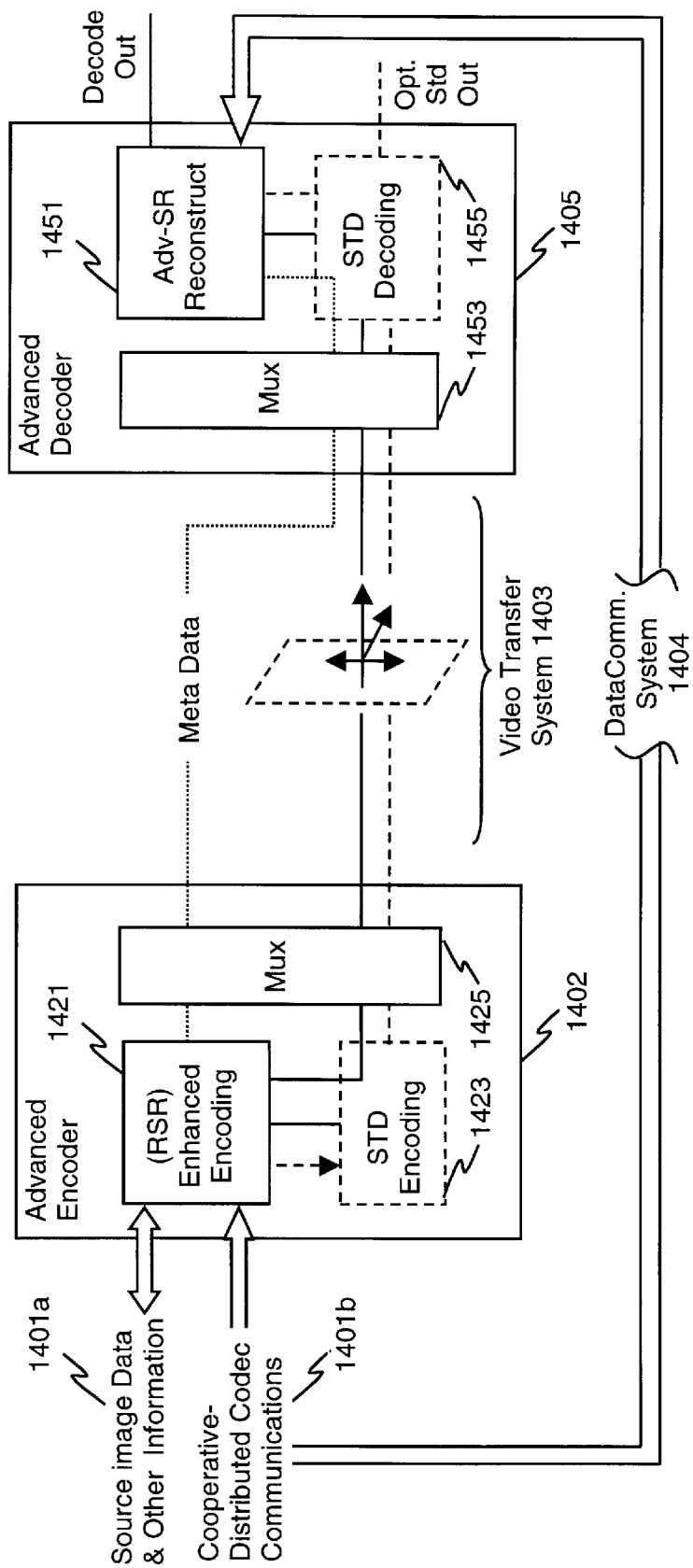
FIG. 14 illustrates cooperative coding and decoding with the optional use of conventional communication techniques for advanced-decoder to advanced-encoder communication according to the invention.

A further advantage of such projection and cooperative processing that is applicable to the above examples is that estimation and substantial computation can be avoided using an advanced-codec. That is, RSR-coding, to which additional information and unprocessed video are available and which can more practically operate in a non-real-time environment, can determine and convey specific image and/or processing characteristics to an advanced-SR decoder. Numerous instances where such capability might prove invaluable should be apparent to those skilled in the art in view of the foregoing. For example, operational constraints (e.g. prediction), reconstruction tools and/or tool modifications, an ideal optical path, transcoding support and/or other information (e.g. to facilitate locating of diffused aspects, providing otherwise calculated and/or estimated SR information, etc.) can be conveyed. RSR-coding can also more effectively conduct a portion or all of SR-type restoration, and/or support other capabilities, thereby reducing computational workload during reconstruction. Distributed RSR and/or SR is also facilitated through the ability to convey operational information. Various forms of synthetic or further distributed coding are also enabled (e.g. signaling where higher definition images and/or image aspects are intermittently utilized). These and other examples can also be further improved through bi-directionally communicated information between cooperatively operational advanced-codec elements additionally utilizing, for example, conventional processing system communication capabilities, as illustrated in FIG. 14.

Figure 15A:
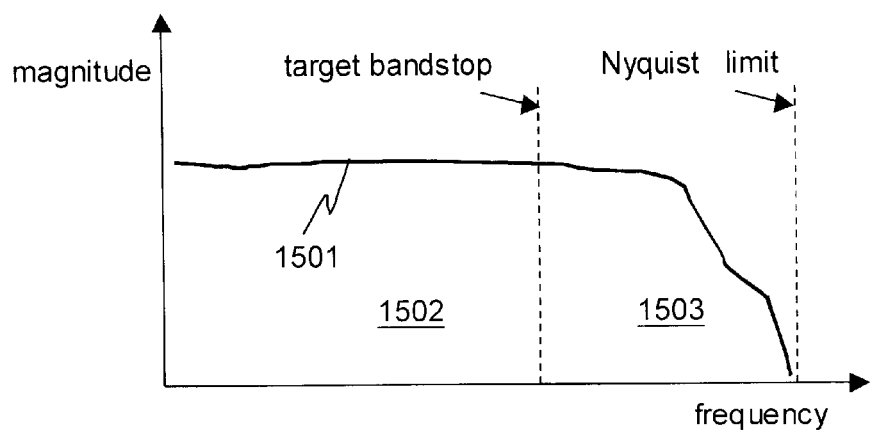
FIG. 15a illustrates a digital video source containing high frequencies unsuitable to conventional standard-coding for interlaced display and which is conventionally low-pass filtered to remove such high frequencies.
Figure 15B:
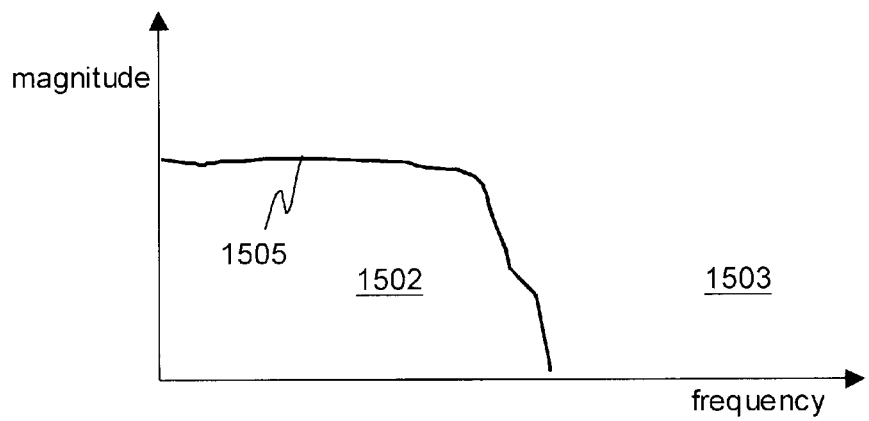
FIG. 15b illustrates the digital video source of FIG. 15a after conventional low pass filtering has been applied.

FIGS. 15a through 15g illustrate a further example of advanced codec capability enabled by the invention. In this example, referred to hereinafter as "vertical deconvolution," frequency diffusion (i.e. whether conducted in the frequency, spatial or some other domain or domains) can be utilized alone and/or in conjunction with further processing. Beginning with FIG. 15a, in such conventional systems as HDTV and DVD, interlaced display has been selected as a base format from which other formats, such as progressive display, can be supported via format conversion. FIG. 15a, for example, illustrates the frequency content 1501 of a source video image. A problem with this approach is that high frequency content desirable for progressive display can cause flicker when displayed on an interlaced display. The conventional solution is to utilize a low-pass anti-alias filter prior to downsampling (e.g. imaging, pre-processing, etc.) to remove the problematic high frequencies, the results of which are shown in FIG. 15b. Unfortunately, while removing the high frequencies satisfies interlaced display anti-flicker requirements and conversion for progressive display can and is still accomplished, the progressive display results suffer from the absence of the removed (i.e. filtered) high frequencies.

Figure 15C:
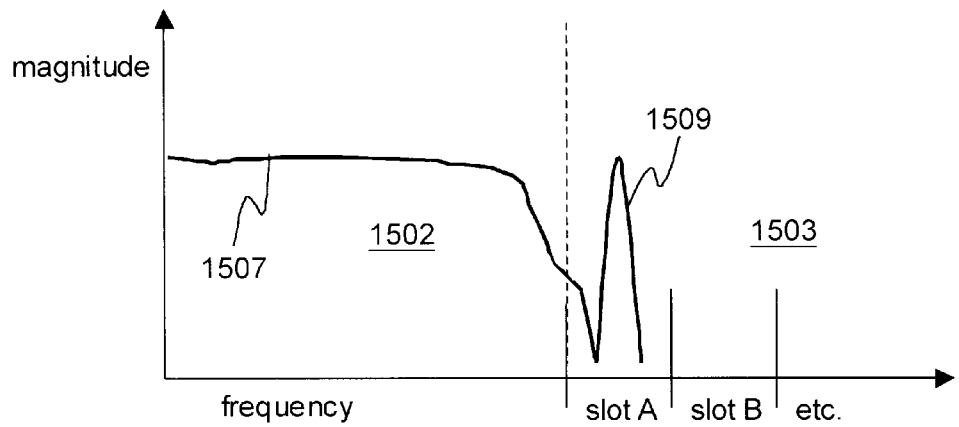
FIG. 15c illustrates the digital video source of FIG. 15a with high frequency content preserved via vertical deconvolution according to the invention.
Figure 15D:
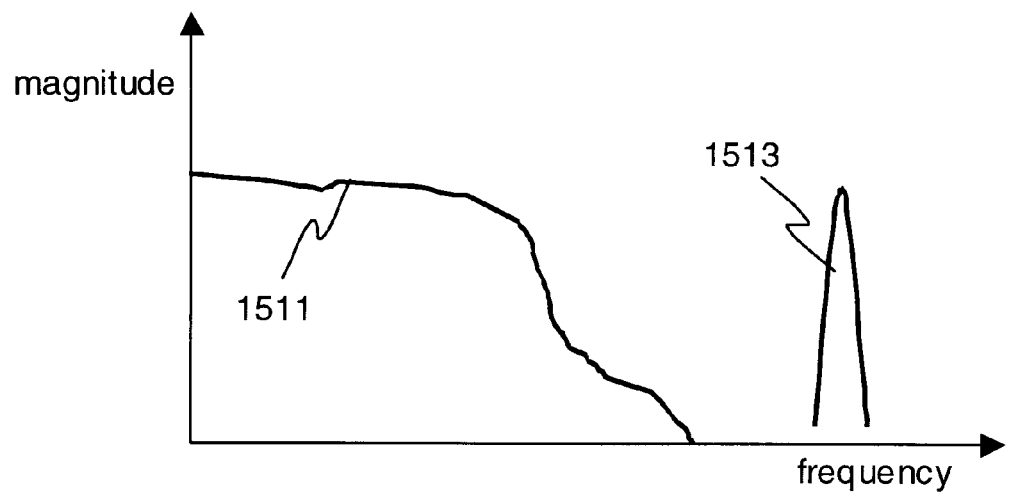
FIG. 15d illustrates the digital video source of FIG. 15a with different high frequency content preserved via processing different from that of FIG. 15c and diffusion according to the invention.
Figure 15E:
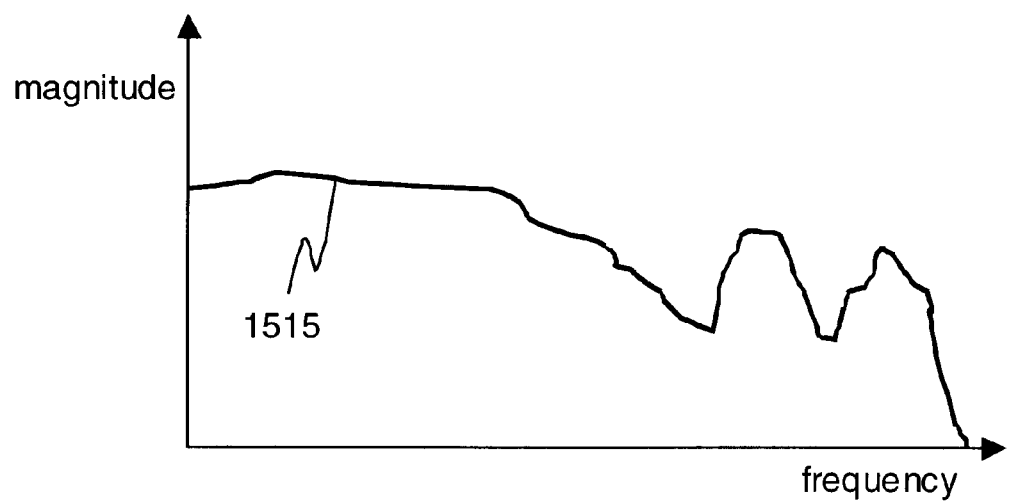
FIG. 15e illustrates a reconstructed video image produced by fusing the FIG. 15c and FIG. 15d high frequency content according to the invention.

In accordance with the invention however, coding and application constraints (e.g. the expected use of progressive display) can be considered and accommodated during downsampling. Thus, in a first solution given by FIGS. 15c through 15e, frequencies that would otherwise be conventionally filtered (e.g. consistent with opportunities arising from identified redundancies) can be diffused and thereby preserved within standard-coded data of various destination images (e.g. prior and successive macroblocks, frames, etc.). For example, FIG. 15c illustrates how certain high frequency regions or "slots" can be identified in which high frequencies (e.g. 1509) can be preserved by adding or "leaking" a controlled alias component to the image data (e.g. of a diffusion source) that is deemed tolerable to the interlaced display in conjunction with low-pass filtering. In FIG. 15d, a further different alias component has been added to other image data (e.g. another macroblock, frame, etc.), thereby preserving additional frequencies 1513. While the preserved high frequencies might be largely unavailable for standard decoding, certain conventional-SR tools can capture some of the diffused information (depending on the factors already noted); advanced-SR reconstruction is further found to be able to recover at least most of the high frequencies for transcoding and progressive display, as illustrated by the reconstruction (including diffused high frequency fusion with the source image) in FIG. 15e.

Figure 15F:
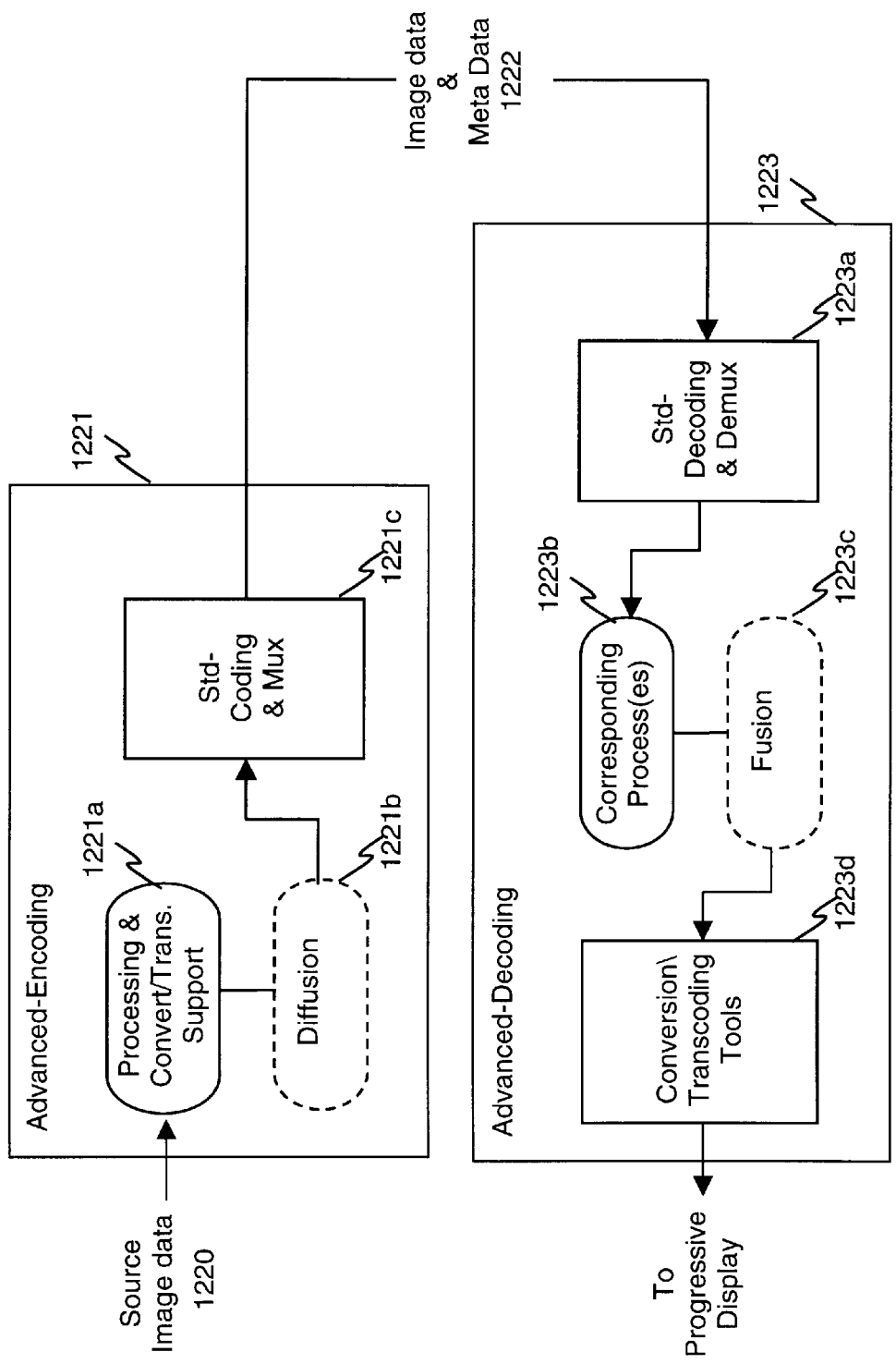
FIG. 15f is a flow diagram illustrating an alternative image permutation technique for conducting vertical deconvolution according to the invention.

FIG. 15f broadly illustrates a second alternative or complimentary (e.g. using diffusion 1221b) high frequency preservation solution given by, the conventionally removed high frequency data is modified using, for example, a blur tool (and/or other appropriate processing tools) 1221a, thereby only apparently removing the offending information. In actuality, the information is mixed into the standard-coded data in a manner that can be recovered at least in part (i.e. effectively exploiting yet another discovered redundancy type). The particular blur function and/or other processing utilized, and identification of the optionally diffused data can, for example, be provided as meta data 1222 and/or advanced constructs (not shown) in the manner already discussed. During advanced reconstruction 1223, a corresponding de-blur function and/or other processes 1223b and fusion 1223c can be utilized as applicable in accordance with received meta data 1222 and/or advanced constructs. Advanced-reconstruction can also conduct conversion applicable to progressive display utilizing conversion/transcoding tools 1223d. It should be noted, however, that unlike the earlier examples, this second solution might result in perceived artifacts when used in conjunction with extensive high frequency information and standard decoding. Thus, a more preferable solution, for example, in conjunction with conventional reconstruction and advanced-SR might be a combination of diffusion and diffusion plus processing. Other examples will also be apparent in view of the teachings herein.

Figure 15G:
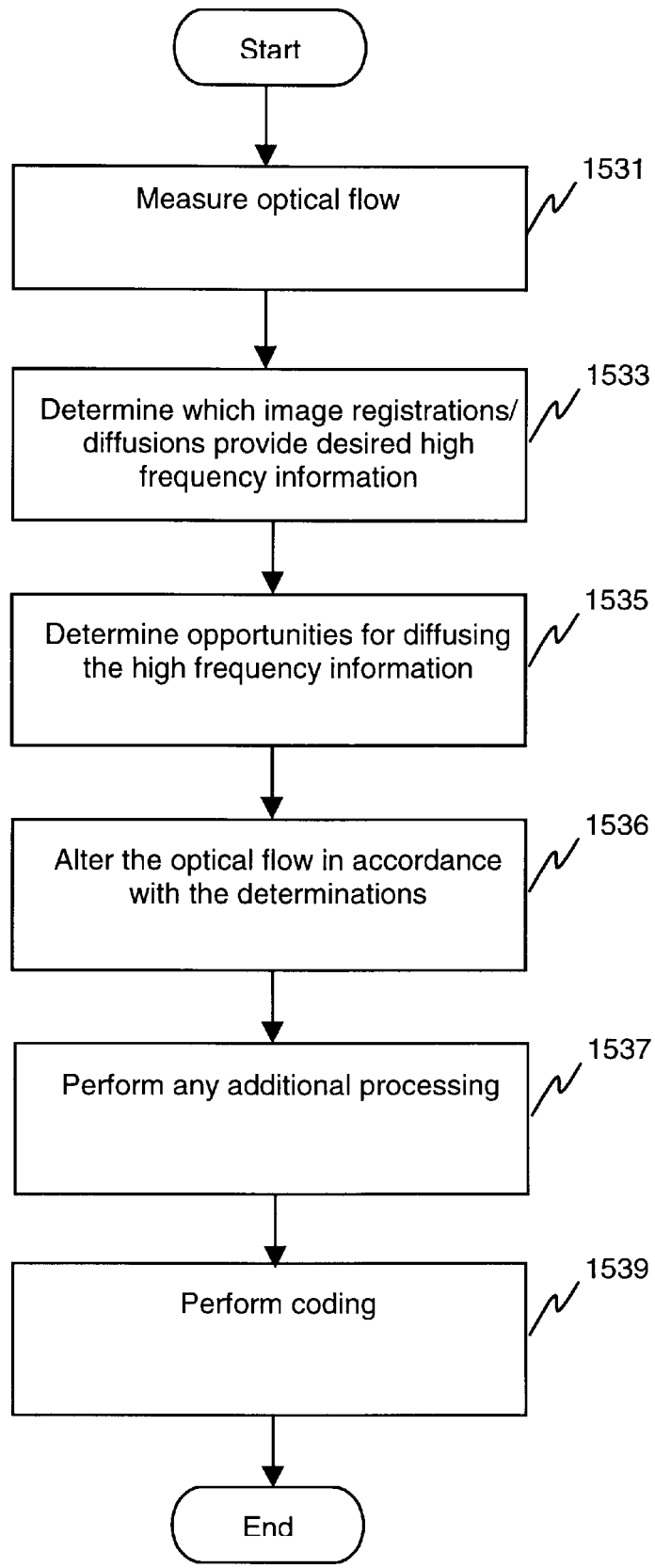
FIG. 15g is a flowchart illustrating a spatial manipulation vertical deconvolution method according to the invention.

Continuing with FIG. 15g, while vertical deconvolution and other optimizations might involve modification of a variety of image portion aspects, the particular implementation can but need not correspond with the aspect type. For example, the method of FIG. 15g utilizes spatial manipulation (i.e. sub-pixel shifting) for performing vertical deconvolution (e.g. frequency preservation). As shown, in step 1531, the optical flow of a received image data sequence (e.g. a scene) is measured. Such measurement best conducted with subpixel precision, for example, starting with a high-definition (HDTV) source signal which has at least twice the sample granularity in both the horizontal and vertical direction. Thus, an integer precise vector in the high definition grid becomes a subpixel accurate vector with respect or from the perspective of the lower definition grid of the standard definition signal. In step 1533, potential registrations are tested. More preferably, measurement is taken as to which vertical subpixel offset each object "hits," indicating the high pass components that would survive the higher definition-to-lower definition projection process. Vector offset determines high pass components, since the subpixel vector index essentially selects which filter is used to project the high definition signal onto the lower definition lattice.

Next, in step 1535, opportunities for diffusing the high-frequency information are determined (e.g. by testing optical flow field alteration effects on hits achieved). Then, in step 1536, the optical flow is altered in accordance with providing a maximized high pass spectrum and avoiding overemphasis of any given high frequency components (e.g. by forcing an object to have a relatively even number of 0 and 0.5 pixel registrations). In step 1537, any additional processing is performed (e.g. low pass filtering using a filter kernel selected by source-to-destination phase, here, essentially the subpixel vector modulo). Finally, in step 1539, coding is performed (e.g. standard coding and generation of any meta data).

Figure 15H:
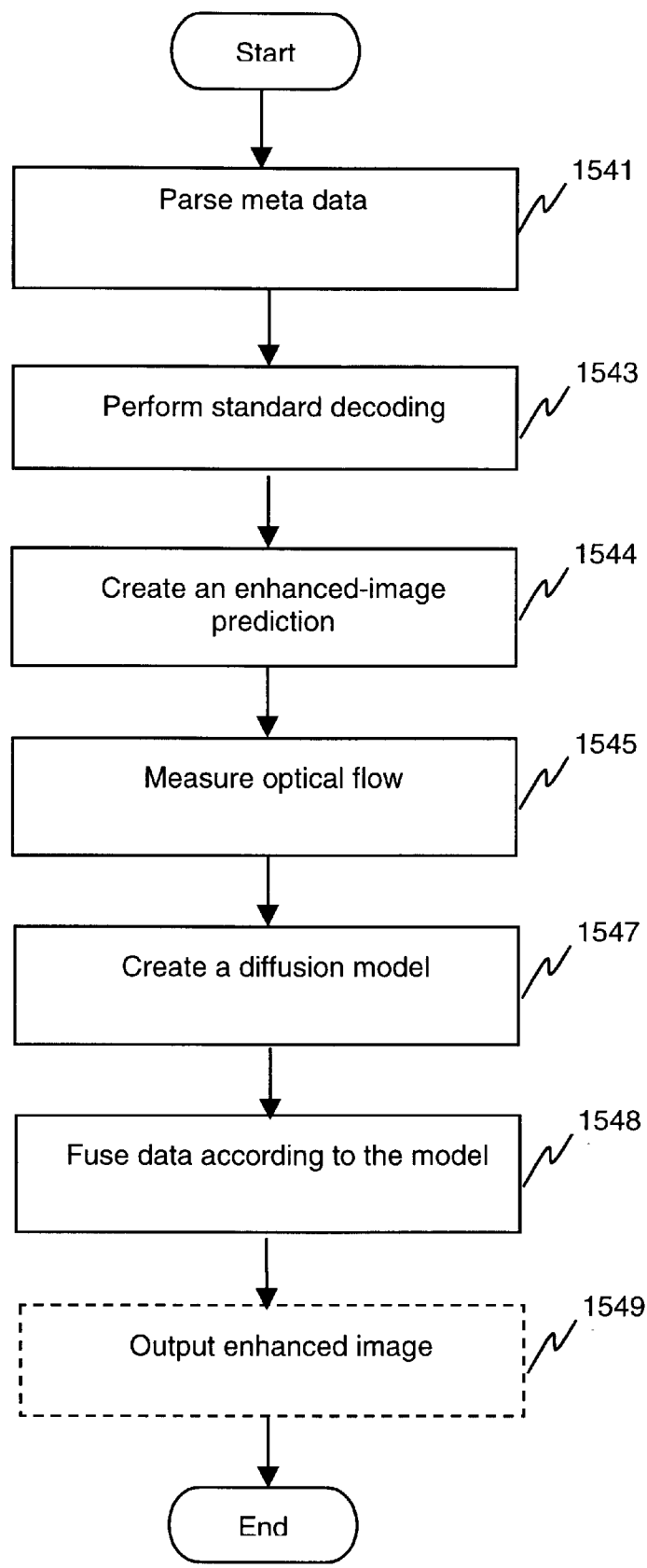
FIG. 15h is a flowchart illustrating a vertical convolution method according to the invention.

FIG. 15h further illustrates an exemplary spatially-oriented reconstruction or "vertical convolution" method according to the invention. As shown, in step 1541, received meta data is parsed. Meta data can, for example, include a subsampling matrix ("PSF"), inverse matrix, pdf, frequency coefficient function and/or other model parameters utilized during coding, thereby saving decoder derivation of an appropriate inverse or other corresponding processing. Conversely, meta data can also include trouble spot indicators (e.g. image portions and/or aspects with respect to which enhancement processing should not be conducted or which require specialized processing). It should be noted, however that a tradeoff exists between providing calculable data, metrics and/or other information shortcuts (e.g. refined optical flow field elements) versus the bandwidth, computation and/or other overhead in providing such information. Standard-decoding is performed in step 1543, and, in step 1544, a prediction of the enhanced image is formed, using the standard-decoded image as an initial estimate. The meta data (i.e. and/or advanced constructs) might, for example, indicate that an image should be warped, scaled, rotated, and/or translated. An initial vector field might also be formed by a combination of the bitstream vectors and any other refinement metadata sent for enhancement purposes.

Next, in step 1545, the optical flow is measured, for example, via motion estimation/optical flow analysis on an interpolated picture starting with the initialized vector field above. A second tier of motion vector field metadata refinement is also typically desirable. (The vertical subpixel offsets will typically control or influence the selection of the data fusion operators, such as inverse filter selection.) In step 1547, a diffusion model is created. For example, other measurements/analysis (e.g. bitstream coefficients) on reconstructed and/or interpolated images can provide constraints or guidance in conducting data fusion (e.g. the spectral "fingerprint" of the reconstructed image when conducting vertical deconvolution). As with other steps (and generally), model creation can also be facilitated by meta data. Next, in step 1548, the data is fused according to the model utilizing a solution that best meets the model constraints (e.g. using objective function optimization). Enhancement error data can also be used to refine the enhanced image "estimate." Finally, assuming no other processing is required, the results of step 1548 can then be output in step 1549.

Figure 16:
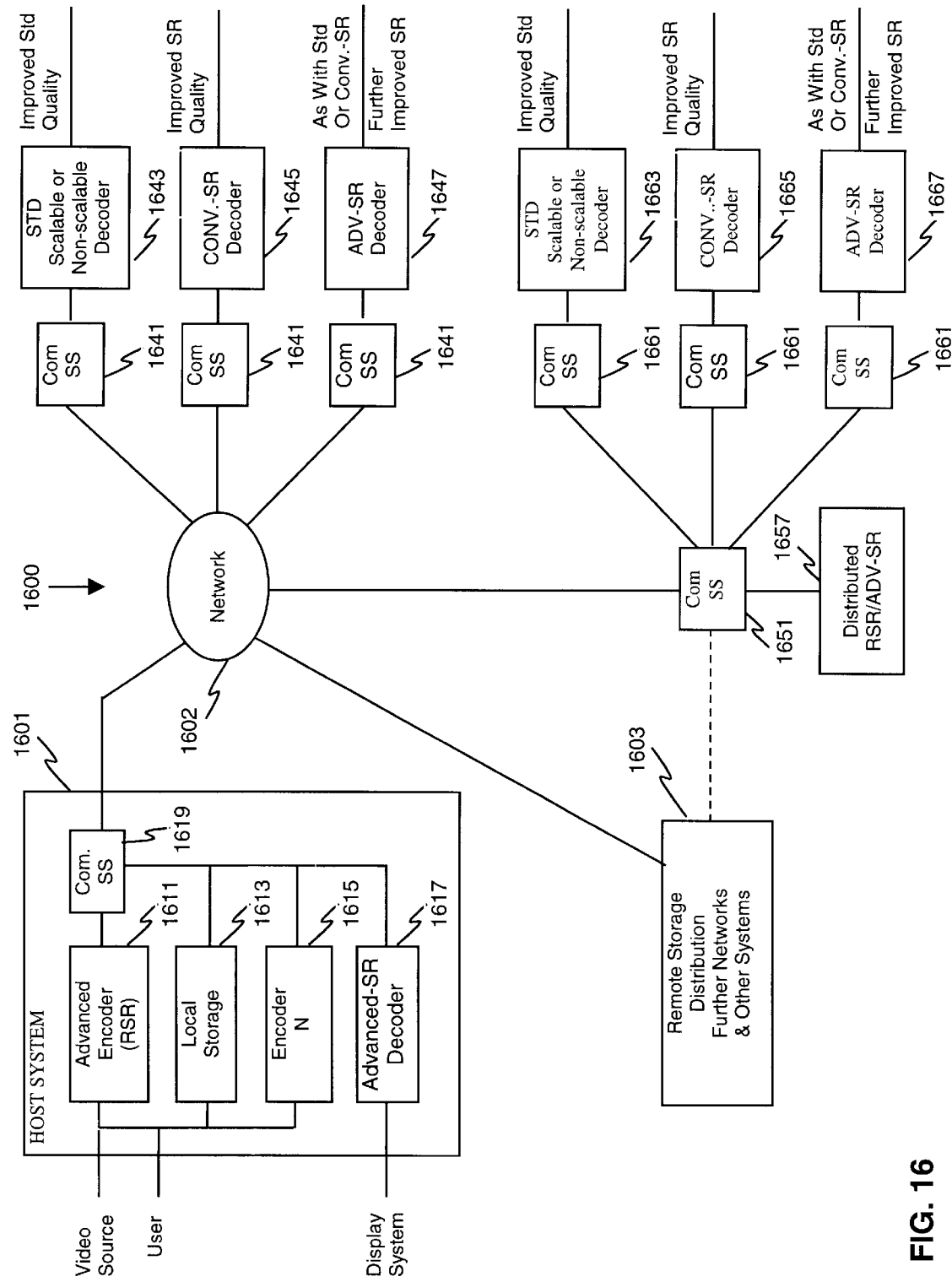
FIG. 16 is a flow diagram illustrating a network configuration utilizing distributed RSR-coding and SR-decoding according to the invention.

In FIG. 16, an exemplary networked system 1600 broadly illustrates how the invention enables substantial design flexibility in systems utilizing standard-compliant video. As shown, system 1600 comprises host system 1601, network 1602, remote networks, remote storage and/or other systems 1603, first receiving systems 1641–1647, a distributed RSR and/or SR system 1651–1657 and second receiving systems 1661–1667.

Host system 1601 might, for example, comprise a cable, satellite broadcast/receiving system and/or internet server. System 1601 further comprises advanced encoder 1611, which can receive source data and other information from a video source, user input, advanced-SR decoder 1617 and/or other sources, which is connected to a display system; such connection, for example, enables user-assisted and/or automated RSR-coding and/or editing, which can be accomplished in a substantially conventional manner. System 1601 also comprises local storage 1613, encoder-N 1615 and communications subsystem 1619, which connects to network 1602, such that the source data, RSR-optimized data (e.g. including diffused and/or meta data) and/or other information can be retrieved, stored, edited, broadcast and/or otherwise processed alone or in conjunction with standard-coded video in an otherwise conventional manner. (For example, encoder-N can provide standard-coded data that can be utilized in a combined manner with advanced coding and/or as a separate "channel" in conjunction with advanced-coded data and/or information.)

When transferred from host system 1601 via network 1602, for example, standard-coded video can be received via a communication subsystem 1641 or 1651 by a standard-complaint 1643, conventional-SR enhanced 1645 and/or advanced-SR 1647 decoder. Alternatively or in conjunction with such direct transfer, additional quality-improvement and/or distributed reconstruction is also enabled (e.g. as taught in the context of a digital display device in co-pending application Ser. No. 60/096,322). For example, standard-coded video transferred via network 1602 and communications subsystem 1651 can be further processed by distributed RSR/advanced-SR unit 1657 (and/or similar individual and/or combined RSR and SR units) and then transferred to one or more of decoders 1663, 1665 and/or 1667. Also, as noted with reference to FIG. 14, it is not necessary that all advanced-codec communication be conducted unidirectionally or even utilizing a video subsystem. For example, in a system incorporating an advanced STB, the STB can negotiate high-definition video services with a service provider and tools and/or other information for enabling such services, including for RSR/advanced-SR unit 1657, can be delivered on a datacommunications network; thus impact to video bandwidth can be minimized and robust delivery of enhanced-quality and/or other advanced codec capabilities can be enabled.

Decoder 1667 might, for example, comprise a subsystem in a so-called "set-top box" connected to an HDTV-compliant display system (not shown) or in accordance with conventional SDTV. In the HDTV case, unit 1657, operating in a predetermined or determinable/programmable manner (e.g. using meta data and/or conventional unidirectional or bi-directional communication), can provide quality-enhancement in an additive manner to that of advanced encoder 1611. In the SDTV case and/or connected via a further network 1603, unit 1657 can be used to reduce bandwidth (e.g. by further optimizing data as discussed above). Unit 1657 can also provide a degree of SR reconstruction, which can then be completed by decoder 1667.

Figure 17:
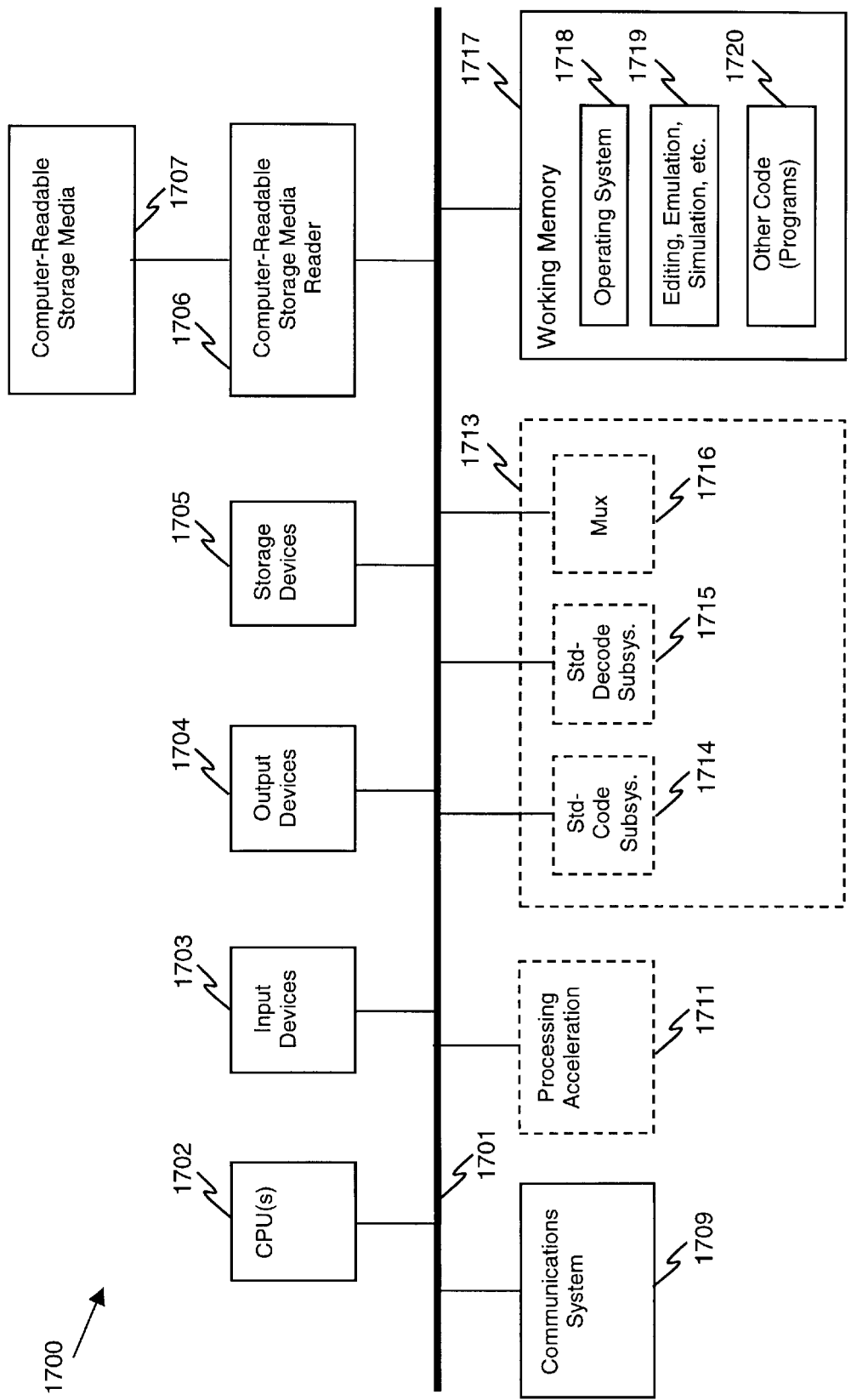
FIG. 17 is a block diagram broadly illustrating how an advanced encoder and/or decoder can be implemented within a host processing system according to the invention.

Turning now to FIG. 17, while advanced codec elements are implementable in various standalone configurations, they are also adaptable to integration within existing host processing systems, such as personal computers ("PCs") and settop boxes ("STBs"), among others. PCs, for example, provide a conventionally available platform with expandble computational power, control capability, storage capability and other features desirable in conjunction with advanced coding and processing, as well as communication and advanced reconstruction. Similarly, emerging appliance-integrated and standalone "receiving" systems such as advanced STBs, while currently less capable than a PC, are expected to provide more complete processing capability, expandability and/or connectability to more comprehensively outfitted devices such as PCs. Such device types are also capable of supporting digital video and potentially other imaging application-specific components useful to the invention (e.g. standard codec elements). For clarity sake, a PC will be presumed as a host processing system for advanced encoding, decoding and other aspects of the invention unless otherwise indicated.

As is broadly illustrated in FIG. 17, advanced-encoder 1700 according to the invention preferably comprises conventional PC hardware elements electrically connected via bus 1701 including at least one central processor 1702, input devices 1703, output devices 1704, storage devices 1705, computer readable storage media reader 1706, memory 1717 and communications system 1709. Computer-readable storage media reader 1706 (e.g. memory and/or storage device interface) is further connected to computer-readable media 1707 (e.g. memory and/or storage media which can also include memory 1717 and/or storage devices 1705). Additional, hardware elements can, for example, include processing acceleration 1711 (e.g. digital signal processor(s), special-purpose processor(s), dedicated hardware, an expansion board; etc.) for accelerating more computationally intensive advanced-encoder operations; standard codec components including standard coding subsystem 1714 (e.g. 114 of FIG. 1, 423 of FIG. 4) or "standard-coder", standard-decode subsystem 1706 (e.g. 133 of FIG. 1) or "standard-decoder" and multiplexer 1716 can also be implemented in hardware, as is conventionally done.

Input devices 1703, in addition to conventional control devices and a digital video supply capability (e.g. analog input connected to an analog-to-digital converter; digital video input; converter; etc.), also preferably include a bi-directional connection to capturing and any pre-encoding processing that might be utilized (e.g. in conjunction with cable, satellite, DVD and/or other image sources, which can be conventionally implemented and/or can utilize communications system 1709). Input devices can further comprise any number of devices and/or device types for inputting commands and/or data, including but not limited to a keyboard, mouse, and/or speech recognition. Output devices preferably include a high definition display and audio system (e.g. HDTV) as well as standard-definition display capability (e.g. SDTV), such that decoded output for the two can be viewed and compared, and advanced-codec operation can be further optimized (e.g. in an automatic and/or user-controllable manner).

Advanced encoder 1700 further comprises software elements including operating system ("OS") 1718, editing, emulation and simulation programs 1719 and other programs 1720 (e.g. RSR-coding), which will be discussed in greater detail. Editing, emulation simulation and similar programs are conventionally used for "adding" related video and/or other imaging capability to a PC. For example, video data received via communications system 1709 (e.g. via internet, LAN, WAN, etc.), input devices 1703 (e.g. digital video) and/or from storage can be spliced together, otherwise edited or directly utilized as source video data for coding (e.g. using MPEG-2). Data coded using MPEG-2 can further be "super-coded" or encapsulated within further CD, DVD, HDTV and other application-protocols that can also be simulated or emulated, for example, to locally display the decoded results. Advanced encoder aspects are also capable of being controlled, modified, emulated and/or simulated using conventional programming and/or hardware tool techniques, as will become apparent to those skilled in the art. Other computer code or programs 1720 refers to elements of advanced encoder 1700, which can include such conventionally utilized computer-readable code as application programs, downloadable applets, databases and/or various other locally or remotely originating computer-readable data and/or information.

An advanced decoder can also be implemented in accordance with the broadly-depicted exemplary system given in FIG. 17. However, it will be appreciated that specialized input and/or output capability is desirable largely for monitoring and reconstruction performance optimization, for example, as discussed with reference to an exemplary network configuration.

It will be apparent to those skilled in the art that several variations of advanced codec elements given in FIG. 17 are contemplated and within the intended scope of the present invention. For example, given processor and computer performance variations and ongoing technological advancements, hardware elements may be embodied in software or in a combination of hardware and software. Similarly, software elements may be embodied in hardware or in a combination of hardware and software. Further, while connection to other computing devices is only generically indicated as communications system 1709, wired, wireless, modem and/or other connection or connections to other computing devices (including but not limited to local area networks, wide area networks and the internet) might be utilized, among other possibilities. A further example is that the use of conventional multiple site viewing, information forwarding, collaboration, remote information retrieval, merging, and related capabilities are each contemplated. For example, advanced codec tools can be downloaded via the internet and/or other network connection to communications system 1709, which can be conducted in accordance with cooperative and/or distributed encoding and/or reconstruction, for example, as noted with reference to super-domain modeling and an exemplary network configuration.

Various operating systems and data processing systems can also be utilized, however at least a conventional multi-tasking operating system such as Windows98® or Windows NT® (trademarks of Microsoft, Inc.) running on an IBM® (trademark to International Business Machines) compatible computer appears sufficient and will be presumed for the discussion herein. However, a fully multi-threaded real-time operating system is preferred, particularly where a combination of hardware and software are utilized (e.g. acceleration; expansion board video component implementations; etc.). Additional low-level coding might also be required, for example, with specialized acceleration and/or video component interfacing. (The use of low level coding techniques applicable to the present invention are well-known by those skilled in the computer arts.) Utilization of the advanced-codec elements in conjunction with editing, simulation, emulation and/or other applications can also be implemented more separately or as more integrated elements in a conventional manner (e.g. add-in, sub-process, linking, etc.).

Figure 18:
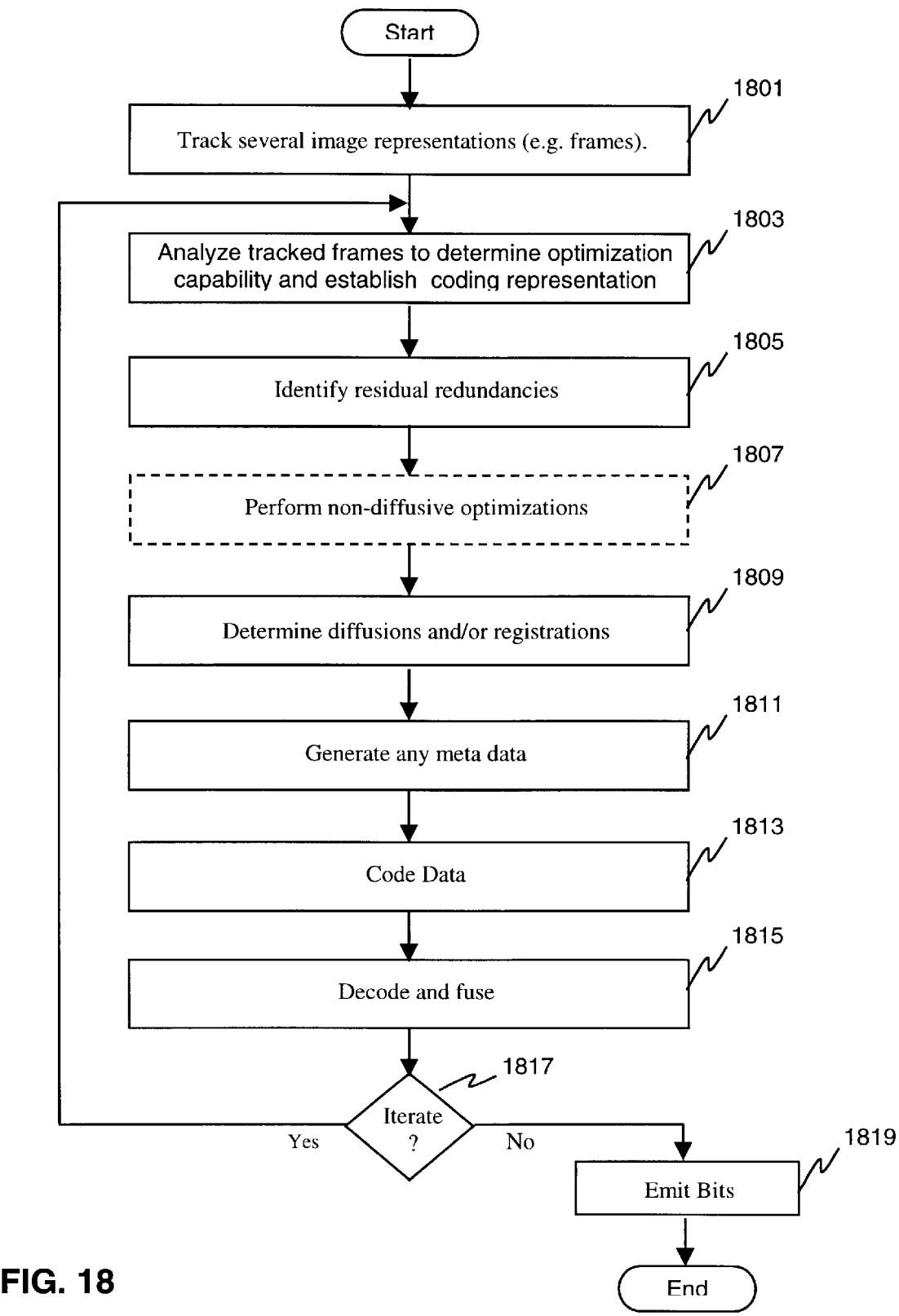
FIG. 18 is a flowchart illustrating a more detailed superimposed optimization method according to the invention.

In FIG. 18, a more specific superimposed optimization method is illustrated that is capable of being effectuated by the advanced codec implementations that follow, as well as other implementations that will be apparent to those skilled in the art in view of the teachings herein. The depicted method also incorporates aspects of the super-domain model, non-standard and/or standard construct usage and further illustrates the incorporation of such optimizations as diffusion and registration, as well as the generation of meta data. As noted earlier, steps performed by RSR-coding can also be viewed and implemented in accordance with selectable, replaceable, modifiable and even downloadable tools, among other possibilities.

As shown, in step 1801, RSR-coding tracks several image representations, which, as discussed, can be frames in accordance with MPEG-2 and other conventional standards, but might also include other depictions suitable for representing images as might also be utilized by a particular standard. Further, the number and selection of frames is preferably determined in accordance with scenes (e.g. according to image persistence) rather than, for example, simply a pre-determined number of frames. In step 1803, RSR-coding analyzes the tracked frames to determine optimization capacity (e.g. susceptibility) and to establish one or more coding representations suitable to the image data and/or system/application constraints. Optimization capacity determination can include image-optimization susceptibility and/or coding capacity determination, for example, using optical flow analysis and/or other techniques, as will be discussed in greater detail. Additionally, as noted above, various coding constructs (e.g. MPEG-4 object-oriented, pixel-based, etc.) are preferably utilized in accordance with image characteristics and/or application considerations such that, by utilizing appropriate coding capability, an optimal image representation might be produced.

Next, having determined how to approach image optimization in accordance with image and/or system/application considerations, various consistent optimization methods can be applied. As discussed, various diffusion-type and/or other optimizations can be performed in accordance with detected image representation redundancies. However, a distinction is preferably made that the redundancies utilized are "residual." That is, certain redundancies (e.g. prediction error concentrated along object edges, intra-refresh, etc.) as might exist within image data, but might be necessarily left un-altered by advanced coding in order for the standard to operate properly. Rather, the invention preferably utilizes redundancies that are discovered to be non-essential (i.e. can be altered without thwarting operational requirements), but that instead related to residual inefficiencies that survive standard-coding and which have not been removed through optimization of the standard itself (e.g. image aspects that will be repeated in non-consecutive frames). Various optimizations are then conducted in steps 1807 through 1811. For example, in step 1807, such non-diffusive optimizations as edge refinement, de-blurring, infusing synthetic processing (e.g. vertical deconvolution processing) and various other processing can be conducted, only a few of which might be specifically noted herein. In step 1809, diffusion and/or registration can be conducted in the manner already discussed. As noted, diffusion and registration result in both optimization and effectively added data, which might be better conveyed using additional information or meta data. Such meta data can be generated, in accordance with such prior optimizations, in step 1811.

Whether the remaining steps might best be characterized as being conducted by RSR-coding or by an "advanced codec" might depend on the degree to which RSR-coding is integrated with standard coding in a particular implementation. That is, despite the increased ease of incorporation into existing systems, certain repeated operational capabilities can exists where RSR-coding and standard-coding are separately implemented. Further, the use of distributed coding and/or reconstruction tends to blur the clear operational or functional distinctions apparent in conventional coding. However, for clarity, a separate non-distributed implementation can be assumed, whereby a standard-coder creates optimized standard-coded data in step 1813 and, in accordance with the discussed optimization assurance and degradation avoidance, RSR-coding decodes and fuses the standard-coded data in step 1815, thereby providing for checking optimization results. (As noted, RSR-coding can also extrapolate performance information in conjunction with or as an alternative to decoding or other reconstruction.) Further, depending upon the optimizations utilized, decoding and fusion (e.g. of diffused image aspects and/or meta data) can include standard-decoding as well as various conventional and/or advanced-SR reconstruction types. Finally, in step 1817, the desirability of the results achieved can be compared with system parameters to determine whether iteration of steps 1803 through 1815 is required or whether processing is completed and bits can be emitted in step 1819. Typically, the emitted bits will contain image data which can then be standard-coded and/or transferred directly (e.g. meta data). However, a fully integrated advanced encoder is expected to be capable of preserving the already coded data of steps 1811 and 1813 and emitting such existing (i.e. rather than recoding reconstructed standard-coded data in step 1819 (not shown).

Figure 19:
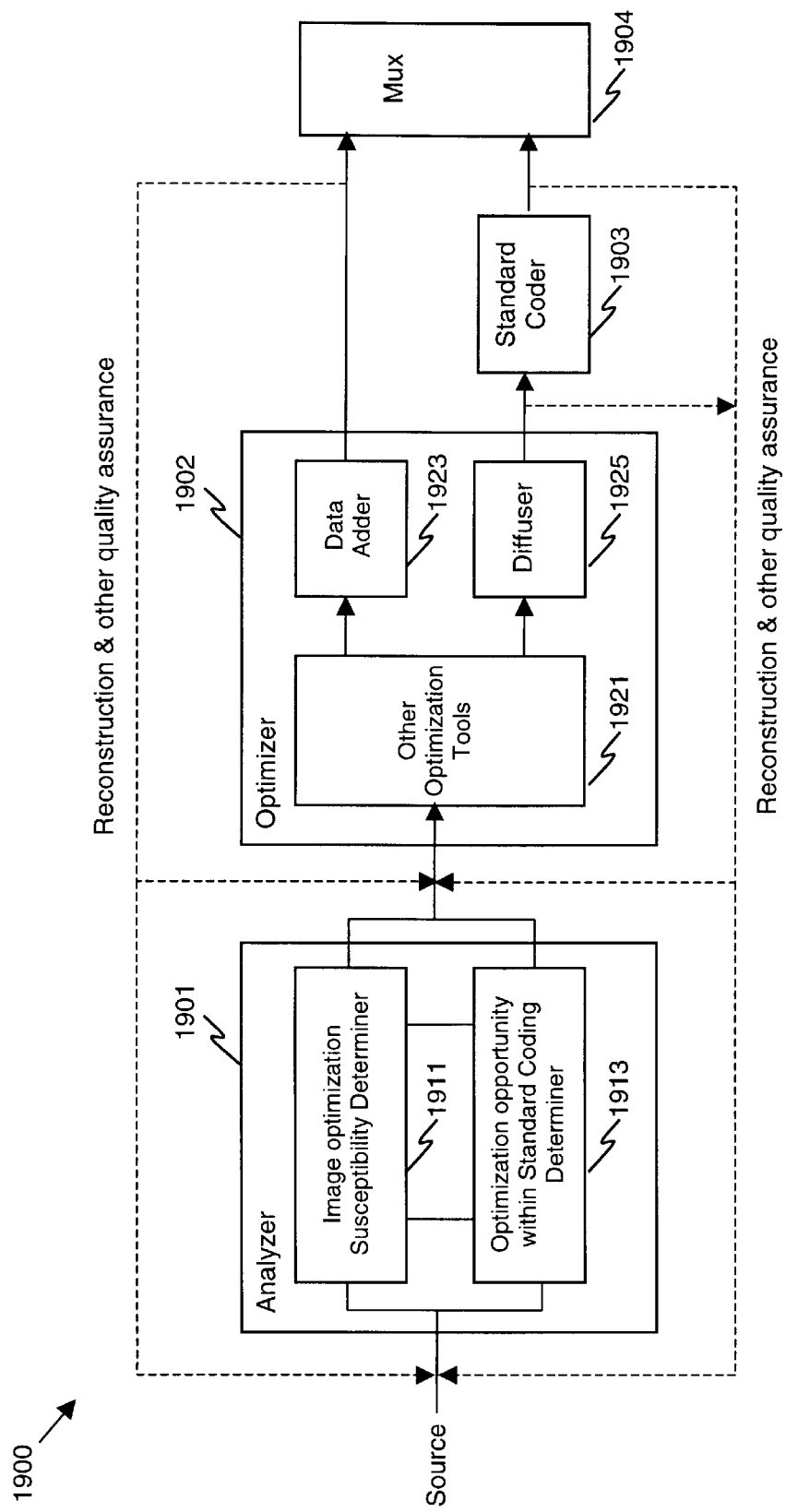
FIG. 19 is a flow diagram that broadly illustrates an example of an advanced-encoder according to the invention.

Turning now to FIG. 19, a simplified superimposed optimization apparatus is illustrated in accordance with the FIG. 18 method, such that the more complex apparatus that follow might be better understood. As shown, a separately implemented RSR-coder can be broadly viewed as comprising an analyzer 1901 and an optimizer 1902 connected (e.g. electrically and/or via software constructs) to a standard coder 1903 and a multiplexer 1904. More specifically, analyzer 1901 preferably comprises an image optimization susceptibility determiner 1911 which, as the name implies, is capable of ascertaining the extent to which image representations in source image data lend themselves to optimization. As discussed, for example, such optimizations might be limited by unusually complex images with high velocity motion, among other factors which will be appreciated by those skilled in the art. Analyzer 1901 further preferably comprises an optimization opportunity determiner 1913, which is capable of determining the capability of the standard-coding process to withstand certain data and/or data optimizations. As discussed, for example, excessive high frequency content can be problematic, however, such high frequency content can generally be preserved using, for example, processing in conjunction with downsampling and/or diffusion. Nevertheless, certain optimizations, such as diffusion and/or registration, might result in excessive entropy in certain cases (e.g. depending on the image data) or bitrate (e.g. using meta data), scene consistency and/or conformance with other coding considerations might become problematic. Therefore, analyzer 1901 provides for determining those optimizations which can be desirably conducted.

Optimizer 1902 receives analysis parameters determined by analyzer 1901 and conducts actual optimizations. Optimization tools 1921 provide for non-diffusion spatial and/or efficiency optimizations (e.g. as in step 1807 of FIG. 18) as well as determination of diffusion and/or registration characteristics, which are then implemented by diffuser 1925. Additionally, the use of certain optimization tools 1921 might result in a need for including meta data (e.g. in conjunction with loosely-coupled advanced-SR reconstruction), which meta data is then synthesized for transfer or "coded" by data adder 1923. The output of diffuser 1925 is received by standard-coder 1903, which produces standard-coded data. Finally, meta data from data adder 1923 and standard-coder 1903 is transferred to multiplexer 1904. In a more preferred system, however, the results of superimposed image and/or performance optimization can also be iterated (e.g. as indicated by the dashed arrows) in accordance with reconstruction and other quality assurance tools, as will be discussed.

Figure 20:
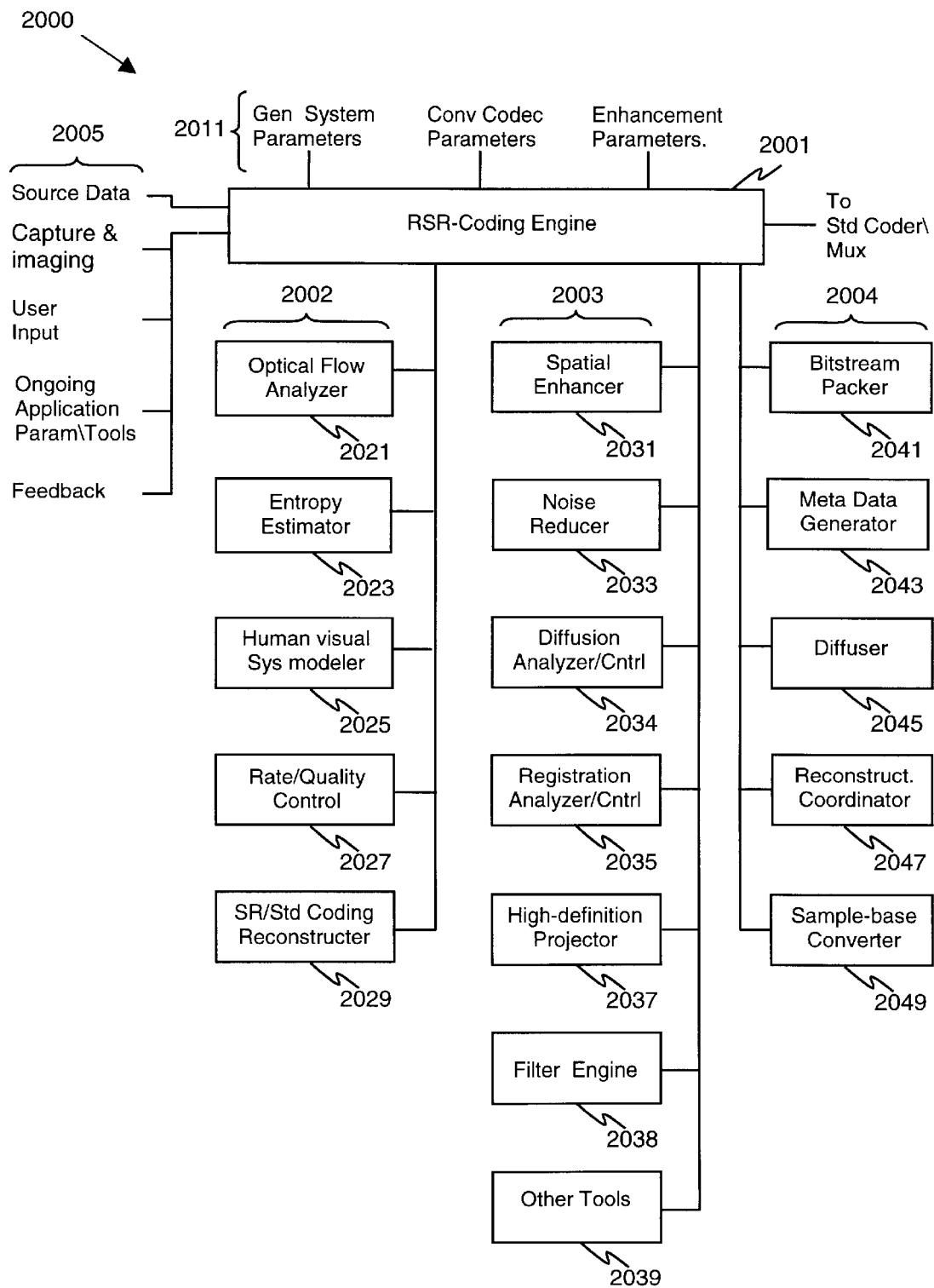
FIG. 20 is a functional diagram illustrating, in greater detail, a programmable advanced-encoder according to the invention.

Continuing with FIG. 20 with reference to FIG. 19, the RSR-coding portion 2000 of an advanced encoder (e.g. 1900 of FIG. 19) can be implemented in a fully programmable manner, thereby providing maximum flexibility and responsiveness in conjunction with typically dynamic source image data and other information. For example, as depicted, RSR-coding engine 2001 comprises coupled elements including analysis and reconstruction/quality or "determining" tools 2002, optimizing tools 2003 and coding-implementing tools 2004 capable of receiving and processing source information 2005 in accordance with RSR operating parameters 2011. Those skilled in the art will appreciate that the character and complexity of each image in a conventional image single image data stream can vary considerably. Therefore, optimization might require different tools for different images, combinations of images and/or image portions.

Additionally, several other factors are found to favor the dynamic adaptability of a programmable RSR-coding implementation. For example, the potential for dynamic image variation can exist where multiple source image data streams might be utilized (e.g. as taught by co-pending application Ser. No. 60/096,322). Dynamic variation might further result from intermittent, static/pattern-based and/or dynamic data modification imposed by capturing and imaging and/or from user information and/or discussed adjustment of RSR operation. Further, in addition to existing knowledge base system/application and codec-type parameters 2011, ongoing system/application related parameters (e.g. available bandwidth and/or other image aspects, decoder utilization, cooperative/distributed coding and reconstruction, receipt of downloadable coding/reconstruction tools and/or tool modifications, etc.) might also dynamically affect optimal coding of image data and/or other operational considerations. Feedback (e.g. standard-coded data) and/or other factors might also dynamically impact RSR-coding (e.g. multiple aspect optimization iteration), among other examples.

As shown in FIG. 20, a variety of tools most easily understood as enabling analysis and/or quality control or "determining tools" 2002 (e.g. see super-domain model) preferably comprise optical flow analyzer 2021, entropy level analyzer 2023, human visual system modeler 2025, rate/quality controller 2027 and SR/standard-coding reconstructer 2029. (Those skilled in the art will appreciate, however, that specific functional distinctions are depicted for discussion purposes and, in practice, such distinctions are actually blurred by overlapping operational considerations.)

Optical flow analyzer 2021, for example, facilitates image optimization susceptibility determination (e.g. 1911 of FIG. 19). Thus, optical flow analyzer 2021 preferably comprises the discussed edge detection, object identification and object motion detection tools, the operation of which will be understood by those skilled in the art. Further use of such tools in the context of the present invention, however, will also include identification of directly-correctable image defects (e.g. poorly defined edges), excessive frequency and/or other aspects (e.g. susceptible to diffusion and/or registration), difficult to efficiently standard-code characteristics (e.g. patterns) and/or other characteristics capable of being determinably optimized.

Entropy estimator 2023, for example, enables determining optimization opportunity within standard-coding (e.g. 1913 of FIG. 19), more preferably in conjunction with rate/quality control 2027 and reconstructer 2029. More specifically, as discussed, high entropy (e.g. as a result of spatial content complexity, motion vector field divergence, etc.) of successive images will limit redundancies that can be utilized for certain optimizations (e.g. diffusion, registration, etc.). In addition, high-entropy will consume available bitrate (e.g. limiting the availability of "bits" for meta data) unless a more compact image representation can be formed utilizing the optimization tools (e.g. synthetic coding, diffusion, registration, etc.). As is often the case with codec implementation, a degree of compromise among various factors will have to be made. The use of rate/quality control 2027 can also be useful in this respect. For example, where a telecine device is utilized in conjunction with coding, an increased frame rate in resultant standard-coded image data will provide further opportunities (e.g. frames) for optimization (e.g. rather than simply repeating information from a previous frame, as is conventionally done, new diffused, interpolated and/or other image data can be used to "fill" the additional frames). Conversely, too much composite information can also be dispersed such that the information can be accommodated by standard-coding without causing truncation error. Entropy estimator 2023 can also be utilized in conjunction with reconstructer 2029 to identify redundancy occurrences in standard-coded data (e.g. using feedback, standard-coding estimation and/or simulation, etc.), for example, by comparing various optimization results in a sequence (e.g. scene) of standard-coded frames.

Human visual system modeler 2025 is difficult to categorize since anticipating the way in which a resultant image will be perceived is useful in determining susceptibility (e.g. is a given optimization perceptually sufficiently enhancing alone and/or as compared with other potential optimizations), in determining opportunity (e.g. is standard-coding capable of conveying a significant perceptual difference either alone and/or in conjunction with bitrate-available meta data opportunity) and in coding implementation (e.g. diffusion, registration, meta data, etc. can be implemented in accordance with natural SR-effects produced by the human visual system, such that specialized reconstruction is unnecessary), among other examples. (As noted above, the unique use of such modeling in accordance with the invention can be conducted in accordance with known and emerging human visual system models, the use of which in affecting preferably parameter-based optimization tool operation will be apparent to those skilled in the art in view of the teachings herein.)

It should also be noted that other tools can also be utilized for "determining." For example, a probability distribution function ("pdf") measurer can be used to affect subsampling, which can further be signaled to reconstruction tools (e.g. using meta data) to improve the accuracy and reduce computational requirements of "a priori estimation" in performing SR-reconstruction (In conventional-SR, pdf is estimated without further information and is therefore computationally intensive and subject to inaccuracy). Color space tools can also be utilized in accordance with the source image data, for example, in performing RSR-based and/or advanced-SR (e.g. using meta data) assisted color space conversion (e.g. using information received from a capture/imaging device). A dynamic range analyzer can further be used for conventional preprocessing analysis as well as for providing optimization consistent with determined dynamic range image-characteristics. A motion blur analyzer can be used for conventional preprocessing, and in addition, for estimating perception of objects undergoing blur and psf. Spectral analysis can also be used, for example, in estimating image complexity and in providing a basis for frequency diffusion and/or application of other optimization tools. A noise analyzer can be used conventionally, as well as in understanding coding quantization noise reduction and conducting multiple representation optimization, for example, by reinserting a simulated look-and-feel of an original signal, reducing graininess, etc. Spatial and/or temporal masking can, for example, be used respectively for identifying image portions that are not well perceived due to spatial characteristics and/or limited temporal exposure, such that enhancement is less important than for other images, image portions and/or image aspects. Those skilled in the art will appreciate that these and other tools and other applications of such tools might be utilized in accordance with the teachings herein (e.g. within standard, replacement and/or modifiedly supplied RSR tool sets).

The applicability of such analysis tools should also become more apparent with regard to such preferred optimization tools 2003 as spatial enhancer 2031, noise reducer 2033, diffusion analyzer-controller ("diffusion-controller") 2034, registration analyzer-controller ("registration-controller") 2035, high-definition projector 2037, filter engine 2038 and other tools 2039. Spatial enhancer 2031 enables implementation of non-diffusive (and can be used to support diffusive) spatial image optimizations (e.g. edge enhancement, pattern encoding, perspective, rotation, 3D, deformation, morphing, etc.), for example, as discussed above and/or in the above-mentioned co-pending applications. Noise reducer 2033 enables such noise optimizations, for example, as discussed with reference to the above noise analyzer.

Diffusion-controller 2034 can be combined with analysis and/or implementation tools (as can other tools). However, a localized diffusion optimizer (e.g. in providing the above mentioned diffusion methods) and/or further separated diffusion types (not shown) enables a more clearly understood functionality in providing data and/or information for diffusion and/or addition as meta data. Registration controller 2035 preferably operates in a similar manner as with diffusion controller, but in performing the above-discussed registration of image and/or image portion aspects. High-definition projector 2037 enables sub-pixel registration and/or other finer-definitional processing, representation, coding, transfer and reconstruction or "projection" of other image and/or image portion aspects within a standard-coding space in accordance therewith. As discussed, such finer definitional representations can be conducted in accordance with diffusion, registration and/or other tools and can also be conveyed in conjunction with meta data (i.e. and/or advanced constructs). Filter engine 2038 provides a preferred mechanism for implementing certain optimizations, as will be further discussed, although other techniques for incorporating modifications will also be apparent to those skilled in the art. Other tools 2039 is included to once again indicate that the illustrated preferred tools are not exclusive and that other tools, tool sets and/or tool modifications (e.g. supporting distributed and/or cooperative operation) as applied in accordance with the invention can also be utilized.

Implementation tools 2004 preferably comprise bitstream packer 2041, meta data generator 2043 (e.g. data adder 1902 of FIG. 19), diffuser (e.g. 1925 of FIG. 19), reconstruction coordinator 2047 and sample-base converter 2049. Bitstream packer 2041 packs various elements into an overall bitstream (e.g. coefficients, motion vectors, coding modes, flags, etc.). Usually, such elements will comprise tokens including a combination of variable length codes ("VLC") and fixed length codes ("FLC"). Meta data generator 2043 preferably operates in conjunction with diffuser 2045 whereby the discussed coordination of the use of diffusion, registration, meta data and advanced constructs can be utilized for bitrate minimization. That is, in addition to utilizing one or more optimization tools to provide an optimal combination of data (e.g. 1921 of FIG. 19) and then generating diffused and/or other output as final coding operations (e.g. 1923 and 1925), such coordination can alternatively and/or in conjunction therewith be conducted by implementation tools. Reconstruction coordinator 2047 further enables optimized image data to be preserved, for example, where the results of one or more reconstruction-then-recoding iterations are compared and an earlier (preserved) iteration is actually utilized, as noted earlier. Finally, sample-base converter 2049 enables the discussed downsampling, upsampling and transcoding-support to be provided. As with other tool "types", other implementational tools are also expected to be utilized in accordance with particular system and/or application considerations (e.g. diffusion, meta data, global vs specific reconstruction support, integrated RSR-standard coding, etc.).

Operationally, several alternatives are provided in accordance with RSR-coder 2000. For example, in a less-complex system, source data can be optimized in accordance with the knowledge base provided by parameters 2011 and tools 2002–2004. General system parameters, for example, provide more static constraints (e.g. available bitrate, high-definition still-image image insertion rate, decoding tools utilized, etc.). Conventional codec parameters can further provide base operational characteristics corresponding with the standard, conventional-SR and/or advanced-SR tools generally supported, which can further be supplemented/modified by ongoing application parameters/tools and/or feedback in a more capable system. Unidirectional and/or bidirectional communication can further be utilized in conjunction with capture and imaging information user input and/or additional application parameters (e.g. cooperative codec information from a single and/or distributed reconstruction unit. Even further functionality can also be achieved, for example, in accordance with statically and/or dynamically changing system/application constraints (e.g. varying available bitrate, authorization for higher-definition service to some designated STB), among numerous other possibilities enabled by the invention.

In FIGS. 21 through 24 with reference to FIG. 19, an exemplary standalone RSR-coder 2100 (e.g separately implementable as with a conventional preprocessing stage) is illustrated in greater detail. For clarity sake, the implementation is simplified and certain modifications enabling improved functionality will be discussed separately. The naming conventions utilized in the prior corresponding encoding example of FIG. 19 have also been modified to better convey a preferred filtering technique for implementing modifications. Additionally, signal flow indicators have been added such that the overview FIG. 21 might be more easily compared with the element details in FIGS. 22 through 24. As depicted, S denotes source image data, P denotes capturing and prior processing information (e.g. psf as supplied electrically and/or by a user), D denotes determination results, M denotes generated signal modification information and S' denotes the source image data as modified in accordance with signal modification information M.

As shown in FIG. 21, RSR-coder 2100 again includes an analyzer 2101 and an optimizer 2102, the optimizer being connected to a standard-coder 2103 and multiplexer 2104, as in the previous example. In the present example however, analyzer 2101 comprises a single enhancement potential evaluator or "determination" tool 2111. Further, the present optimizer comprises an RSR control and modification generator 2121 (i.e. as opposed to the more general optimization tools 1921 of FIG. 19) and diffuser 1925 of FIG. 19 is more specifically denoted as signal modifier 2125. Also, in the present example, pre-encode capturing and processing information P is preferably received via connection to determiner 2111 of analyzer 2101 and RSR control and modification generator 2121 of analyzer 2102; source image data S is received via connection to determiner 2111 and signal modifier 2125.

Figure 21:
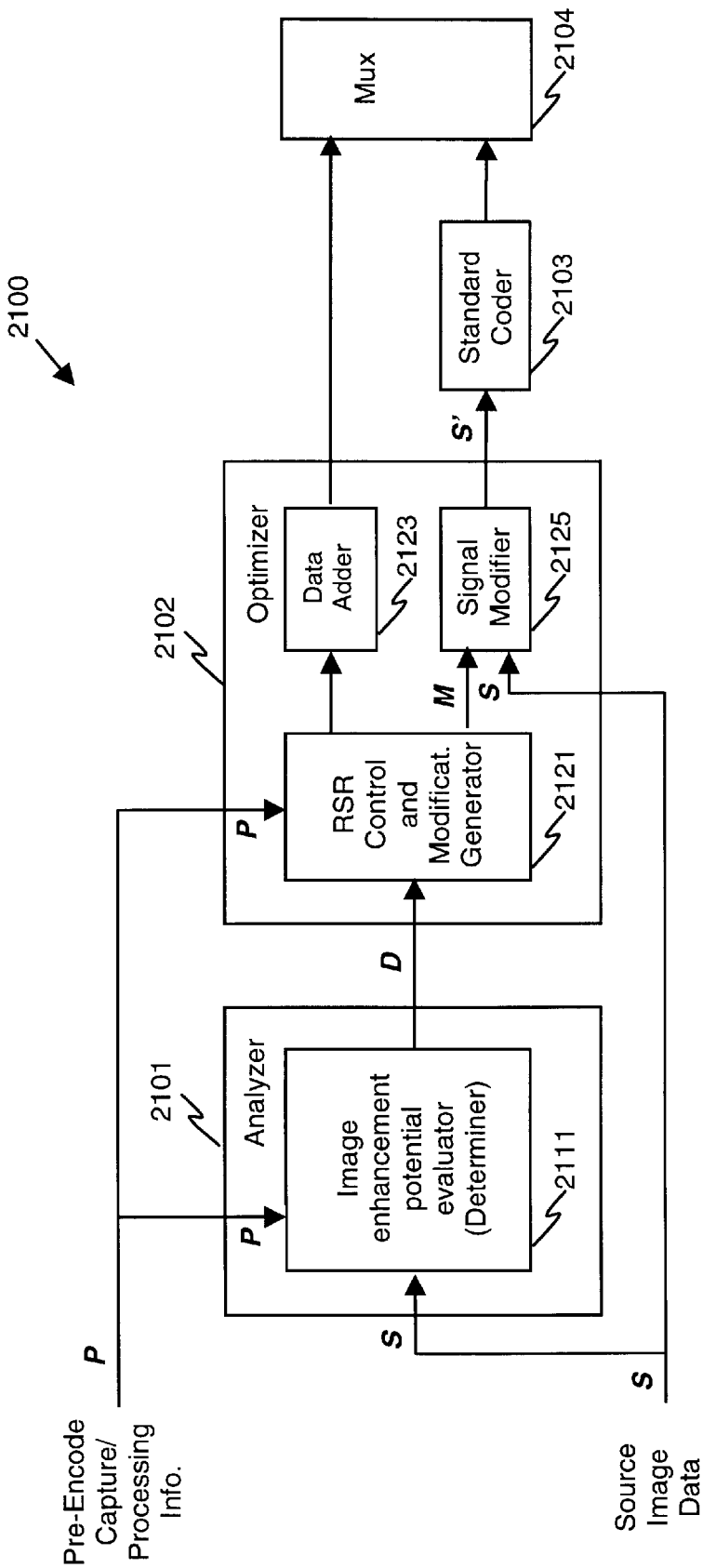
FIG. 21 is a flow diagram broadly illustrating a separately implemented advanced encoder according to the invention.
Figure 22:
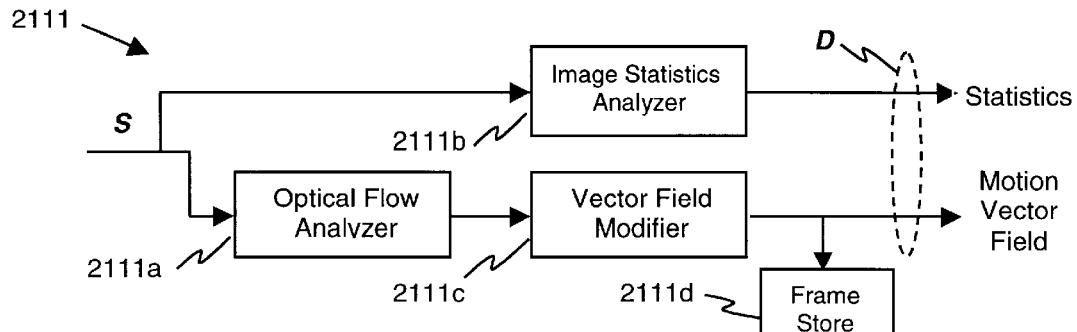
FIG. 22 is a flow diagram illustrating, in greater detail, a determiner element of the advanced encoder of FIG. 21.

Continuing with FIG. 22, determiner 2111 of FIG. 21 comprises connected elements including optical flow analyzer 2111a, image statistics analyzer 2111b, vector field modifier 2111c and frame store 2111d. Optical flow analyzer 2111a can comprise, for example, a high accuracy edge detector for determining object boundaries or edges in successive frames and more specific optical flow detection for determining forward and backward object intra-frame motion, thereby producing an initial motion vector field. Vector field modifier 2111c then motion compensates the determined motion vectors, for example, to remove camera jitter and/or other motion artifacts, thereby producing determination results D (comprising the indicated motion vector field). Vector field modifier 2111c further preferably stores resulting motion compensated frames in frame store 2111d. (More preferably, motion compensation is provided dynamically for each object and is determined on a pixel or sub-pixel accuracy basis.) Image statistics analyzer 2111b further performs the discussed analysis of spatial, frequency and/or other image aspects (see determining above), thereby producing additional determination results including statistical measurements or "statistics."

Figure 23:
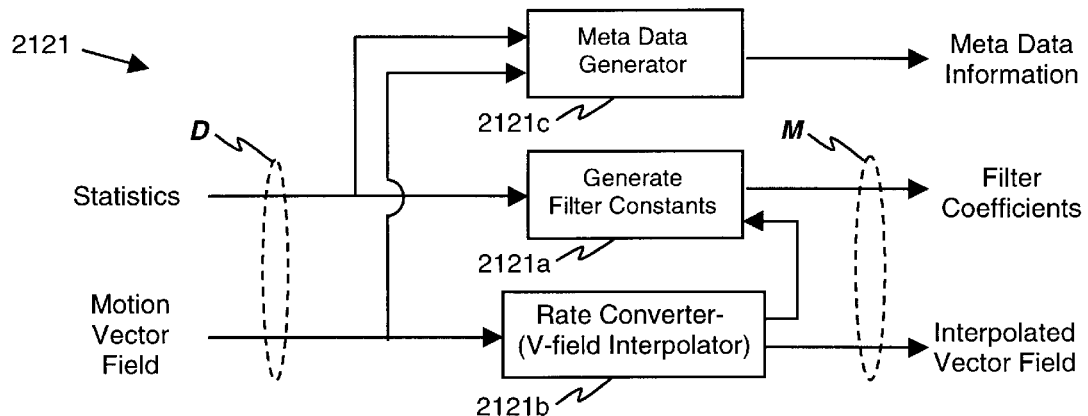
FIG. 23 is a flow diagram illustrating, in greater detail, an RSR control and modification generator element of the advanced encoder of FIG. 21.

As illustrated in FIG. 23, RSR-control and modification generator 2121, which receives determination results D from determiner 2111, preferably comprises coupled elements including filter constants generator 2121a, rate-converter 2121b and meta data generator 2121c. Filter constants generator 2121a receives statistics and, preferably utilizing statistics as essentially a script (e.g. in accordance with application parameters), produces signal modification information M including filter coefficients. In addition, rate converter 2121b enables frame rate conversion including, for example, interpolation of objects within added frames. The resultant interpolated vector field can then be used as a script to enable actual synthesis of interpolated objects via diffusion. The received statistics and motion vector field can also be utilized by meta data generator 2121c to generate meta data information.

Figure 24:
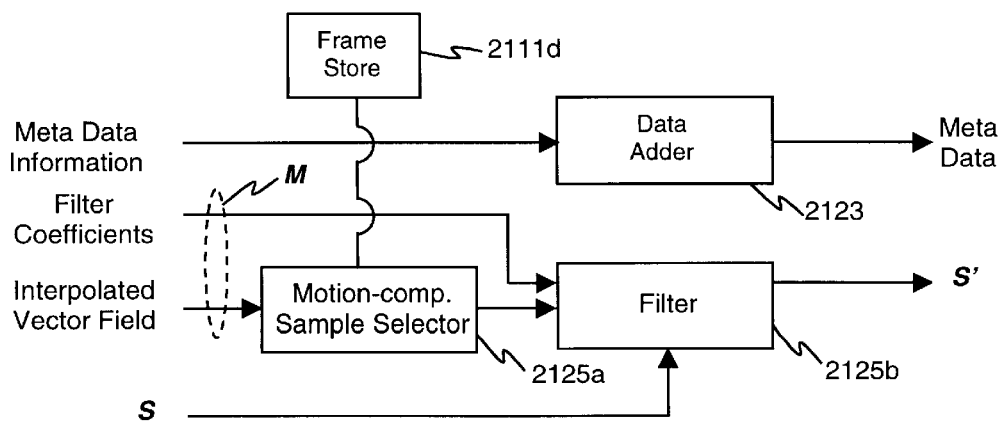
FIG. 24 is a flow diagram illustrating, in greater detail, data adder and signal modifier elements of the advanced encoder of FIG. 21.

FIG. 24 illustrates further elements of optimizer 2102 of FIG. 21. As shown, optimizer 2102 also comprises motion-compensation sample selector 2125a, filter 2125b and data adder 2123. Sample selector 2125a retrieves and provides to filter 2125b the motion-compensated frame information stored by vector field modifier 21111d of FIG. 22. Filter 2125b also receives the filter coefficients generated by filter constant generator 2121a of FIG. 23 and source image data to produce optimized source image data S'. In addition, data adder receives the meta data information produced by meta data generator 2121c of FIG. 23 and formats the information to produce meta data.

As will be understood by those skilled in the art, the above standalone implementation, while more easily integrated within an existing system utilizing standard-coding, is non-ideal for highly accurate and complex superimposed optimization. Certain modifications can, however, be made to provide greater control while maintaining many of the advantages of separately implemented RSR-coding. For example, feedback of the resultant optimized standard-coded data can be implemented in accordance with the feedback loops illustrated in FIG. 19 and in conjunction with standard and/or advanced-SR reconstruction given in the FIG. 18 programmable RSR example. The resulting "feed-forward" configuration would then operate to provide a first frame, the coding and reconstruction of which could further be utilized for optimization of remaining frames in accordance with various optimizations enabled by the invention. Additionally, by simulating, emulating or adding a standard coder to the RSR coder (e.g. as given in FIG. 4), an initial "test" coding could, for example, be conducted using RSR and standard-coding, and then standard and advanced reconstruction. Still further, various other tools and/or tool combinations discussed and/or otherwise enabled by the invention could also be utilized, and a comparative form of determining (as will be discussed) could be utilized, among other examples. It should also be noted that application of various manipulations and in accordance with other than vectors or statistical bases can also be utilized (e.g. splines, coefficients, codewords, models, dictionaries, curves, etc.).

Figure 25:
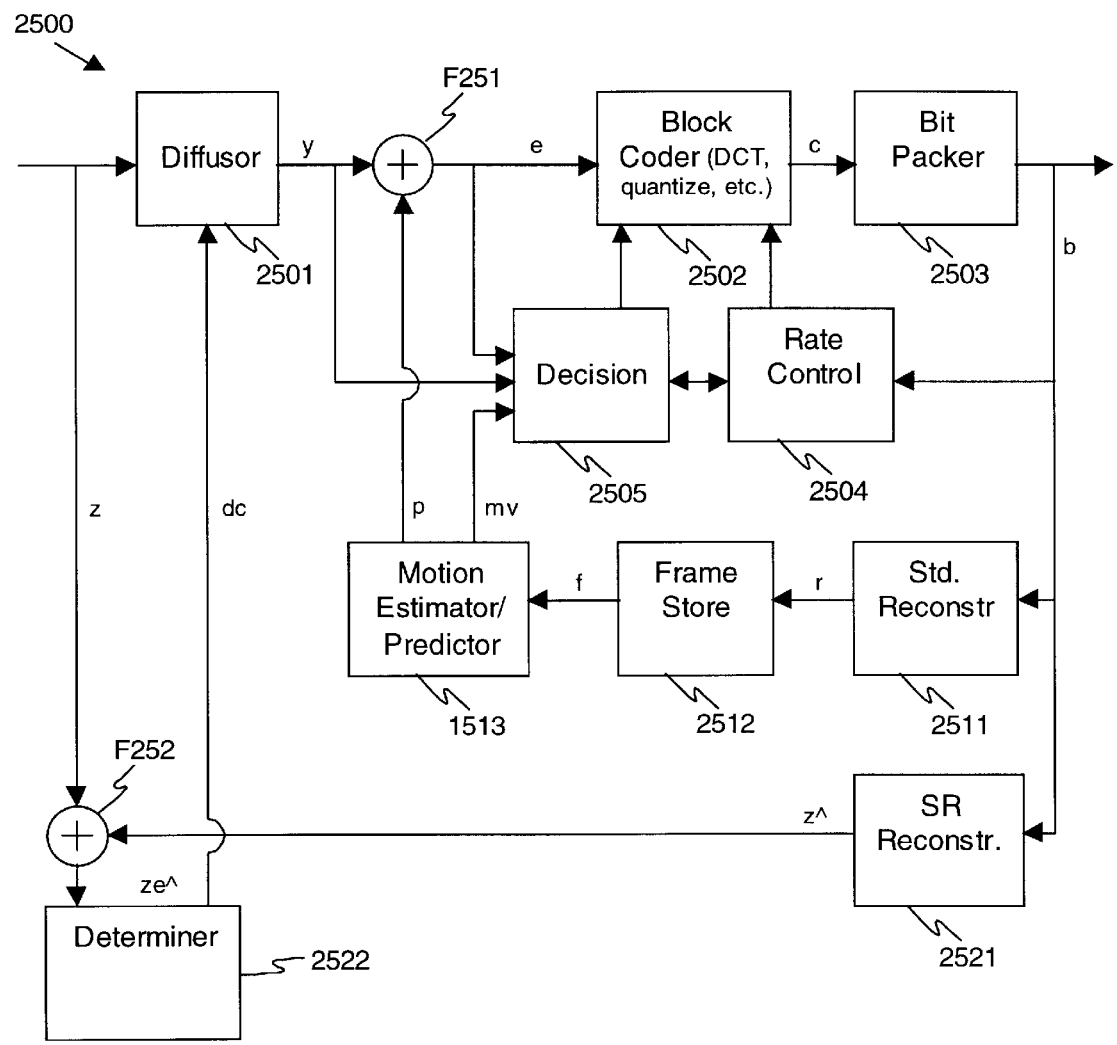
FIG. 25 is a flow diagram illustrating an integrated advanced encoder according to the invention.

Turning now to FIG. 25, an example of integrated RSR-coding is illustrated. As shown, advanced encoder 2500 comprises coupled elements including diffuser 2501, block coder 2502, bit packer 2503, rate control 2504, decision block 2505, standard-decoding 2511, frame store 2512, motion estimator-predictor 2513 advanced-SR reconstruction 2521 and determiner 2522.

Advanced-encoder 2500 comprises many of the same elements and is capable of similar operation as with the above standalone RSR-coding with the noted improvements, but with greater control and higher efficiency (e.g. without duplication element operation, direct access to and control of the resultant bitstream, parallel processing capability, etc.). For clarity, a feed-forward configuration is again utilized and more "complete integration" (e.g. coded bitstream manipulation, standard-coding alteration, etc.) is felt to unnecessarily obscure more basic operational characteristics with aspects that should be apparent in view of the discussion herein. However, as with the standalone encoder above, those skilled in the art will appreciate that various other configuration types (e.g. trial-and-error/iterative, open loop, etc.), and more or less integrated configurations with considerable permutation can also be utilized in accordance with the invention.

Operationally, source image data and other available information is received by diffuser 2501 and modified using diffusion, registration, spatial and/or related optimization tools in the manner already discussed. The diffuser results are then transferred to block coder 2002 and decision block 2605. Further application of advanced tools, quality assurance and other features are next provided by coding-rate loop (i.e. block coder 2502, bit packer 2503, rate controller 2504 and decision block 2505), standard-decoding loop (i.e. standard-reconstruction 2511, frame store 2512 and motion estimator 2513, with modification function and decision block 2505 branching) advanced-reconstruction feedback loop (conventional/advanced-SR reconstruction 2521 and determining 2522), and pre-function (F251) and post-function (F251) diffusion branching (e.g. using a combining function F251).

In the coding-rate loop, raw and determining-optimized diffuser 2501 results, rate controller 2504 feedback, standard-decoding results and decision block directed such results are standard-coded. More specifically, block coder 2502 and bit packer 2103 can operate in a standard or further efficiency-optimized (e.g. bitrate-minimized) manner to provide packed standard-coded data. Rate control 2504 further provides for static and/or decision block directed (e.g. in accordance with other information, reconstruction feedback, system/application parameters, etc.) frame rate conversion, for example, as discussed above. While such control information is applicable generally to all encoder 2500 elements, decision block 2505 also provides a more centralized control capability, for example, in implementing determinable knowledge base elements in accordance with the earlier discussed super-domain model.

In the standard-decoding loop, standard-decoding 2511 supplied modified (i.e. RSR-enhanced) image data is buffered by frame store 2512 such that conventional, or more preferably, the discussed advanced-accuracy (e.g. bit-based, object-based, etc.) motion estimation and prediction can be conducted by motion estimator-predictor 2513. Following motion estimation/prediction, the resultant image data can again be standard-coded, this time in conjunction with diffused data, rate control and/or other tools applied by decision block 2505. Thus, for example, the earlier-discussed standard-coding degradation can be minimized.

The advanced-reconstruction feedback loop enables quality control and/or further optimization to be conducted by raw RSR-refinement (e.g. applying successive optimizations), comparing various RSR-coding results (as will be discussed) and/or using extrapolation and/or other techniques, such as those already noted. As shown, advanced reconstruction (which can also include or utilize standard-decoding) enables standard-coded as well as conventional and/or advanced-SR reconstruction tools to be utilized in "fusing together" various standard and enhancement domain data types. The reconstructed image data is then subject to determining 2522, after which further optimization can be conducted in accordance with determining results. As with F1, the function implemented by F252 can utilize additive and/or other modification, for example, as appropriate to a particular application and/or particular determining techniques.

Figure 26:
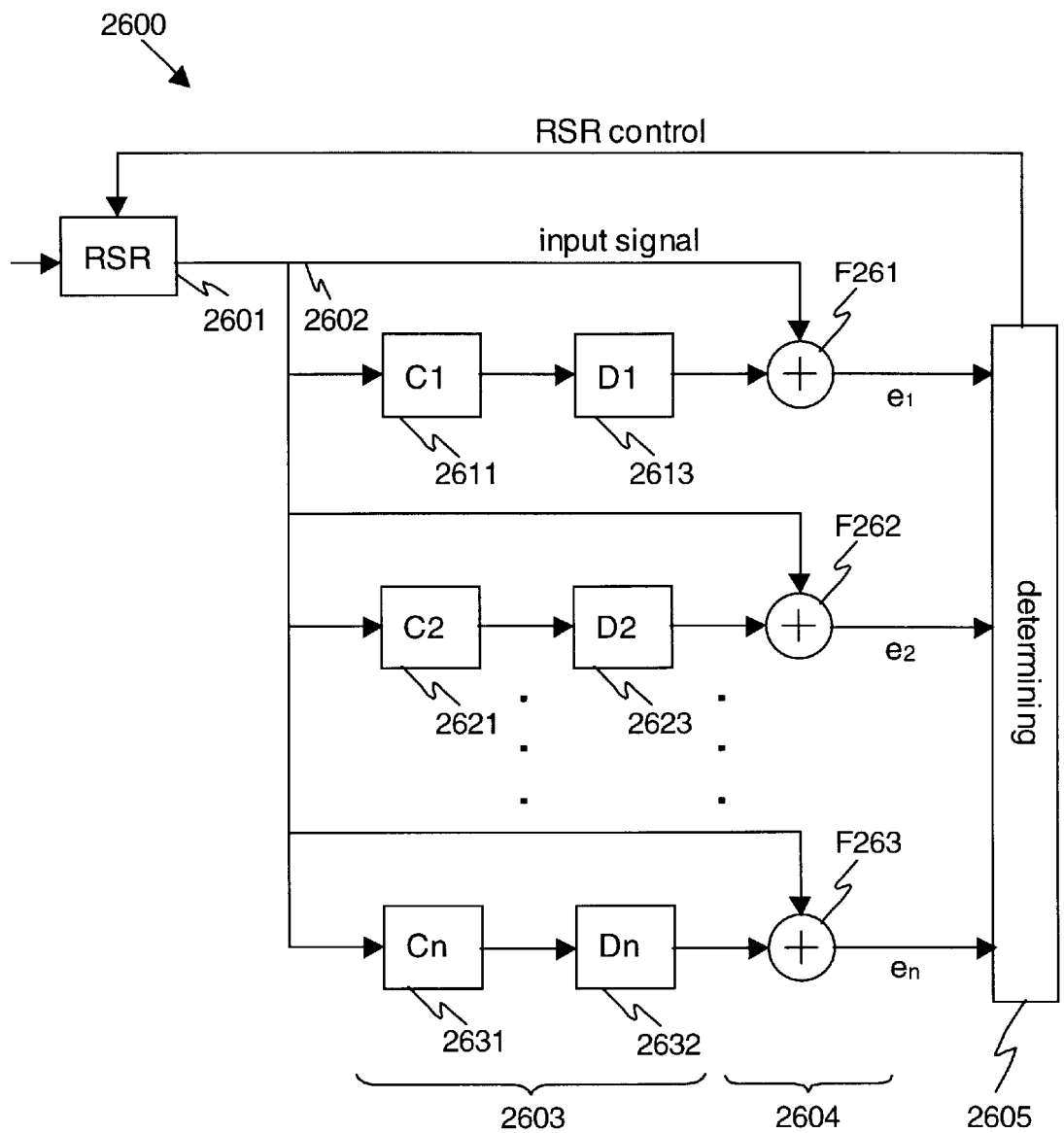
FIG. 26 is a flow diagram illustrating a comparative determiner according to the invention.

Continuing with FIG. 26, a comparative codec/redundancy modeling and mapping determining technique, such as that illustrated, enables more finely "tuned" singular and/or distributed optimizations to be implemented in systems utilizing standard-coding. As shown, a reference signal 2602 can be formed utilizing RSR-coding tools 2601. Such tools can merely provide source image data, as is preferred for robustness, and/or another reference signal (e.g. using reference static, patterned and/or dynamic optimizations, standard coding and decoding, pre-encoder processing, imposing other application/system processing, etc.). In addition, further processing "attempts" 2603 are conducted, preferably utilizing process-coding attempts C1 2611 through Cn 2631 and decoding/reconstruction attempts D1 2612 through Dn 2632. Such attempts are further compared 2604 against the reference 2602 and, more preferably, further measured against one another by determining block 2605. Each process-coding attempt will typically be unique and can comprise the results of application of any one or more of the aforementioned conventional and/or advanced coding tools. More preferably however, the reference and an instance of standard-coding is compared against the performance of one or more singular and/or combined RSR-coding tools. Similarly, a singular reconstruction attempt (e.g. standard and conventional or advanced-SR) to better understand various coding attempts, matched coding and decoding can be used (e.g. to compare optimization and/or degradation avoidance) or various combinations of coding and decoding tools can also be compared.

For example, determining can be used to identify and/or map instances of redundancies that can be utilized in performing diffusion according to the invention. In one implementation, for example, a reference signal can be compared against various coding tool combinations and corresponding reconstruction tool combinations. As indicated above, functions 2604 can comprise one or more combining or other functions in accordance with a particular system/application. Determining 2605, upon receipt of such combined information, can perform analysis for each information set in the manner discussed above. Determining 2605 can then compare the analysis results. Using spatial compactness as an exemplary comparison criteria, a given frame might, for example, be coded as an I-frame in one instance and a P-frame in another, indicating that the I-frame producing tools are performing less efficiently and that a spatial redundancy exists that can be exploited using the I-frame producing tools. Alternatively, bitrate might be reduced using the P-frame producing tools for that frame to create additional bitrate for other optimizations and/or the use of meta data. Such comparative techniques can further be utilized through modeling and mapping. In this example, determining 2605 can further comprise modeling information that identifies a redundancy pattern as are found to be uniquely produced by particular standard coding. Such patterns are further found to be repeated, typically in a temporally constant manner. Thus, once a particular coding-redundancy pattern has been identified, further analysis (e.g. with regard to one or more image aspects) can be avoided and a redundancy location map can be ascertained (e.g. with respect to a current scene), thereby decreasing computational determining requirements. Other processing in accordance with such patterns can also be extrapolated, thereby decreasing computational requirements even further, among other examples.

Figure 27A:
FIG. 27a illustrates a quality level comparison achievable in conjunction with conventional standard coding and decoding, conventional-SR enhanced standard coding and an advanced codec according to the invention.
Figure 27B:
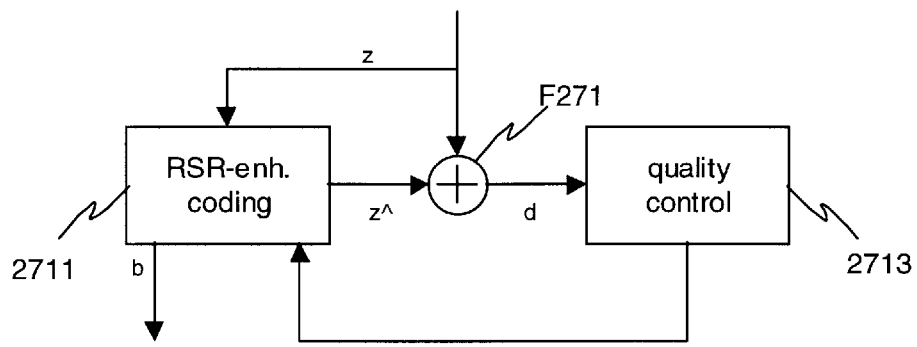
FIG. 27b is a flow diagram broadly illustrating quality control as applied to advanced coding according to the invention.
Figure 27C:
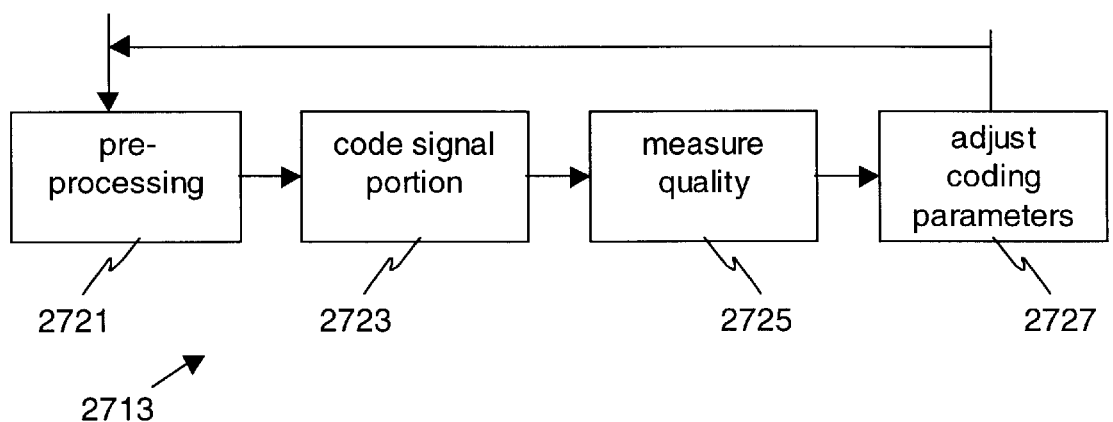
FIG. 27c is a flow diagram illustrating, in greater detail, how quality control is provided in accordance with the invention.

FIGS. 27a through 27c further illustrate how the above discussed quality considerations are taken into account in the various aspects and implementational characteristics of the invention. FIG. 27, for example, compares the typical observed quality relationships produceable in conjunction with an RSR plus MPEG-2 encoder and MPEG-2 plus advanced-SR reconstruction ("advanced-codec") 2701 according to the invention, MPEG-2 encoding and conventional-SR ("conventional-SR") 2702, and MPEG-2 encoding and decoding ("MPEG-2 codec") 2703. As shown, MPEG-2 codec 2703 tends to produce the lowest median quality level of the three codec examples; however, the quality variance is low (i.e. consistent quality is provided) such that perceived quality variance artifacts are largely avoided. In contrast, conventional-SR 2702 maintains a median quality level greater than that of an MPEG-2 codec 2701; however, the quality variance of conventional-SR is very high, ranging from no improvement over MPEG-2 codec-2701 to areas of significant improvement (both inter and intra-frame). Therefore, quality variance artifacts are often perceivable and distracting. Finally, advanced-codec 2703 tends to provide the highest median quality level of the three examples. Additionally, as with MPEG-codec 2701, advanced-codec 2703 also provides very low quality variance. Such low variance is partly due to the use of feedback (abet different types) with both the MPEG and advanced codecs (e.g. as in FIG. 27b). Advanced codec quality also benefits from many of the above discussed unique advanced-codec aspects (e.g. diffusion\registration enhancement infusion, meta data utilizations, dynamic optimization, etc.)—all of which conventional-SR lacks.

Further, quality control capability permeates optimization, as is illustrated by FIG. 27c. FIG. 27c provides a view of many of the tools and other aspects of the invention in accordance with a broad quality control technique. As shown, quality control can be viewed as being conducted within several iterated stages comprising preprocessing 2721, code signal portion 2723, quality measuring 2725 and coding parameter adjustment 2727.

Preprocessing 2721, rather than conducting conventional isolated or mechanical information removal, is responsively implementable in accordance with the super-domain model and superimposed optimization coding and reconstruction. As discussed, preprocessing adjusts input signal to match target content (such as entropy), among other responsibilities, such that the input signal can be expressed within the constraints (e.g. quality, bitrate) set by the rate control algorithm. Stated alternatively, preprocessing can be utilized for noise and data conditioning in a coordinated manner with enhancement infusion, multidimensional compositing and other quality-facilitating optimizations, rather than simply conventional data-fitting signal degradation.

Code signal portion 2723, which comprises RSR-enhanced coding 2711 (FIG. 27b), produces a bitstream and/or decoded image whose reconstructed form can be compared in quality measuring 2725 (FIG. 27c). RSR-enhanced encoding enables maximization of both high quality and quality consistency given constraints such as bitrate, latency, and coding tools. Quality consistency minimizes the variation in quality measurements between neighboring coding portions (such as macroblocks in MPEG-2), images, and set of frames.

Quality measuring 2725 in accordance with the invention can be conducted, for example, by comparing the reconstructed signal portion to the target signal (e.g. raw source image data). Quality can further be ascertained in accordance with the relative human visual quality perception of an image portion (e.g. intraframe determination) and sequence (e.g. a scene) as a metric prediction rather than a purely numeric measure (e.g. over a static frame or number of frames). Approximations, such as mean square error, absolute error and/or signal to noise ration, among others, can also be generated by comparing the original, standard-reconstructed and enhanced reconstructed signals, which can further be quality-facilitated during reconstruction (discussed next).

Coding parameter adjusting 2737, as facilitated by the super-domain model and superimposed optimization (e.g. as an integrated encode subsystem) and other aspects of the invention, can affect both coding parameters and preprocessing (as well as reconstruction). At each coding iteration, (e.g. the next coding portion or a re-coding of the current coding portion) coding parameter adjusting 2737 preferably imposes constraints set by the rate control algorithm such as bitrate, quality, and quality variation. For example, adjusted preprocessing parameters can include low pass filter design and median filter control, motion blurring, frequency selection, and pattern control (see FIGS. 8 and 20). Adjusted coding parameters can further comprise quantization control (e.g. MPEG quantizer scale), coefficient thresholding, rate-distortion multipliers, and decision mode options, among other examples.

Figure 28A:
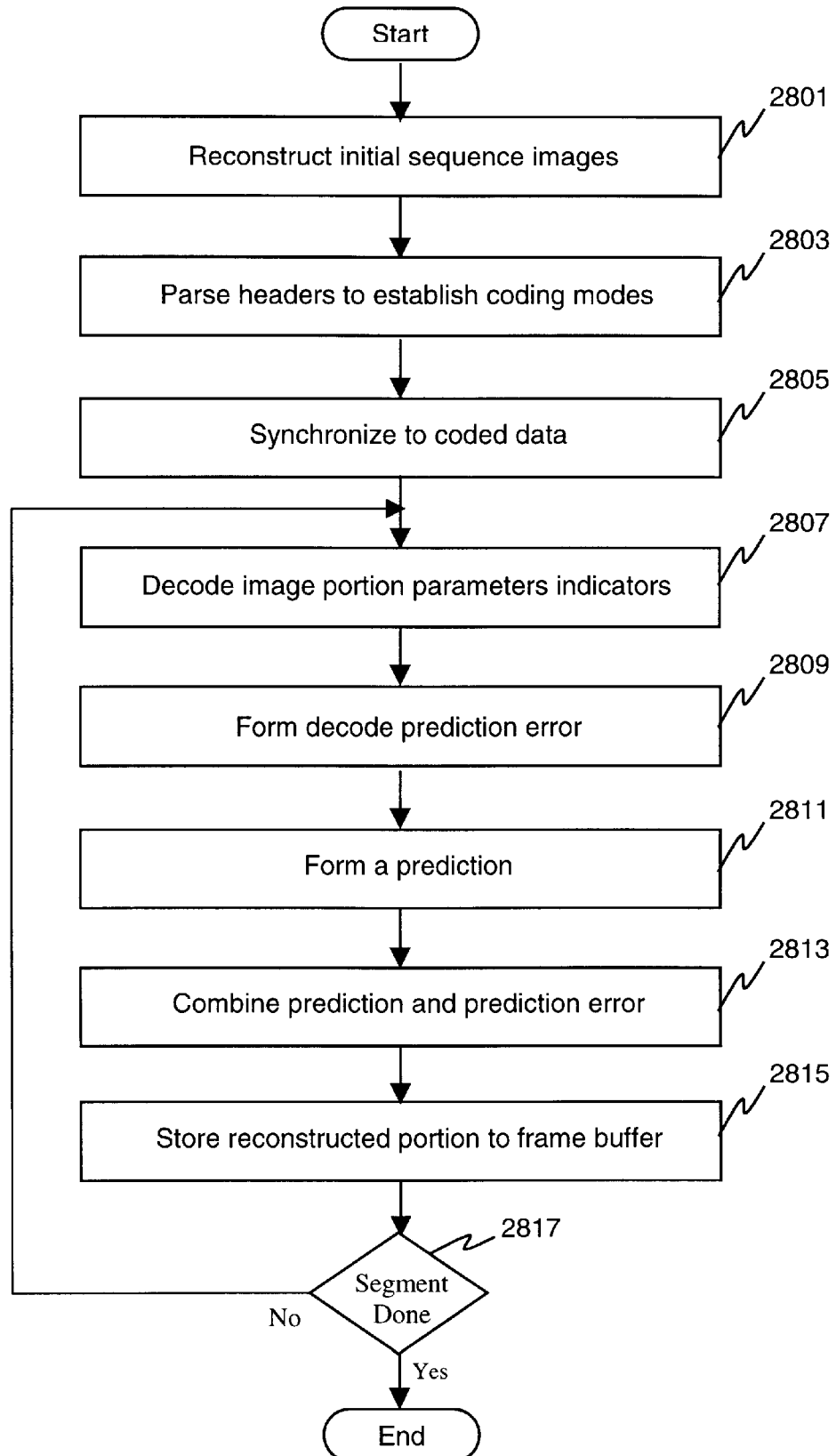
FIG. 28a is a flowchart illustrating a standard-decoding portion of an advanced decoding method according to the invention
Figure 28B:
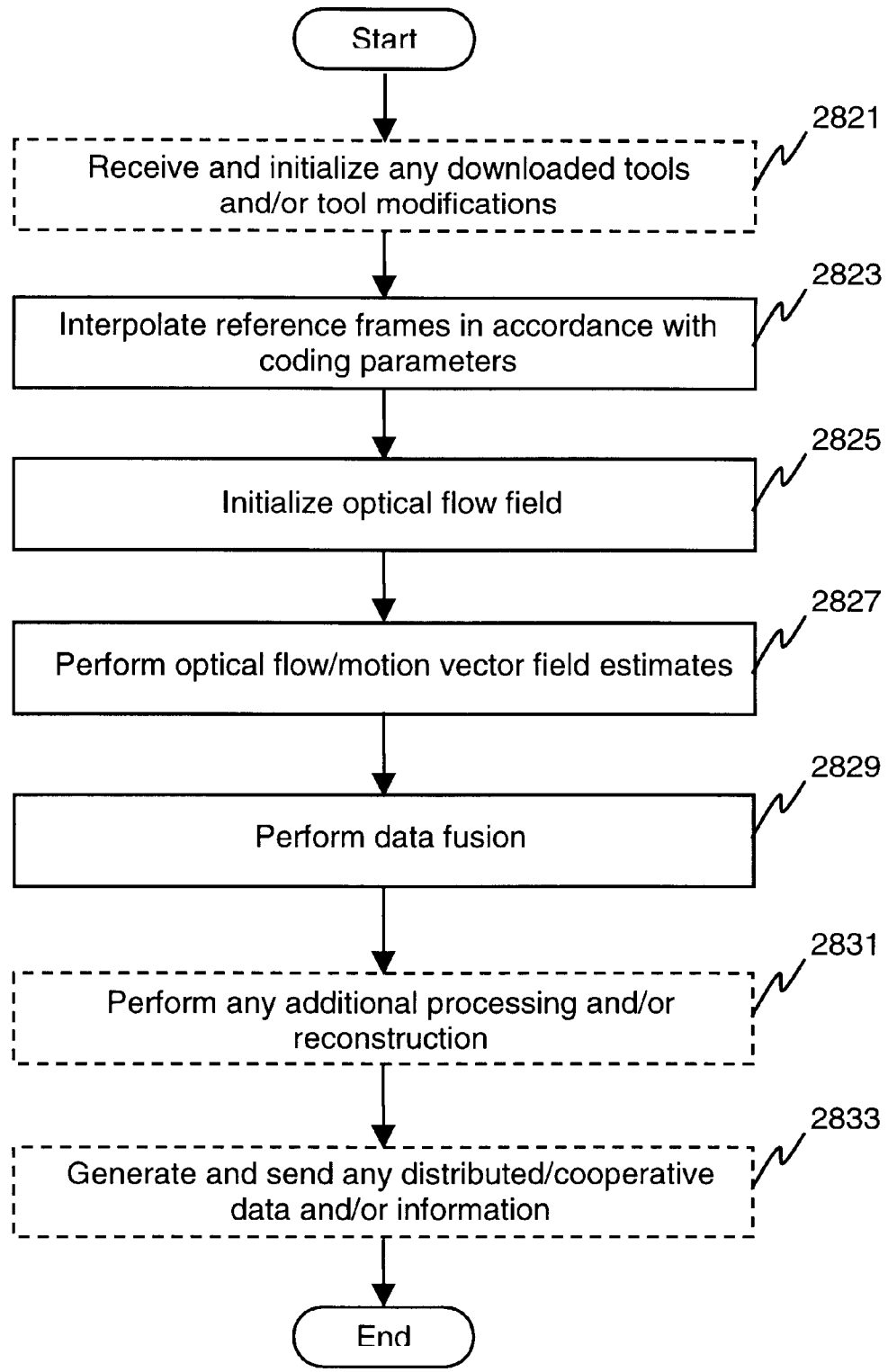

Having considered coding implementation examples, we now turn to reconstruction implementation considerations. In FIGS. 28a and 28b, an advanced-decoding method is broadly illustrated that is capable of being effectuated by the advanced-decoder implementations that follow, as well as other implementations that will be apparent to those skilled in the art in view of the teachings herein. In a complimentary manner with the above encoding discussion, the depicted method also incorporates aspects of the super-domain model, non-standard and/or standard construct usage and further illustrates the decoding (e.g. reverse operations consistent with still/motion image aspect application requirements) of such optimizations as diffusion and registration, as well as the use of meta data. Steps performed by advanced-decoding can also be viewed and implemented in accordance with selectable, replaceable, modifiable and downloadable tools, among other possibilities. Decoding can further be conducted in a manner consistent with emerging conventional-SR techniques as well as in accordance with the above-mentioned co-pending applications, as are facilitated by the teachings herein. Those skilled in the art will also appreciate that complimentary or otherwise consistent coding tools can also be utilized to facilitate and/or accomplish such techniques; such facilitation can further be conducted in a distributed and/or cooperative manner (e.g. see the above super-domain and network configuration discussions).

As shown in FIG. 28a, which depicts steps preferably conducted by standard decoding elements, in step 2801, an initial sequence of images is reconstructed in a conventional manner. In step 2803, the headers are parsed to establish coding modes. In step 2805, decoding is synchronized to the coded data, for example, to isolate header information and image data. In step 2807, image portion parameters are decoded. In the case of MPEG-2, for example, macroblock, mode, motion vectors, coded block indicaters (e.g. block pattern utilized) and related data are decoded. Next, inverse discrete cosine transform, de-quantization, etc. are conventionally performed to form decoded prediction error in step 2809, prediction data is formed in step 2811 and the prediction data and prediction error data are combined in step 2813. In step 2815, the reconstructed portion is stored in a frame buffer. Finally, if, in step 2817, the complete segment has been standard-decoded, then standard-decoding (of the segment) is completed; otherwise, operation returns to step 2807.

Continuing with FIG. 28b, which is preferably conducted by advanced-SR elements receiving standard-decoded data, in step 2821, an advance decoder optionally receives and initializes any downloaded tools and/or tool modifications. As noted above, encoding and decoding tools can be selectively and modifiably utilized (e.g. in conjunction with a particular standard, RSR/SR implementation, received data, application, etc.). Therefore advanced decoding (as with advanced coding), in such an implementation, would preferably receive and initialize such tools prior to operating on applicable data (e.g. in this case, via meta data and/or other communications channels). Such downloading can, for example, be conducted in a manner commensurate with conventional peripheral, applet and/or other hardware/software operation and/or functional updating techniques.

In step 2823, reference frames are interpolated in accordance with coding parameters. As noted, such parameters preferably exist within an advanced decoder (e.g. advanced-constructs, stored parameters, etc.) and/or are received via meta data and/or conventional data transfer in accordance with the received data and/or application. In step 2825, the optical flow field is initialized according to the received standard-coded data. In step 2827, ideal optical flow estimation is conducted, again, preferably in accordance with meta data (e.g. providing a path indicator) and/or advanced constructs and, in step 2829, data fusion is performed. As noted, data fusion can be substantially the reverse process of data diffusion-techniques (e.g. diffusion, registration, etc.). In reversing diffusion, for example, image aspects can be gathered and reconstructed with an appropriate (e.g. original, still, etc.) frame; in reversing registration, the image aspect coding-optimization alterations need only be reversed for the registered frame. In conjunction with or separately from step 2829, applicable additional processing and/or reconstruction (e.g. in accordance with diffused functions, meta data, advanced constructs, etc.) can be conducted (e.g. vertical deconvolution, transcoding, conversion, etc.) in step 2831. Finally, in step 2833, any distributed/cooperative processing information (e.g. indicating further advanced-SR required) can be generated and transferred (e.g. to an advanced-encoder, distributed RSR-SR unit, etc.).

Figure 29:
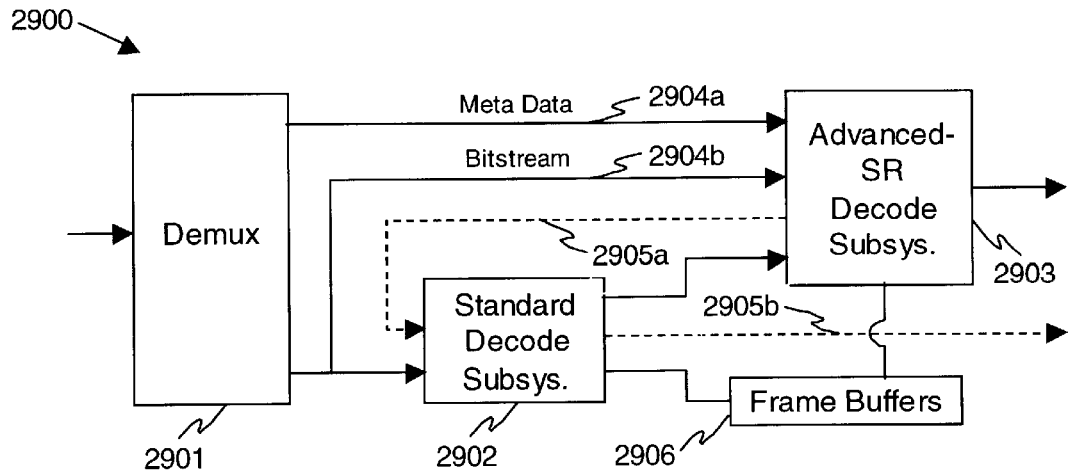
FIG. 29 is a flow diagram illustrating a separately implemented advanced decoder according to the invention.
Figure 30:
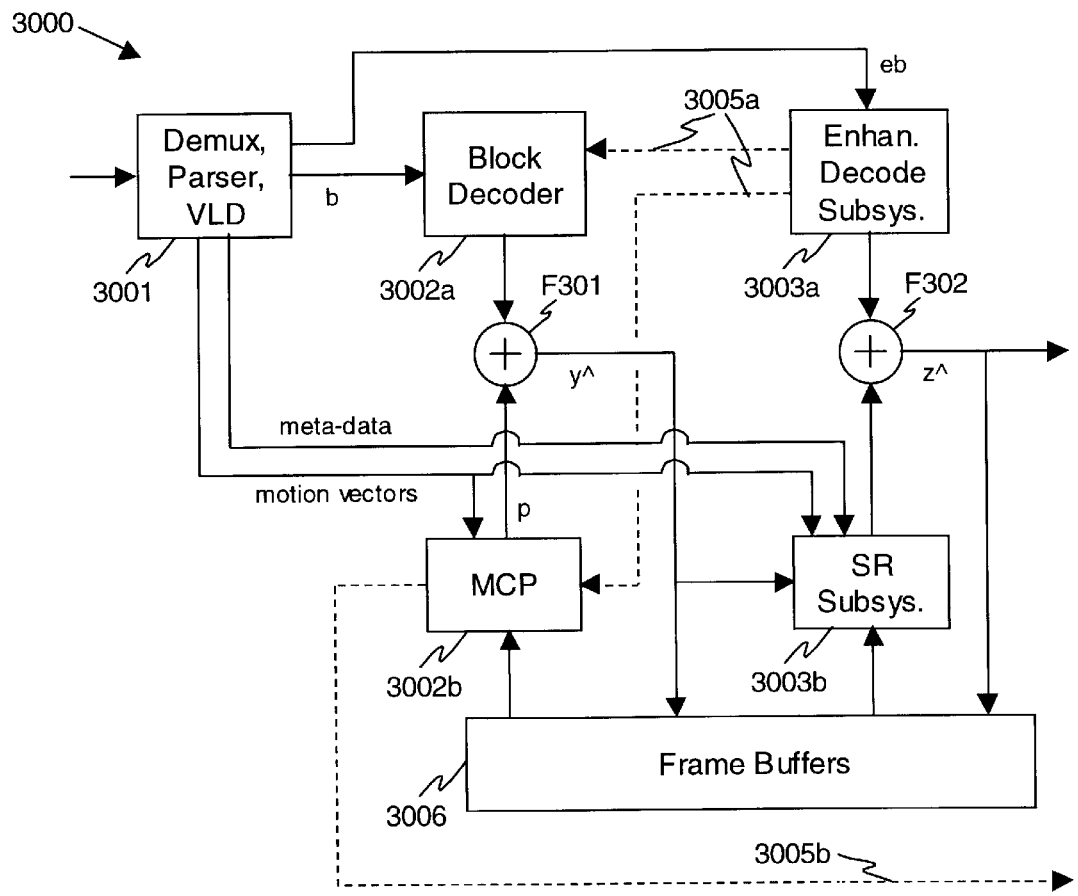
FIG. 30 is a flow diagram illustrating an integrated advanced decoder according to the invention.

In FIGS. 29 and 30, exemplary separately-configured and integrated advanced-SR decoders are respectively illustrated. Beginning with FIG. 29, separately-configured advanced-SR decoder 2900 comprises coupled elements including demultiplexer 2901, standard decode subsystem 2902, advanced-SR decode subsystem or "advanced-SR" 2903 and frame buffers 2906.

Demultiplexer 2901 and standard decode subsystem 2902 preferably operate in a conventional manner whereby standard decode subsystem 2902 receives (via demultiplexer 2901) and standard-decodes the image data, optionally outputting the standard-decoded data via connection 2605a; alternatively, coded data can be routed through advanced-SR 2903 to standard-decode subsystem 2902 via connection 2905a, thereby enabling advanced-SR processing and/or control of standard-decode subsystem input.

While coded-data received by demultiplexer 2901 can include injected enhancement-domain data (e.g. including diffused, re-registered and/or otherwise enhanced-processed image data and/or information produced by an advanced encoder), the effect of such data on standard-decoded output, where provided, is determinable. For example, such output can be controlled during coding; potentially detrimental modifications (e.g. induced blur) can be made small enough not to be perceivable and standard-decode improving modifications (e.g. spatial improvements, human visual system-SR effect utilizing improvements, etc.) can also be induced as discussed above. Alternatively or in conjunction therewith, potentially detrimental modifications to standard-quality output can also be removed via advanced-SR processing and then provided to standard-decode subsystem 2902 via connection 2905a as noted above. Other data-coding modifications (e.g. reduced standard-quality for increased enhancement capability; reduced bitrate; increased standard quality; etc.) can be realized directly in accordance with unaltered standard-decoding (e.g. utilizing frame buffers 2906 in a conventional manner).

Advanced-SR can be implemented at varying levels of complexity. A lower complexity implementation, for example, might utilize standard decode subsystem output and perform advanced-SR in conjunction with advanced coding (e.g. discussed RSR-coding) and in accordance with scene reconstruction to provide improved quality. Preferably, however, bitstream data 2904 can also be utilized to modify advanced-SR reconstruction. For example, frame/macroblock type information can be used to establish relative confidence levels in relying on optical path, prediction and/or other information (e.g. higher confidence with an I-frame versus a B or P-frame). Additional modifications are also possible through, for example, coding-type analysis of the bitstream itself (e.g. MPEG and general bitstream-based capability in accordance with the above-mentioned co-pending video decoding enhancement application). Alternatively or in conjunction therewith, meta data 2904a and/or advanced constructs can also be utilized (e.g. as facilitated by a super-domain model) to direct decoded and/or coded domain image aspect fusion, re-registration, optical path selection and/or other advanced-SR processing. The frame data utilized by advanced-SR can further include, for example, advanced-SR reference frames as well as standard-decode subsystem created frames. Advanced-SR can further include standard-decoding capability to provide standard-quality, conventional-SR and/or advanced-SR output; however, the parallel processing benefits (e.g. robustness) of including a separate-standard decode subsystem 2902 is preferred.

FIG. 30, with reference to FIGS. 27a and 27b, illustrates how a more integrated advanced-SR decoder, while requiring greater modification of an existing system than the separated-SR of FIG. 29, also enables further coded and decoded-domain reconstruction control and efficiency. For example, demultiplexer 3001 (i.e. separately or in an integrated manner) can conduct localized demultiplexing, stream parsing and variable-length decoding (e.g. steps 2721-2707 of FIG. 27a). Further, standard-decoding operations can be divided between block decoder 3002a and motion-compensated predictor ("MCP") 3002b, and SR can be divided between enhanced decode subsystem 3003a and SR-subsystem 3003b, thereby localizing the respective operations, avoiding functional repetition and enabling parallel processing (e.g. removing a need for multiple-pass reconstruction, saving memory, etc.) among other advantages. (Those skilled in the art will also understand that a programmable implementation enabling system/application specific utilization of advanced-processing, as with advanced-encoding, is also applicable to advanced-decoding, as are numerous other greater or lesser integrated implementation alternatives in accordance with the teachings herein.)

As in the above separately implemented decoder, greater advanced-SR control/processing (e.g. reversing certain advanced-SR directed coding, further cooperative coding, etc.) can be provided by directing demultiplexer 3001 output through enhanced decode subsystem 3003a for further processing and then via connections 3005 to standard-decoding elements 3002a–b. However, directly supplying block decoder 3002a with bitstream elements and directly supplying MCP 3002b with motion vectors is preferred as enabling the use of existing standard-decoding sub-element (3002a–b) functionalities while, for example, avoiding drift. Further, while standard-decoding output can be provided directly from MCP 3002b via connection 3005b (as in the previous example), those skilled in the art will appreciate that standard-decoded, conventional-SR and advanced-SR can also be provided via connection 3007 (i.e. via advanced-SR decoding elements 3003a–b and F302).

Operationally, standard-decoding is preferably conducted in a manner largely consistent-with conventional standard-decoding operations. More specifically (still using MPEG-2 as an exemplary standard), received standard-coded data is demultiplexed, parsed and variable length decoded (e.g. by demultiplexer 3001), the resultant bitstream, b, then being transferred to block decoder 3002a and motion vectors being transferred to MCP 3002b. Block decoder 3002a, upon receipt of signal b, performs inverse discrete cosine transforms ("IDCTs") inverse quantization and other conventional decode operations, providing prediction error data (e.g. step 2709 of FIG. 27a). MCP 3002b also conventionally performs motion-compensated prediction (step 2811). Block-decoder 3002a and MCP 3002b results are then combined and transferred to frame buffers 3006 by function F301 (steps 2813-2815). Reconstruction of predictive and bi-directional frames is further conventionally conducted by MCP 3002b utilizing frame buffers 3006 (which provides for separated or combined buffering for both standard decoding and advanced SR-reconstruction). Standard-decoding results can also be transferred to SR-subsystem 3005 via function F301 and/or via frame buffers 3006.

Further advanced-SR reconstruction preferably utilizes the above standard-decoding results, bitstream data, meta data and (here, separately available) motion vectors provided via demultiplexer 3001 in a consistent manner as with the above separately-configured implementation (e.g. step 2821 of FIG. 28b). Enhanced decode subsystem 3003a, upon receiving bitstream data from demultiplexer, performs analysis on such data to identify, for example, image portion differences and other image portion aspects such that SR-subsystem 3003b can utilize such aspects to conduct fusion/re-registration of diffused\registered image aspects and further reconstruction and application-specific processing. SR-subsystem 3003b preferably fuses and re-registers advanced-coded diffused and/or registered data and performs image scaling, interpolation, vertical deconvolution and/or other processing in a complimentary manner with RSR-coding operation (e.g. steps 2823–2829). Refinement of the enhanced image is blended at F302 (e.g. step 2831). As discussed, each operation can further be facilitated using received meta data and/or advanced constructs. Such information can also be used to facilitate conventional-SR as well as other processing and/or reconstruction in accordance with a particular application (e.g. as given by the above-mentioned co-pending applications).

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the spirit and scope of the invention as set forth.

I claim:

1. A super-domain model, comprising:

a knowledge base including a reconstruction descriptor; and a digital signal modifier in communication with the knowledge base and capable of modifying a received digital signal in accordance with the reconstruction descriptor such that reconstruction of a resultant digital signal modification is enabled.

2. The super domain model of claim 1, wherein the digital signal modifier includes capabilities for processing data types including meta data, in addition to image data, and also includes diffusion and metadata processing modules, an efficiency optimization module, a spatial optimization module and a scene analysis module.

3. The super domain model of claim 1, wherein the model is capable of modifying a digital signal comprising a single image.

4. A fusion method, comprising:

receiving digitally-coded image data;

identifying a source image portion aspect within the image data;

identifying a diffused image portion aspect within the image data; and performing processing causing a pre-diffusion correspondence of the source image portion aspect and diffused image portion aspect to be generally re-established forming fused data.

5. A fusion method according to claim 4, wherein said step of correspondence is established according to a fusion parameter.

6. Fused data formed according to the method of claim 4.

7. A fusion method according to claim 6, wherein said fusion parameter is further received as meta data.

8. A digital image data fuser comprising:

means for receiving digitally-coded image data;

means for identifying a source image portion aspect within the image data;

means for identifying a diffused image portion aspect within the image data; and means for performing processing causing a pre-diffusion correspondence of the source image portion aspect and diffused image portion aspect to be generally re-established.

9. A digital image data fuser according to claim 8, wherein means for identifying and performing comprise an advanced-superresolution reconstructer.

* * * * *